United States Patent
Shiba et al.

(10) Patent No.: US 6,417,643 B1
(45) Date of Patent: Jul. 9, 2002

(54) SYNCHRONOUS CONTROL DEVICE

(75) Inventors: Noriyuki Shiba, Tokyo; Toru Akiyama, Kanagawa; Masakatsu Fujita, Kanagawa; Hiroyuki Hisada, Kanagawa; Ikuo Kotani, Kanagawa, all of (JP)

(73) Assignee: Kabushiki Kaisya Tokyo Kikai Seisakusho (JP)

( * ) Notice: Subject to any disclaimer, the term of this patent is extended or adjusted under 35 U.S.C. 154(b) by 0 days.

(21) Appl. No.: 09/838,855

(22) Filed: Apr. 20, 2001

(30) Foreign Application Priority Data

Apr. 26, 2000 (JP) ........................................ 2000-125914

(51) Int. Cl.⁷ ................................................. H02P 1/46
(52) U.S. Cl. ........................ 318/700; 318/567; 318/34; 318/41; 388/805
(58) Field of Search ................................ 318/567, 700, 318/34, 41; 388/805

(56) References Cited

U.S. PATENT DOCUMENTS

| 5,859,515 A | * | 1/1999 | Takizawa et al. ........... 318/560 |
| 6,175,607 B1 | | 1/2001 | Shiba et al. .................. 377/16 |
| 6,274,997 B1 | * | 8/2001 | Shiba et al. ................ 318/567 |

FOREIGN PATENT DOCUMENTS

| JP | 56081093 | 2/1981 |
| JP | 62122987 | 6/1987 |
| JP | 03245790 | 1/1991 |
| JP | 05056684 | 5/1993 |
| JP | 06311777 | 4/1994 |
| JP | 09248978 | 9/1997 |
| JP | 10032992 | 3/1998 |
| JP | 3073727 | 6/2000 |
| JP | 3073730 | 6/2000 |
| JP | 200195276 | 4/2001 |

\* cited by examiner

Primary Examiner—Robert E. Nappi
Assistant Examiner—Rita Leykin
(74) Attorney, Agent, or Firm—Bierman, Muserlian and Lucas

(57) ABSTRACT

A synchronous control device according to the present invention completes an origin matching between a master section and a slave section without causing a phase difference even when a deceleration device is employed in the master section or in the slave section so as to perform an accurate synchronous control. The synchronous control device constantly detects the phase of a shaft of a master electric motor by a phase detector of the master electric motor according to the outputs of a master rotary encoder, and the phase of a shaft of the master machine by a phase detector of the shaft of the master machine according to the outputs of a master rotary encoder and an origin detector of the shaft of the master machine. In the same manner, the phase of a shaft of a slave electric motor is constantly detected by a phase detector of the slave electric motor according to the outputs of a slave rotary encoder, and the phase of a shaft of a slave machine is constantly detected by a phase detector of the shaft of the slave machine according to the outputs of a slave rotary encoder and an origin detector of the shaft of the slave machine. Then a first phase deviation between the shaft of the master machine and shaft of the slave machine by a first phase deviation detector, and a second phase deviation between the master electric motor and the slave electric motor by a second phase deviation detector for the electric motors are calculated. After an origin between the shaft of the master machine and the shaft of the slave machine is matched based on the first phase deviation, continuously an origin between the master electric motor and the slave electric motor is matched based on the second phase deviation so as to perform the synchronous control.

10 Claims, 29 Drawing Sheets

An operation without a phase shifter phase deviation in the
shaft of the electric motor An operation with a phase shifter phase deviation in the
shaft of the electric motor Figure explaining an origin matching
(in the case that the origin matching is failed)

SYNCHRONOUS CONTROL DEVICE

BACKGROUND OF THE INVENTION

1. Field of the Invention

The present invention relates to a synchronous control device used in processing systems for stretching resins and metals, conveyors and rotary presses. The present invention particularly relates to a synchronous control device which provides an origin matching operation in order to synchronously drive rotational phase and rotational frequency of electric motors in a master section and plural slave sections as well as synchronously drive the rotational phase and the rotational frequency of each machine shaft driven by said electric motors.

2. Description of the Related Art

FIGS. 23(a), (b) illustrate an example of a conventional rotary press with shafts. FIG. 23(a) illustrates a driving system of the conventional rotary press and is comprised of the following components, a main shaft 100, an electric motor 101, a sub shaft 102, a transmitter or a deceleration device 103, a paper feeding part 104, a printing part 105, color printing parts of yellow 106, cyan 107, magenta 105 and black 109, running paper 110, and a folding part 111.

In FIG. 23(a) each running paper 110 from the paper feeding part 104 is printed in the printing parts 105~106 and gathered to be folded in the folding part. Here, in the conventional rotary press, the printing parts 105~109 and the folding part 111 are mechanically combined and synchronously driven with the main shaft 100 and the sub shaft 102 which are driven by the plural electric motors.

FIG. 23(b) diagrams a model of the printing part 105~109, in which ink is supplied from an ink roller 105a to an image part of a lithographic plate which is wound on a plate cylinder 105b. The ink which is supplied to the image part of a lithographic plate is transferred to a face on a blanket cylinder 105c, then it is printed on the paper 105d. The printing position of each paper should be precisely accorded in the folding part 111. Since the printing parts 106~109 conduct color print, the printing position in the color printing parts 106~109 especially should be accorded each other with high accuracy because a shear of only 20~30 μm in printing produces visual color misalignment.

According to the present invention, as plural electric motors can be synchronously controlled with high precision, a shaft-less rotary press can be realized in place of the conventional rotary press driven with shafts.

A master electric motor, a slave electric motor and a conventional synchronous control device driven by these electric motors are shown in the following.

FIG. 24 illustrates an example of a conventional synchronous control device for plural electric motors. For simplicity, this diagram is comprised of a master section and one slave section.

In FIG. 24, 0 is a master section, 1 is a slave section, 01 is a rotational frequency setting device, Cm is a master control device, 11 is a rotational frequency detector, 12 is a rotational frequency feedback detector, 13 is a gain amplifier, Am is a master driving device, Im is a master electric motor, Rm is a master rotary encoder, Km is a shaft of the master machine, Cs1 is a slave control device, 21, 23, 26 and 28 are receiving interfaces, 22 is a rotational frequency detector, 24 is a rotational frequency feedback detector, 25 is a gain amplifier, 27 is a phase detector of the master electric motor, 29 is a phase detector of the slave electric motor, 30 is a phase deviation detector for the electric motors, 31 is a gain amplifier, 40 is a switch for a synchronous control, As1 is a slave driving device, Is1 is a slave electric motor, Rs1 is a slave rotary encoder and Ks1 is a shaft of the slave machine.

The master rotary encoder Rm and the slave rotary encoder Rs1 output A phase pulse and B phase pulse in proportion to the rotation and output Z phase pulse per each rotation.

In FIG. 24, a signal from the rotational frequency setting device 01 is sent to the rotational frequency detector 11 of the control device Cm of the master section. The rotational frequency feedback detector 12 detects rotational frequency feedback according to the A phase signal and the B phase signal outputted from the master rotary encoder Rm attached to the master electric motor Im.

The output signals from the rotational frequency detector 11 and the rotational frequency feedback detector 12 are calculated and sent to the master driving device Am through the gain amplifier 13. The master driving device Am then drives the master electric motor Im by controlling rotational frequency, and the shaft Km of the master machine is driven.

The A phase signal and B phase signal from the master rotary encoder Rm are also sent to the rotational frequency setting detector 22 through the receiving interface 21 of the slave control device Cs1 so as to detect a setting rotational frequency of the slave section 1. Addition, A phase signal and B phase signals outputted from the slave rotary encoder Rs1 attached to the slave electric motor are sent to the rotational frequency feedback detector 24 through the receiving interface 23 of the slave control device Cs1 in order to detect a rotational frequency feedback. The output signals from the rotational frequency detector 22 and the rotational frequency feedback detector 24 are calculated and sent to the slave driving device As1 through the gain amplifier 25. The slave driving device As1 drives the slave electric motor Is1 so as to tune the master electric motor Im and the shaft Km of the master machine and the shaft Ks1 of the slave machine are driven in tune.

Furthermore, the phase detector 27 of the master electric motor in the slave control device Cs1 counts the A phase pulse and B phase pulse outputted by the rotation of the master electric motor Im through the receiving interface 21 and clears the phase detector 27 by Z phase signal outputted by each rotation of the master electric motor Im through the receiving interface 26. The phase detector 27 of the master electric motor constantly detects the rotational phase of the master electric motor and that of the shaft of the master machine with the number of pulses.

In the same manner, the phase detector 29 of the slave electric motor counts up the A phase pulse and B phase pulse outputted by the rotation of the slave electric motor Is1 through the receiving interface 23, and clears them by Z phase signal outputted by each rotation of the slave electric motor Is1, through the receiving interface 28. The phase detector 29 of the slave electric motor constantly detects rotational phase of the slave electric motor and the shaft of the slave machine with number of pulses.

Then the output of the phase detector 27 of the master electric motor and the phase detector 29 of the slave electric motor are inputted to the phase deviation detector 30 so as to calculate the phase deviation and output it. The phase deviation goes through the gain amplifier 31 and switch 40, which is closed when synchronous control is ON, and it is added to or subtracted from the output of the rotational frequency detector 22 as correction, then the synchronous control is performed.

Here, referring to FIG. 26, the phase deviation outputted from the phase deviation detector 30 according to the prior art is explained.

In FIG. 26, X axis shows difference of the rotational number between the master electric motor Im and the slave electric motor Is1, Y axis shows a phase deviation, which is outputted from the phase deviation detector 30, converted to angle. In FIG. 26-A, a circle (a) shows the modeled shaft Km of the master machine, a line z1 shows projection of Z phase position of the master rotary encoder Rm on the circle (a). In this invention, counterclockwise direction is defined as an ordinary direction of the electric motors, that is, from the center of the circle (a), which shows the shaft of the master machine Km, plus(+) direction of the x axis=0°, plus(+) direction of the y axis=+90°, minus(−) direction of the x axis=+180°, minus(−) direction of the y axis=+270°. In the same manner, in FIG. 26-B, a circle (b) shows the shaft Ks1 of the slave machine and z1 shows Z phase of the slave rotary encoder Rs1.

FIGS. 26-A and B illustrate that the shaft Km of the master machine is 90° behind compared to the shaft Ks1 of the slave machine, and a phase deviation is −90° as shown by a point P. FIGS. 26-C and D illustrate that the shaft Km of the master machine is 90° forward compared to the shaft Ks1 of the slave machine, and a phase deviation is +90° as shown by a point Q. More over, FIGS. 26-E and F illustrate that the shaft Km of the master machine is 270° forward compared to the shaft Ks1 of the slave machine, however the phase deviation becomes smaller if the shaft Km of the master machine is 90° behind compared to the shaft Ks1 of the slave machine, it is shown by a point R in FIG. 26-E.

As mentioned above, the phase deviation of rotation is detected normally in the range from −180° to +180°, the output of the phase deviation detector 30 for the electric motors of FIG. 24 is shown in FIG. 26.

Next, the action in the FIG. 24 is explained with reference to FIG. 25.

In FIG. 25-A, same as FIG. 26-A, a circle (a) shows the shaft Km of the master machine, a line z1 shows a Z phase position of the master rotary encoder Rm. Also, in FIG. 25-B, a circle (b) shows the shaft Ks1 of the slave machine, a line z1 shows a Z phase position of the slave rotary encoder Rs1.

C27 and C29 show time transition by converting the output of the phase detector 27 of the master electric motor and the output of the phase detector 29 of the slave electric motor to angle, respectively.

FIG. 25-A illustrates a phase of the shaft Km of the master machine at time t1 is, for example, 0°, FIG. 25-B illustrates a phase of the shaft Ks1 of the slave machine at time t1 is, for example, +270°. The output C27 of the phase detector 27 of the master electric motor and the output C29 of the phase detector 29 of the slave electric motor shown in FIG. 24 are corresponded to C27=0° in FIG. 25-A and C29=0° in FIG. 25-B, at time t1, respectively.

At time t1, the slave electric motor Is1 is driven so as to tune with the master electric motor Im (the rotational frequency of the slave electric motor Is1 is controlled so as to be in accord with it of the master electric motor Im). At time t2 the switch 40 is closed, a synchronous control is ON. At time t2, when the phase of the shaft Km of the master machine in FIG. 25-C is, for example, +225°, the phase of the shaft Ks1 of the slave machine in FIG. 25-D is, for example, +135°, the phase deviation detected by phase deviation detector 30 for the electric motors is converted to angle Δθt2.

$$\Delta\theta t2 = 225 - 135 = 90° \tag{1}$$

After time t2, the switch 40 is closed and the synchronous control is ON, an origin matching is started. By correcting the phase deviation which is detected in the same manner of the equation (1), constantly, the phase detector 29 of the slave electric motor changes phase as shown C29, C27 in FIG. 25 so as to get near the phase of the phase detector 27 of the master electric motor, at time t3 the origin matching is completed then the master electric motor Im and the slave electric motor Is1 are shifted to a synchronous control.

FIGS. 25-E, F illustrate the situation that the master section and the slave section are controlled synchronously at time t4. FIG. 25-I modeledly illustrates that the output of the phase detector 27 of the master electric motor and the output of the phase detector 29 of the slave electric motor are almost overlapped each other, because the master section and the slave section are driven synchronously.

In FIG. 24, the master section 0 and the slave section 1 detect an absolute position by the phase detector 27 of the master electric motor and the phase detector 29 of the slave electric motor, respectively, so as to detect a phase deviation by these phase detectors. In this invention it is called "a method for correcting an absolute phase deviation".

In this method of correcting an absolute phase deviation, under synchronous control an origin can be matched without any means even when the shaft Km of the master machine and the shaft Ks1 of the slave machine are in any phase relation.

Here, an origin matching is defined as a period from the time when the synchronous control is ON till the time when a phase deviation becomes within ±ε2 pulse (for example, ±ε2=±5), if an objective accuracy of the synchronous control is ±ε2 pulse.

Here, when an electric motor and a machine shaft are connected, a deceleration device is sometimes employed because of the structure, installation space or capacity of the electric motor. FIG. 27 illustrates a synchronous control device according to the conventional synchronous control in the case that the deceleration device is employed. FIG. 28 and FIG. 29 illustrate the action of the origin matching.

The difference between FIG. 27 and the aforementioned FIG. 24 is that the master electric motor Im and the slave electric motor Is1 are connected to the shaft Km of the master machine and the shaft Ks1 of the slave machine with deceleration device Gm and Gs1, respectively. In FIG. 27, the same parts which have the same action shown in FIG. 24 are referred to using the same symbols. The explanations thereof are abridged.

FIG. 28 illustrates an action when a synchronous control by the conventional synchronous control device shown in FIG. 27 is performed. In the following, in order to simplify the explanation, the deceleration ratio (1/N) of the slave deceleration device Gs1 is 1/4 (N=4) to the master deceleration device Gm.

In FIG. 28-A, a circle (a) shows the modeled shaft Km of the master machine and lines z1, z2, z3 and z4 show projection of the z-phase positions of the master rotary encoder Rm on the circle (a). The line z1 is shown with thick line as a base of one rotation of the shaft Km of the master machine. The numbers 1, 2, 3 and 4 show that 4 rotations of the master electric motor Im make one rotation of the shaft Km of the master machine.

In the same manner, in FIG. 28-B, a circle (b) shows the shaft Ks1 of the slave machine and lines z1 , z2, z3 and z4 show projection of the z-phase positions of the slave rotary encoder Rs1 on the circle (b). The numbers ①, ②, ③ and ④ show that 4 rotations of the slave electric motor Is1 make one rotation of the shaft Ks1 of the slave machine.

Also, in FIG. 28, C27 and C29 show time transition by converting the output of the phase detector 27 of the master electric motor and the output of the phase detector 29 of the slave electric motor to angle, respectively.

In FIG. 28, the master electric motor Im and the slave electric motor Is1 are driven under tuning control. At time t1 when the switch 40 is closed and a synchronous control is ON.

At time t1 when the synchronous control is started, in FIG. 28-A, phase θm (z1 phase as a basis) of the shaft Km of the master machine is, for example, θm=+270° in the shaft of the electric motor(+270°/4=67.5° in the shaft of machine). In FIG. 28-B, phase θs1 (z1 phase as a basis) of the shaft Ks1 of the slave machine is, for example, θs1=+180° in the shaft of the electric motor(+180°/4=45° in the shaft of machine). They correspond to the output C27=270° of the phase detector 27 of the master electric motor and the output C29=180° of the phase detector 29 of the slave electric motor, respectively.

After time t1 when the synchronous control is ON, C29 is controlled so as to get near C27, then C27 and C29 are overlapped at time t2 as shown in FIG. 28-I. At time t2, when 1, 2, 3 and 4 in FIG. 28-C and ①, ②, ③ and ④ in FIG. 28-D are in the same position, the origin matching is completed normally.

When the origins are matched normally, the phase deviation between the shaft Km1 of the master machine and the machine shaft Ks1 of the slave machine is θm−θs1=270°−180°=90° in the shaft of the electric motor by using the aforementioned rotational phase θm and θs1 of the shafts of the electric motors. The origin matching is completed normally when the following equation is realized.

$$\{\text{the phase deviation when the synchronous control is ON} = |\theta m - \theta s1|\} < 180° \quad (2)$$

In the aforementioned example, the origin matching is completed normally even when the deceleration device is equipped. However as the phase relation between the shaft Km of the master machine and the shaft Ks1 of the slave machine is indefinite there are some cases that the origin matching is failed. FIG. 29 illustrates the case.

In FIG. 29 at time t1 when the synchronous control is ON, the shaft Km of the master machine is shown in FIG. 29-A', for example, the phase of the shaft Km of the master machine is θm=−90° in the shaft of the electric motor (−90°/4=−22.5° in the shaft of machine ). The shaft Ks1 of the slave machine is shown in FIG. 29-B', for example, the phase of the shaft Ks1 of the slave machine is θs1=+180° in the shaft of the electric motor (+180°/4=+45° in the shaft of machine).

At time t1 when switch 40 is closed and the synchronous control is ON. After time t1, C29 shown in FIG. 29 is controlled so as to get near C27. Then at time t3, C29 is overlapped on C27 and the origin matching is completed as shown in FIG. 29-I.

Here, at time t3, "2" in FIG. 29-C' is synchronized with "③" in FIG. 29-D'. Therefore, the origin matching is completed in the state that the shaft Ks1 of the slave machine is 90° forward compared to the shaft Km of the master machine though the master electric motor Im and the slave electric motor Is1 are synchronized.

In this case, when the synchronous control is ON in FIG. 29, the phase relation between the shaft Km1 of the master machine and shaft Ks1 of the slave machine is θm−θs1=−90°−180°=−270° in the shaft of the electric motor by using the aforementioned rotational phase θm and θs1 of the shafts of the electric motors. The origin matching is failed when the following equation is realized.

$$180° \leq \{\text{(the phase deviation when the synchronous control is ON} = |\theta m - \theta s1|\} \quad (3)$$

That is, in the synchronous control device employing the deceleration device with deceleration rate of 1/N (N is a positive integer) the origins are matched normally when the phase deviation between the master electric motor Im and the slave electric motor Is1 satisfies the aforementioned equation (2). However, when the phase deviation is in the aforementioned equation (3) a phase difference is caused in the origin is matching.

When the deceleration rate is, for example, 1/N=1/4, the phase difference of 90°, 180°, 270° can be caused by the method for origin matching of the synchronous device shown in FIG. 27. In general, when the deceleration rate is 1/N any phase difference shown in the following equation (4) is caused.

$$360°/N$$

or $$(360°×2)/N$$

or

.

.

.

$$\{360°×2(N-1)\}/N \quad (4)$$

Also, in the case that the deceleration device is employed, the synchronous control is performed by the following equation as shown in the Japanese publication No. 6-311777.

$$\text{The phase deviation } \epsilon = n1 \times N2 \times N1 \times 1/Z - n2 \quad (5)$$

In the aforementioned equation (5), N1 is a resolution of a master encoder, N2 is a resolution of a slave encoder, Z is a deceleration rate between the master machine and the slave machine, n1 and n2 are the number of pulses which are inputted per one scan of a control device from the rotary encoders of the master section and the slave section, respectively. The synchronous control according to the equation (5) detects relative differences between the number of pulses which is inputted per one scan of the master section and it of the slave section as correction. Here, this synchronous control is called "a method for correcting a relative phase deviation".

In the aforementioned method for correcting a relative phase deviation, rotational frequency of the master section and it of the slave section can be tuned precisely, however the method doesn't have mechanism of an origin matching. Also, if n1 or n2 in the aforementioned equation (5) are detected by error because of noises and so on, the phase relation between the master section and the slave section causes a difference and this difference is integrated.

As mentioned above, in the conventional synchronous control device employing a deceleration device between an electric motor and a machine shaft, there are some cases that an origin matching is failed according to the phase differences between a master electric motor and a slave electric motor when a synchronous control is ON.

SUMMARY OF THE INVENTION

An object of the present invention is that an origin matching between a shaft of a master machine and a shaft of a slave machine can be completed without causing a phase difference even when a deceleration device is employed, also the origin matching can be performed accurately when the master section and the slave section are driven even at low or high rotational frequency, or they are accelerated or decelerated, so that a very accurate synchronous control is performed rapidly and continuously.

The present invention solves the above-mentioned problems by the following way.

The present invention of claim 1 discloses a synchronous control device including a master section and a slave section for controlling a rotational frequency and a rotational phase between a master electric motor and a slave electric motor, or between a shaft of the master machine and a shaft of a slave machine which are driven by the respective electric motors, in the case that each deceleration device with a deceleration rate of 1/N (N is a positive integer) is employed between the master electric motor and the shaft of the master machine and between the slave electric motor and the shaft of the slave machine.

According to the present invention, a master rotary encoder for outputting pulses in response to the master electric motor, and an origin detector of the shaft of the master machine for detecting one rotation of the shaft of the master machine are provided.

Also, a slave rotary encoder for outputting pulses in response to the slave electric motor, and an origin detector of the shaft of the slave machine for detecting one rotation of the shaft of the slave machine are provided.

In the slave section, a rotational frequency detector for detecting a rotational frequency of the master electric motor by a signal outputted from the master rotary encoder is provided.

Also, a phase detector of the master electric motor for detecting rotational phase of the master electric motor by the output of the master rotary encoder and a phase detector of the slave electric motor for detecting the rotational phase of the slave electric motor by the output of the slave rotary encoder are provided.

Further, a phase detector of the shaft of the master machine for detecting a rotational phase of the shaft of the master machine by the output of a master rotary encoder and being cleared by the output of an origin detector of the shaft of the master machine, and a phase detector of the shaft of the slave machine for detecting the rotational phase of the shaft of the slave machine by the output of a slave rotary encoder and being cleared by the output of an origin detector of the shaft of the slave machine are provided.

Sill, a rotational frequency feedback detector for detecting a feed back rotational frequency of the slave electric motor by the signal outputted from the slave rotary encoder is provided.

Furthermore, according to the present invention, the first phase deviation detector for calculating the phase deviation between the shaft of the master machine and the shaft of the slave machine, and the second phase deviation detector for calculating the phase deviation between the master electric motor and the slave electric motor are provided.

The origin between the shaft of the master machine and the shaft of the slave machine is matched so as to control that, for example, the sum of the output of the first phase deviation detector and the difference between the output of the rotational frequency detector and the rotational frequency feedback detector gets smaller.

When the phase deviation between the shaft of the master machine and the shaft of the slave machine is within the predetermined value (for example, the phase deviation is ±1/2 rotational frequency of the shaft of the electric motor), continuously the origin between the master electric motor and the slave electric motor is matched so as to control that, for example, the sum of the output of the second phase deviation detector and the difference between the output of the rotational frequency detector and the rotational frequency feedback detector gets smaller.

According to the above-mentioned operation even when the deceleration devices are employed, the origin can be matched without causing any phase discrepancy of 360°/N, (360°×2)/N, . . . {360°×(N−1)}/N (N is a positive integer) in the shaft of the slave electric motor. After the origin matching an accurate synchronous control can be started continuously even when the master machine and the slave machine are driven at any rotational frequency, of low or high, or decelerated.

Further, in the case that an incremental encoder is employed for the rotary encoder, the above-mentioned phase detectors are comprised of an integrating counter for detecting the phase of the shaft of the master machine, the phase of the shaft of the slave machine, the phase of the shaft of the master electric motor, and the phase of the slave electric motor, respectively.

For the phase detector of the electric motor, the pulse signal outputted from the rotary encoder are counted by the integrating counter, and the counted value is cleared by Z phase pulse outputted per one rotation of the rotary encoder.

For the phase detector of the shaft of the machine, the pulse signals outputted from the rotary encoder are counted by the integrating counter, then the counted value is cleared by the output of the origin detector of the shaft of the machine.

Also, in the case that an ablolute-type encoder is employed for the rotary encoder, the above-mentioned phase detectors are comprised of a register for detecting the phase of the shaft of the master machine, the phase of the shaft of the slave machine, the phase of the shaft of the master electric motor, and the phase of the slave electric motor, respectively.

For the phase detector of the electric motor, the signal corresponding to the rotational angle outputted from the absolute-type rotary encoder is always set in the register.

Also for the phase detector of the shaft of the machine, the register integrates the difference of the signal corresponding to the rotational angle outputted from the rotary encoder, and the integrated value is cleared by the output of the origin detector of the shaft of the machine.

According to the above-mentioned operation the rotational phase of the electric motor and the shaft of the machine in the master section and in the slave section can be detected accurately.

The present invention of claim 2 in the claim 1 discloses a phase shifter for correcting the output of the first phase deviation detector by a phase shift amount corresponding to a discrepancy between an angle of a shaft of a machine and an angle of a shaft of an electric motor.

By virtue of the phase shifter, as the discrepancy between an angle of a shaft of a machine and an angle of a shaft of an electric motor is canceled, the first origin matching between the shaft of the master machine and the shaft of the slave machine is shifted to the second origin matching between the master electric motor and the slave electric motor bumplessly.

That is, even when the relation between the Z-phase of the master rotary encoder and the origin of the shaft of the master machine is in any position in the master section, also even when that the relation between the Z-phase of the slave rotary encoder and the origin of the shaft of the slave machine is in any position in the slave section, as the correction can be performed by the phase shifter the control can be shifted to the synchronous control bumplessly.

The present invention of the claim 3 discloses a synchronous control device including a master section and a slave section for controlling a rotational frequency and the rotational phase between a master electric motor and a slave electric motor, or between a shaft of a master machine and a shaft of a slave machine driven by the respective electric motors, in the case that a deceleration device is employed only between the slave electric motor and the shaft of the slave machine.

According to the present invention, a master rotary encoder for outputting pulses in response to the master electric motor, and a slave rotary encoder for outputting pulses in response to the slave electric motor are provided.

Here, the output number of pulses or the maximum output value per one rotation of the master rotary encoder is N times (N is a positive integer) as many as the output number of pulses or the maximum output value per one rotation of the slave rotary encoder.

Also, an origin detector of the shaft of the slave machine for detecting one rotation of the shaft of the slave machine is provided.

In the slave section, a rotational frequency detector for detecting a rotational frequency of the master electric motor by a signal outputted from the master rotary encoder is provided.

Also, a phase detector of the master electric motor for detecting the rotational phase of the shaft of the master machine (namely, the shaft of the electric motor) by the output of a master rotary encoder and being cleared every one rotation of the master rotary encoder is provided. Further, a phase detector of the slave electric motor for detecting rotational phase of the slave electric motor by the output of the slave rotary encoder and being cleared every one rotation of the slave rotary encoder, and a phase detector of the shaft of the slave machine for detecting the rotational phase of the shaft of the slave machine by the output of the slave rotary encoder and being cleared by the output of the origin detector of the shaft of the slave machine are provided.

Still, a rotational frequency feedback detector for detecting a feed back rotational frequency of the slave electric motor by the signal outputted from the slave rotary encoder is provided.

Furthermore, according to the present invention, a first phase deviation detector for calculating the phase deviation between the shaft of the master machine and the shaft of the slave machine is provided.

Moreover, a master over counter and a slave over counter for outputting a coefficient value for converting a rotational phase of the slave electric motor to a phase corresponding to a rotational phase of the shaft of the slave machine is provided.

Furthermore, a second phase deviation detector for calculating the output of the phase detector of the master electric motor and the output of the phase detector of the slave electric motor, and the output of the master over counter and the output of the slave over counter, then outputting a phase deviation between the master electric motor and the slave electric motor is provided.

The origin between the shaft of the master machine and the shaft of the slave machine is matched so as to control that, for example, the sum of the output of the first phase deviation detector and the difference between the output of the rotational frequency detector and the rotational frequency feedback detector gets smaller.

When the phase deviation between the shaft of the master machine and the shaft of the slave machine is within the predetermined value (for example, the phase deviation is ±1/2 rotational frequency of the shaft of the electric motor), continuously the origin between the master electric motor and the slave electric motor is matched so as to control that, for example, the sum of the output of the second phase deviation detector and the difference between the output of the rotational frequency detector and the rotational frequency feedback detector gets smaller.

According to the above-mentioned operation, even when the deceleration devices are employed only in the slave section, same as the invention of claim 1, the origin can be matched without causing any phase discrepancy of 360°/N, (360°×2)/N, ... {360°×(N−1)}/N (N is a positive integer) in the shaft of the slave electric motor. After the origin matching, an accurate synchronous-control can be started continuously even when the master machine and the slave machine are driven at any rotational frequency, of low or high, or decelerated.

Further, in the case that an incremental rotary encoder is employed as a rotary encoder in the same manner as the invention of claim 1, an integrating counter may be employed as the phase detector. And in the case that an ablosute-type rotary encoder is employed as a rotary encoder, same as the invention of claim 1, a register may be employed.

According to the present invention of claim 4 in the claim 3, the master over counter and the slave over counter are initialized as follows;

That is, when the phase deviation for the electric motors is within the predetermined phase deviation, in the case that the master section is forward compared to the slave section, the counted value of the slave over counter is initialized to 0, 1 . . . (N−1) or −1 corresponding to the output of the phase detector of the master electric motor and the phase detector of the slave electric motor, and the counted value of the master over counter is initialized to 0, in the case that the master section is behind compared to the master section, the counted value of the slave over counter is initialized to 0, 1 . . . (N−1) or N corresponding to the output of the phase detector of the master electric motor and the phase detector of the slave electric motor, and the counted value of the master over counter is initialized to 0.

According to the initialization, in the second phase deviation detector, the rotational phase of the slave electric motor is converted to the value corresponding the rotational phase of the shaft of the master machine, the rotational phase deviation of the electric motors can be found.

According to the present invention of the claim 5 in the claim 3 or the claim 4, when the master section and the slave section are under synchronous control the counted value of the master over counter and the slave over counter are renewed as follows;

That is, when the output of the phase detector of the master electric motor is cleared in the case that the counted value of the slave over counter is N or more, N is subtracted from the counted value of the slave over counter, in the case that the counted value of the over counter is less than N, 1 is added to the counted value of the master over counter.

When the output of the phase detector of slave electric motor is cleared in the case that the counted value of the slave over counter is (N−1) or more, (N−1) is subtracted from the counted value of the slave over counter and 1 is subtracted from the counted value of the master over counter, in the case that the counted value of the slave over counter is less than (N−1), 1 is added to the counted value of the slave over counter.

By the above-mentioned renewal, the phase deviation of the electric motors can be found in the second phase deviation detector.

According to the present invention of the claim 6 in the claim 3, the claim 4 and the claim 5, in stead of the master electric motor and the master rotary encoder, a concentrated control unit employing a phase generator for outputting phase setting signal based on N times the number of pulses corresponding to one rotation of the slave rotary encoder, and a transmitter for sending the output of the phase generator to the slave section is provided. Also, in the slave section, a receiver for inputting the output of the transmitter is provided so that a rotational frequency setting signal and a phase signal of the master electric motor are detected on the data of the receiver.

That is, as the electronically comprised phase generator is employed in the concentrated control unit, a stable signal can be generated and the slave electronic motor can be synchronously controlled accurately.

According to the present invention, as plural electric motors can be synchronously controlled with high precision, a shaft-less rotary press can be realized in place of the conventional rotary press driven with shafts.

DETAILED DESCRIPTION OF THE INVENTION

In the following description, modes for implementing the present invention are explained.

(1)Embodiment 1

Figure 1:
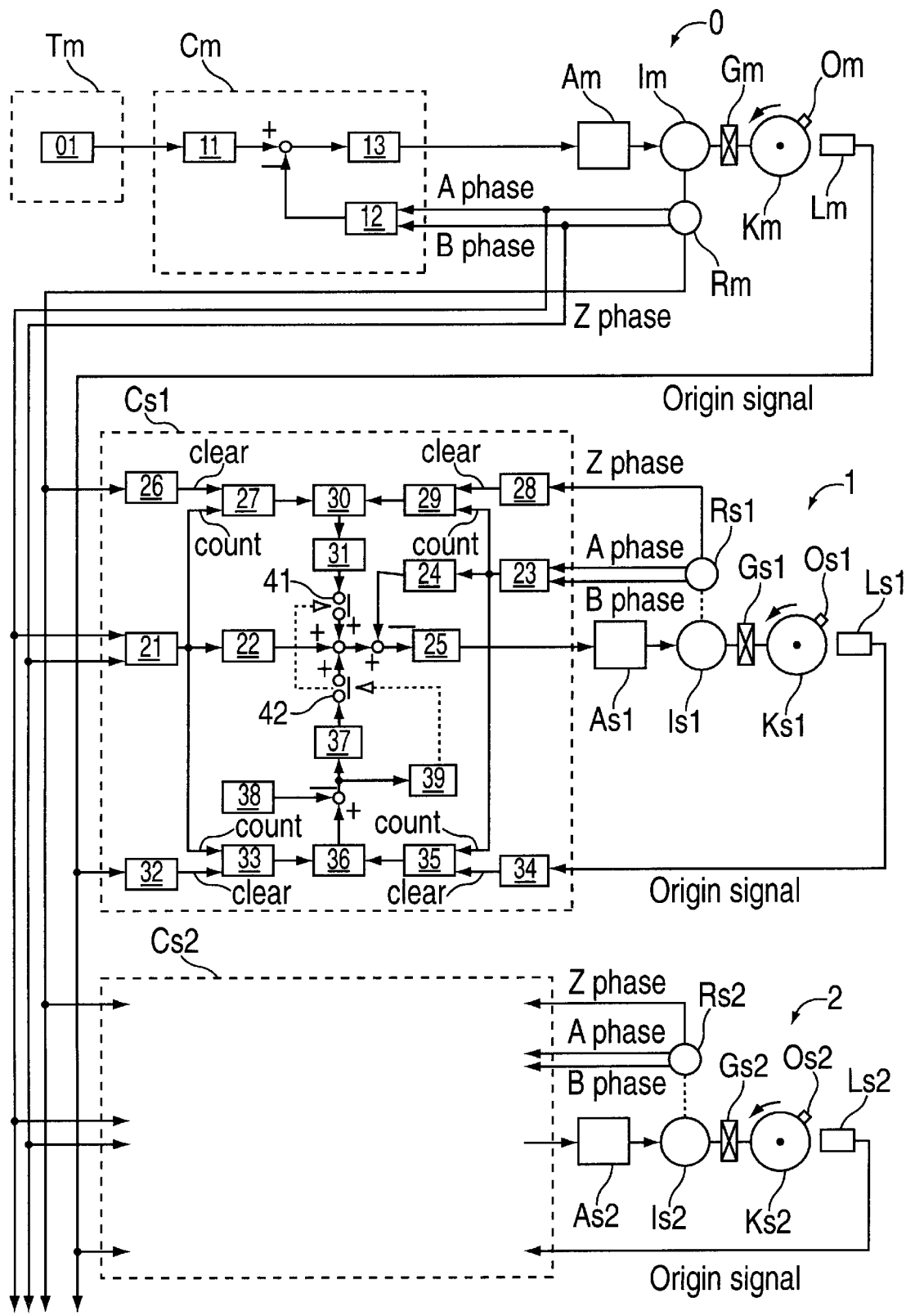
FIG. 1 illustrates a block diagram of the first embodiment according to the present invention.
Figure 2:
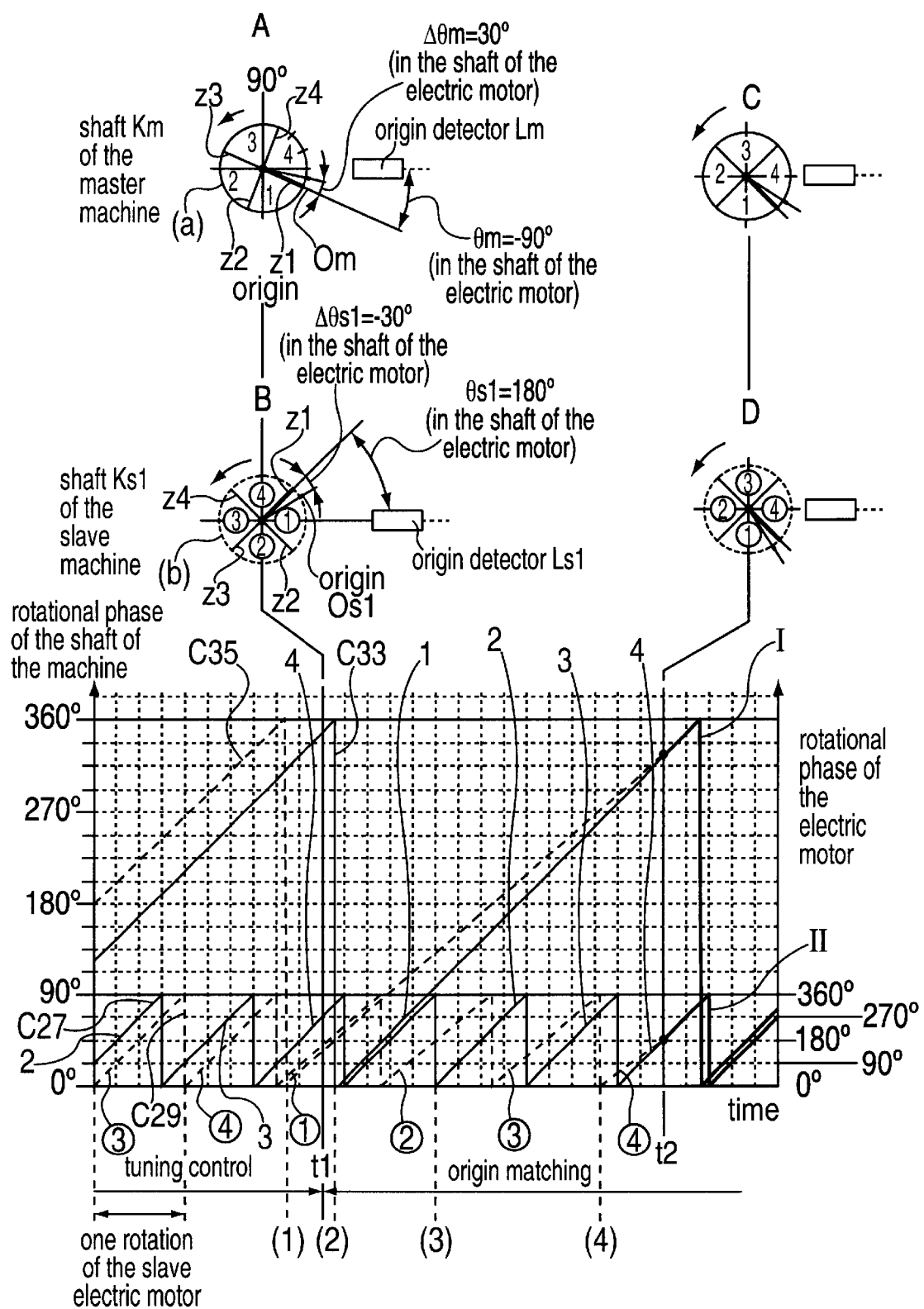
FIG. 2 illustrates the operation of FIG. 1. (1)
Figure 3:
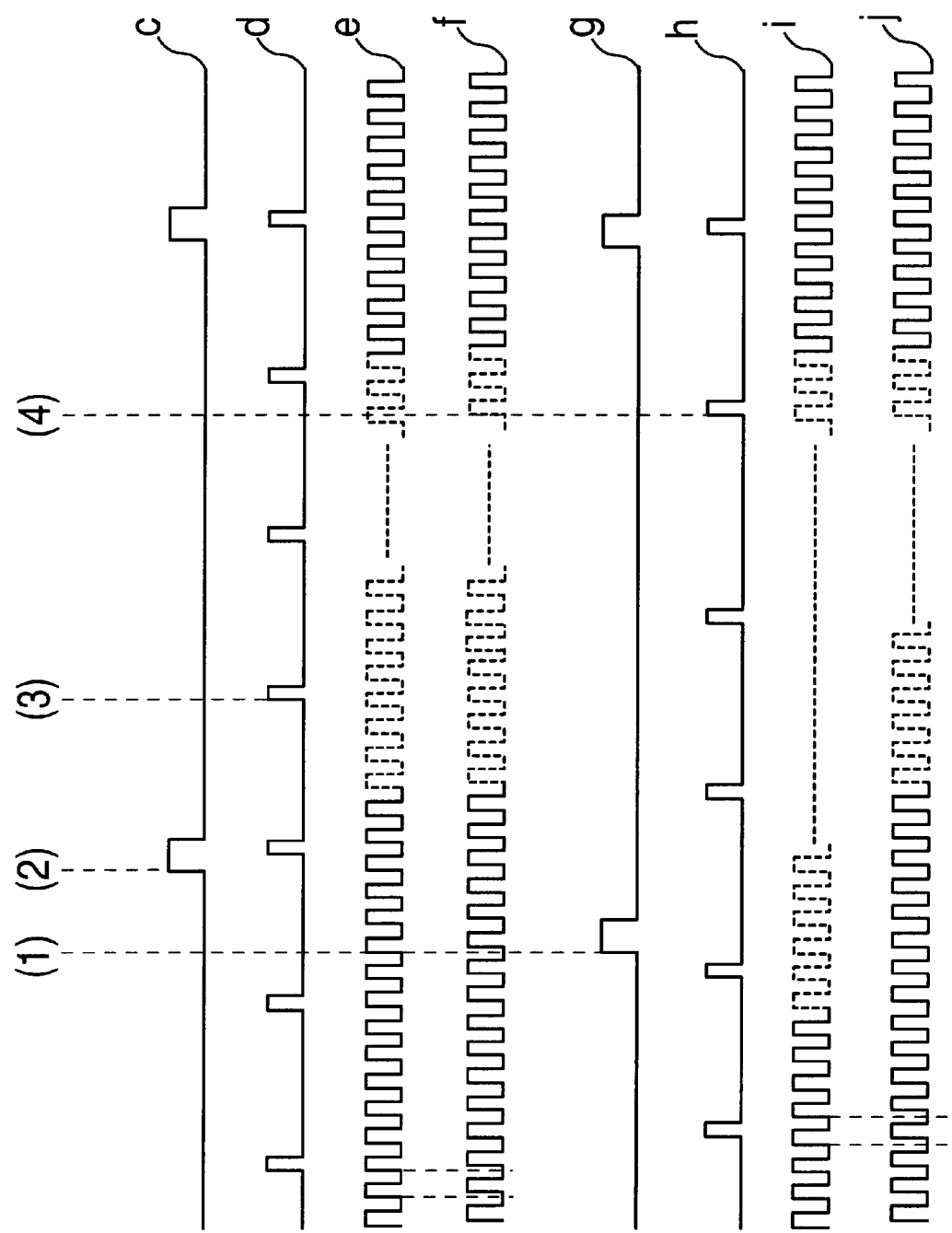
FIG. 3 illustrates the operation of FIG. 1. (2)
Figure 5:
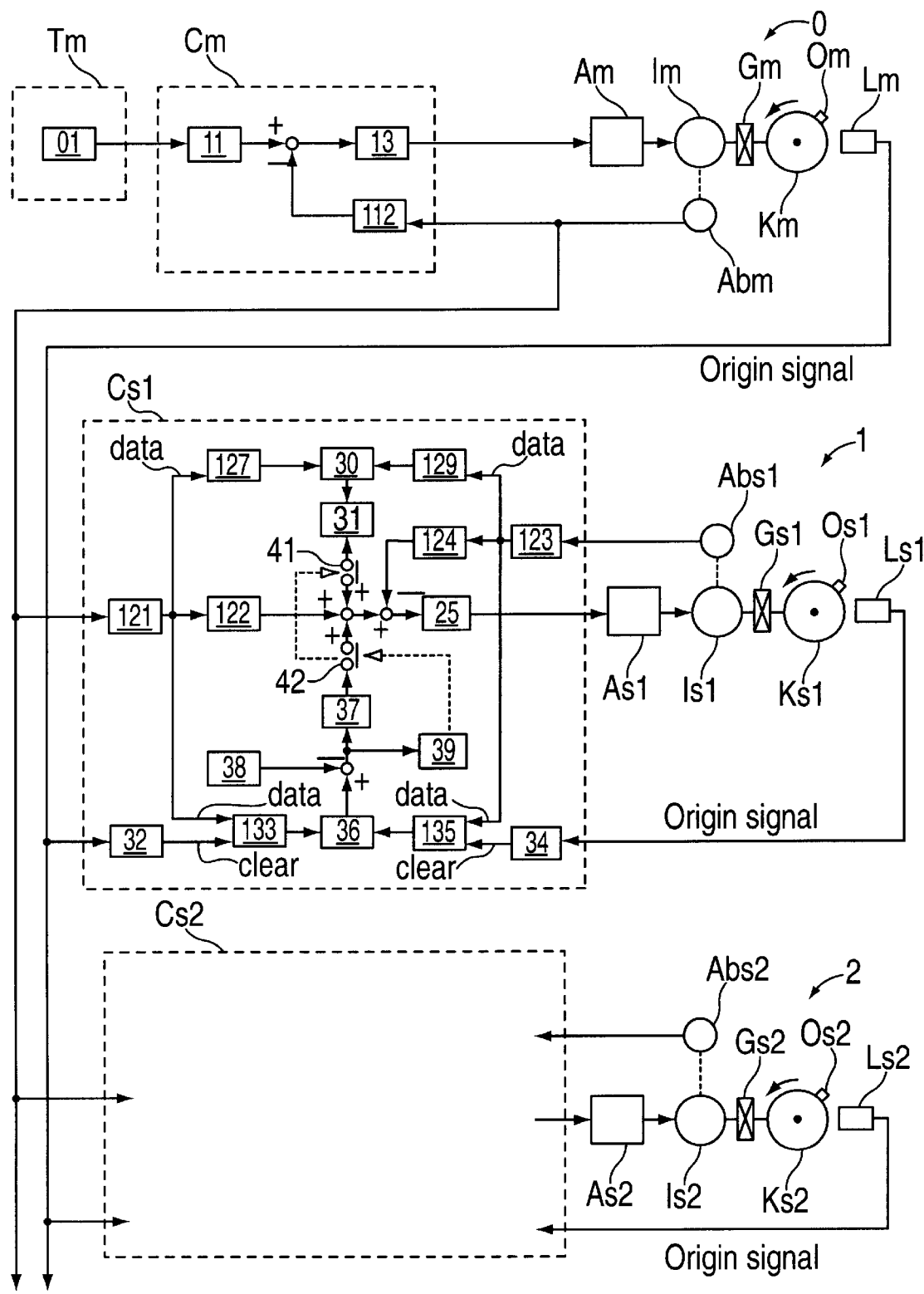
FIG. 5 illustrates an embodiment employing absolute-type rotary encoders in stead of the rotary encoders of FIG. 1.
Figure 6:
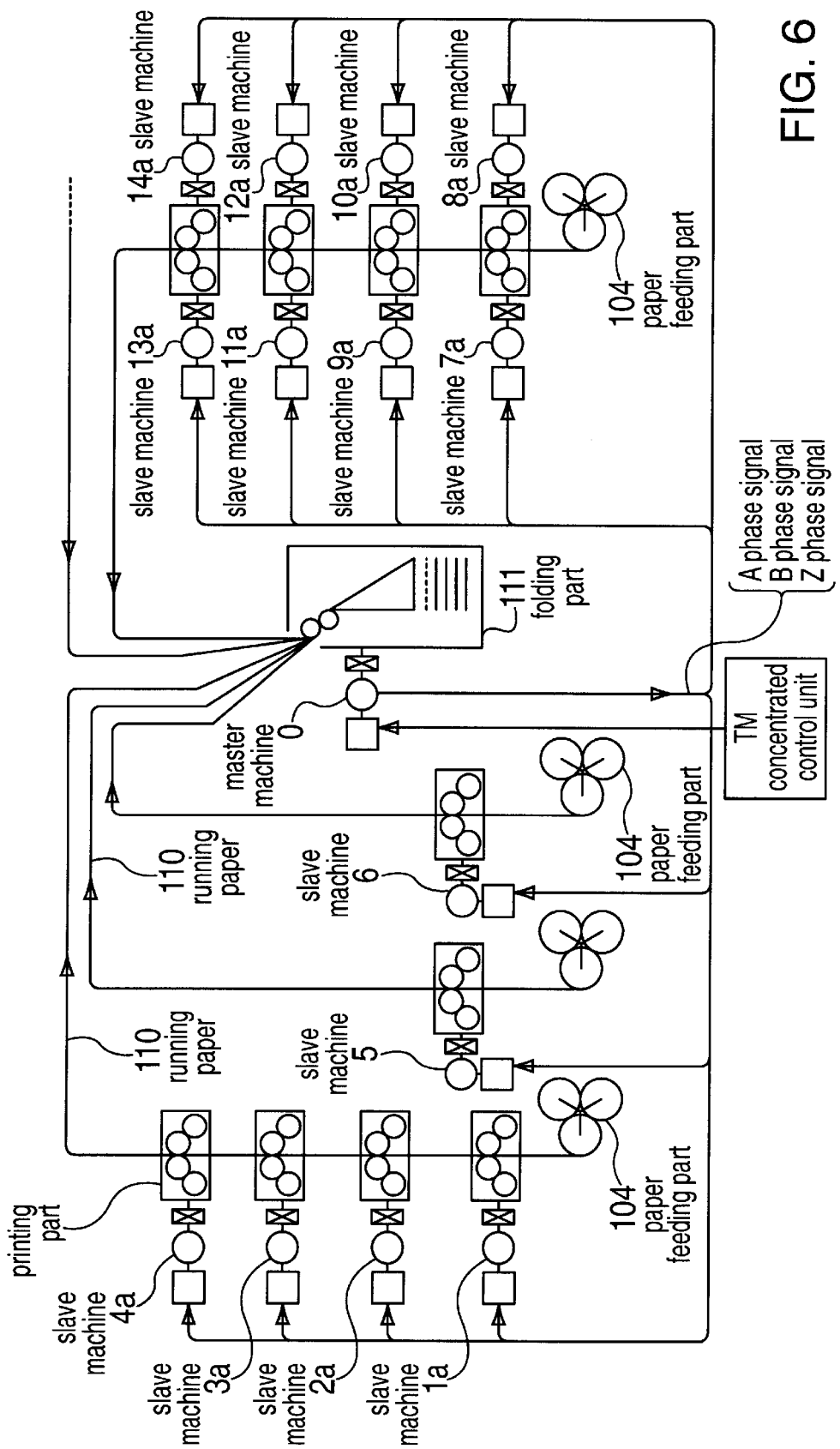
FIG. 6 illustrates an example that the embodiment of FIG. 1 is applied to a shaftless rotary press.

FIG. 1 illustrates a block diagram of the first embodiment according to the present invention. This embodiment illustrates the case that each deceleration device is employed in a master section and a slave section. FIG. 2 and FIG. 3 illustrate explanations of origin matching in FIG. 1. FIGS. 4(*a*) and (*b*) illustrate an operation of a phase shifter in FIG. 1. FIG. 5 illustrates an embodiment employing absolute-type rotary encoders in stead of the rotary encoders shown in FIG. 1. FIG. 6 illustrates an example that the embodiment of FIG. 1 is applied to a shaftless rotary press. FIG. 1.~FIG. 4 correspond to claim 1 and claim 2.

In order to simplify the explanation, the following cases show origin matching and synchronous control between a master section and two slave sections, however plural slave sections may be employed.

In FIG. 1, 0 is a master section, Cm is a control device of the master section, 01 is a rotational frequency setting device, 11 is a rotational frequency detector, 12 is a rotational frequency feedback detector, 13 is a gain amplifier, Am is a master driving device, Im is a master electric motor, Rm is a master rotary encoder attached to the master electric motor Im, Km is a shaft of the master machine, Gm is a deceleration device employed between the master electric motor Im and the shaft Km of the master machine.

1, 2 are slave sections, Cs1 is a control device of the slave section, 21, 23, 26, 28 are receiving interfaces, 22 is a rotational frequency detector, 24 is a rotational frequency feedback detector, 25 is a gain amplifier, 27 is a phase detector of the master electric motor which is comprised of an integrating counter. The phase detector 27 counts A phase pulse and B phase pulse outputted from the master rotary encoder Rm and clears them by Z phase pulse outputted from said rotary encoder Rm.

29 is a phase detector of the slave electric motor which is comprised of an integrating counter. The phase detector 29 counts A phase pulse and B phase pulse outputted from the slave rotary encoder Rs1 and clears them by Z phase pulse outputted from said rotary encoder 30 is a phase deviation detector for the electric motors, which calculates the outputted difference between said phase detector 27 and said phase detector 29, 31 is a gain amplifier, As1 is a slave driving device, Is1 is a slave electric motor, Rs1 is a slave rotary encoder attached to the slave electric motor Is1, Ks1 is a shaft of the slave machine. Gs1 is a deceleration device employed between the slave electric motor Is1 and the shaft Ks1 of the slave machine.

Said master rotary encoder Rm and said slave rotary encoder Rs1 output A phase pulse and B phase pulse in proportion to the rotation, and output Z phase pulse once for one rotation.

32 is a receiving interface, 33 is a phase detector of the shaft of the master machine which is comprised of an integrating counter. The phase detector 33 counts A phase and B phase pulses which are outputted from the master rotary encoder Rm and clears them by the output of an origin detector Lm of the shaft of the master machine.

34 is a receiving interface, 35 is a phase detector of the shaft of the slave machine which is comprised of an integrating counter. The phase detector 35 counts A phase and B phase pulses which are outputted from the slave rotary encoder Rs1 and clears them by the output of an origin detector Ls1 of the shaft of the slave machine.

36 is a phase deviation detector for the shafts of the machines, which calculates the outputted difference between said phase detector 33 of the shaft of the master machine and said phase detector 35 of the shaft of the slave machine. 37 is a gain amplifier, 38 is a phase shifter mentioned later, 39 is a detector for origin matching which closes a switch 41 and opens a switch 42 when phase deviation is within ±ϵ1 as mentioned later.

Om is an origin of the shaft of the master machine, Os1 is an origin of the shaft of the slave machine, Lm is an origin detector of the shaft of the master machine, Ls1 is an origin detector of the shaft of the slave machine.

A control device Cs2 of the slave section 2 equips the same components as the control device Gs1 of the slave section 1. In the following, the operation of the slave section 1 is explained. The operation of the slave section 2 is same as it of the slave section 1.

In FIG. 1, a signal from the rotational frequency setting device 01 is sent to the rotational frequency detector 11 of the control device Cm of the master section 0. The rotational frequency feedback detector 12 detects a rotational frequency feedback by A phase, B phase signal which are outputted from the master rotary encoder Rm.

The outputted signals from the rotational frequency detector 11 and rotational frequency feedback detector 12 are calculated. The deviation thereof is sent to the master driving device Am through the gain amplifier 13. The master driving device Am drives the master electric motor Im. The rotational frequency of the master electric motor Im is controlled so as to accord with the set value of the rotational frequency setting device 01. Then, the shaft Km of the master machine is driven.

The A phase signal and B phase signal outputted from the master rotary encoder Rm are sent to the rotational frequency detector 22 of the control device Cs1 of the slave section 1 through the receiving interface 21. The rotational frequency of the slave section 1 is controlled by the rotational frequency detector 22.

On the other hand, A phase signal and B phase signal outputted from the slave rotary encoder Rs1 attached to the slave electric motor Is1 are sent to the rotational frequency feedback detector 24 through the receiving interface 23. The rotational frequency feedback of the slave electric motor Is1 is detected by rotational frequency feedback detector 24. The outputted signals from the rotational frequency detector 22 and rotational frequency feedback detector 24 are calculated. The deviation thereof is sent to the slave driving device As1 through the gain amplifier 25, said slave driving device As1 drives the slave electric motor Is1. The rotational frequency of the slave electric motor Is1 is controlled so as to accord with the set value of the rotational frequency detector 22. Then, the slave electric motor Is1 is driven synchronously for the master electric motor Im, therefore the shaft Km of the master machine and the shaft Ks1 of the slave machine are controlled synchronously.

The A phase pulse and B phase pulse outputted by the rotation of the master electric motor Im are sent to the phase detector 27 of the master electric motor in the control device Cs1 of the slave section through the receiving interface 21. Z phase signal which is outputted once every one rotation of the master electric motor Im is sent to the phase detector 27 of the master electric motor through the receiving interface 26. The phase detector 27 of the master electric motor integrates the A phase pulse and B phase pulse and clears them by the Z phase signal. That is, the phase detector 27 constantly detects rotational phase of the master electric motor Im by pulses.

In the same manner, the phase detector 29 of the slave electric motor receives the A phase pulse and B phase pulse which are outputted by the rotation of the slave electric motor Is1 through the receiving interface 23 and Z phase signal which is outputted once every one rotation of the slave electric motor Is1 through the receiving interface 28. The phase detector 29 integrates the A phase pulse and B phase pulse and clears them by the Z phase signal. That is, the phase detector 29 detects rotational phase of the slave electric motor Is1 by pulses, constantly.

The outputs of the phase detector 27 of the master electric motor and the phase detector 29 of slave the electric motor are inputted to the phase deviation detector 30 for the electric motors. The phase deviation detector 30 calculates a phase deviation and outputs it. After passing through the gain amplifier 31 and switch 41 which is opened when the synchronous control is ON, the phase deviation is added to or subtracted from the output of the rotational frequency detector 22 as a correction signal.

In FIG. 1, an origin signal of the shaft of the master machine outputted one pulse per one rotation of the shaft Km of the master machine is detected by the origin Om of the shaft Km of the master machine and the origin detector Lm. The signal is sent to the receiving interface 32 of the control device Cs1 of the slave section 1.

In control device Cs1 of the slave section 1, the phase detector 33 of the shaft of the master machine inputs and integrates the A phase, B phase signal which are outputted by the master rotary encoder Rm in proportion to the rotation, and clears them by the origin signal of the shaft of the master machine which is inputted through the receiving interface 32. That is, the phase detector 33 constantly detects the rotational phase of the shaft Km of the master machine.

In the same manner, an origin signal of the shaft of the slave machine outputted one pulse per one rotation of the shaft Ks1 of the slave machine is detected by the origin Os1 of the shaft Ks1 of the slave machine and the origin detector Ls1. The signal is sent to the receiving interface 34 of the control device Cs1 of the slave section 1. Then, the phase detector 35 of the shaft of the slave machine inputs and integrates the A phase signal and B phase signal which are outputted by the slave rotary encoder Rs1 in proportion to the rotation, and clears them by the origin signal of the shaft of the slave machine which is inputted through the receiving interface 34. That is, the phase detector 35 constantly detects the rotational phase of the shaft Ks1 of the slave machine.

The outputs of the phase detector 33 of the shaft of the master machine and the phase detector 35 of the shaft of the slave machine are inputted to the phase deviation detector 36 for the shafts of the machines. The phase deviation detector 36 calculates a phase deviation between the shaft of the master machine and the shaft of the slave machine, then the phase deviation is inputted to the gain amplifier 37 and the detector 39 for origin matching.

The detector 39 for origin matching watches the output of the phase deviation detector 36 for the shafts of the machines, in the case that the target accuracy for origin matching is, for example, $\epsilon 1$ pulse and when the following equation (6) is satisfied, the detector 39 opens the switch 41 and closes the switch 42.

$$\epsilon 1 \leq |\text{the output of the phase deviation detector 36}| \quad (6)$$

Then, the phase deviation between the shafts of the machines is added to the output of the rotational frequency detector 22 through the gain amplifier 37, the added value is calculated with the output of the rotational frequency feedback detector 24 in order to match origin.

According to this correction for the origin matching, when the following equation (7) is satisfied, the detector 39 for origin matching closes the switch 41 and opens the switch 42. The control is switched over the synchronous control by the route through the phase deviation detector 30 for the electric motors and so on.

$$|\text{the output of the phase deviation detector 36}| < \epsilon 1 \quad (7)$$

The operation for the origin matching is explained referring to FIG. 2 and FIG. 3. Here, the deceleration rate 1/N of the master deceleration device Gm and the slave deceleration device Gs1 in FIG. 2 and FIG. 3 is 1/4 (N=4) in order to simplify the explanation.

Figure 28:
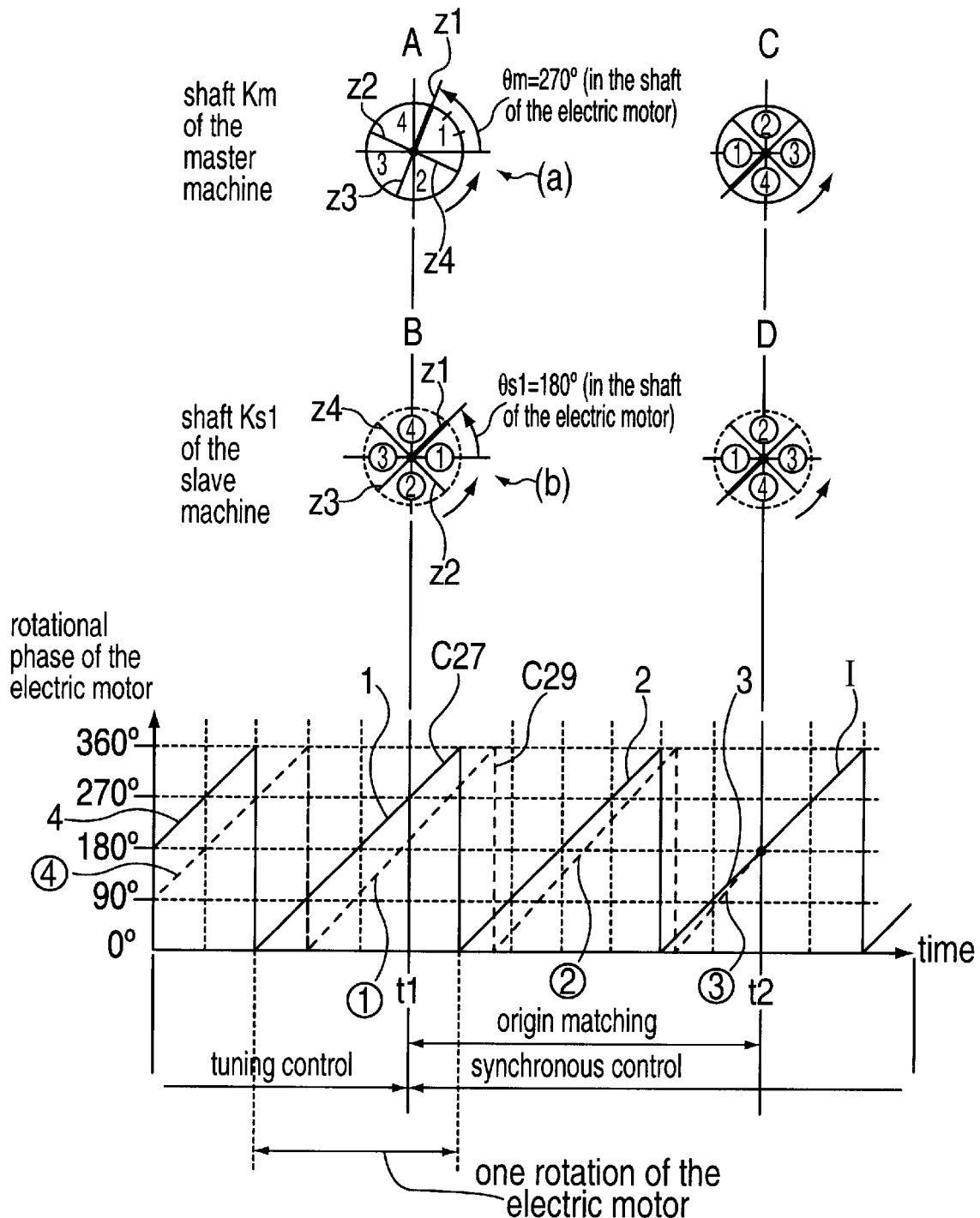
FIG. 28 illustrates an origin matching (in the case that the origin is matched normally).

In FIG. 2 and FIG. 3, same as the aforementioned FIG. 28, a circle (a) of FIG. 2A shows the modeled shaft Km of the master machine. The numbers 1, 2, 3 and 4 written in the circle (a) show that 4 rotations of the master electric motor Im make one rotation of the shaft Km of the master machine. The lines z1, z2, z3 and z4 show projections of Z phase position of the master rotary encoder Rm on the circle (a). The line z1 is shown with thick line as a base of one rotation of the shaft Km of the master machine.

FIG. 2-A shows the origin Om of the shaft of the master machine and the origin detector Lm of the shaft of the master machine. Also, in the same manner, in FIG. 2-B a circle (b) shows the shaft Ks1 of the slave machine, ①~④ show rotations of the slave electric motor Is1 and z1, z2, z3 and z4 show Z phases. FIG. 2-B also shows the origin Os1 of the shaft of the slave machine and the origin detector Ls1 of the shaft of the slave machine. FIG. 3 shows wave patterns corresponding to each part of FIG. 2. ((1)~(4) shown with broken lines in FIG. 3 correspond to those in FIG. 2.)

Here, C27, C29, C33 and C35 in FIG. 2 show time transition by converting the output of the phase detector 27 of the master electric motor, the output of the phase detector 29 of the slave electric motor, the output of the phase detector 33 of the shaft of the master machine and the output of the phase detector 35 of the shaft of the slave machine to angle, respectively. (Note that the outputs of these detectors 27, 29, 33 and 35 are number of pulses originally, however they are converted to angle in order to simplify the explanation.)

FIG. 3-c illustrates the origin signal outputted by the origin detector Lm of the shaft of the master machine so as to correspond to the clear operation of said C33. FIG. 3-d illustrates the Z phase signal of the master rotary encoder Rm so as to correspond to the clear operation of said C27. FIG. 3-e and FIG. 3-f illustrate A phase signal and B phase signal of the master rotary encoder Rm, respectively.

In the same manner, FIG. 3-g illustrates the origin signal outputted by the origin detector Ls1 of the shaft of the slave machine so as to correspond to the clear operation of said C35. FIG. 3-h illustrates the Z phase signal of the slave rotary encoder Rs1 so as to correspond to the clear operation of said C29. FIG. 3-i and FIG. 3-j illustrate A phase signal and B phase signal of the slave rotary encoder Rs1, respectively.

Figure 29:
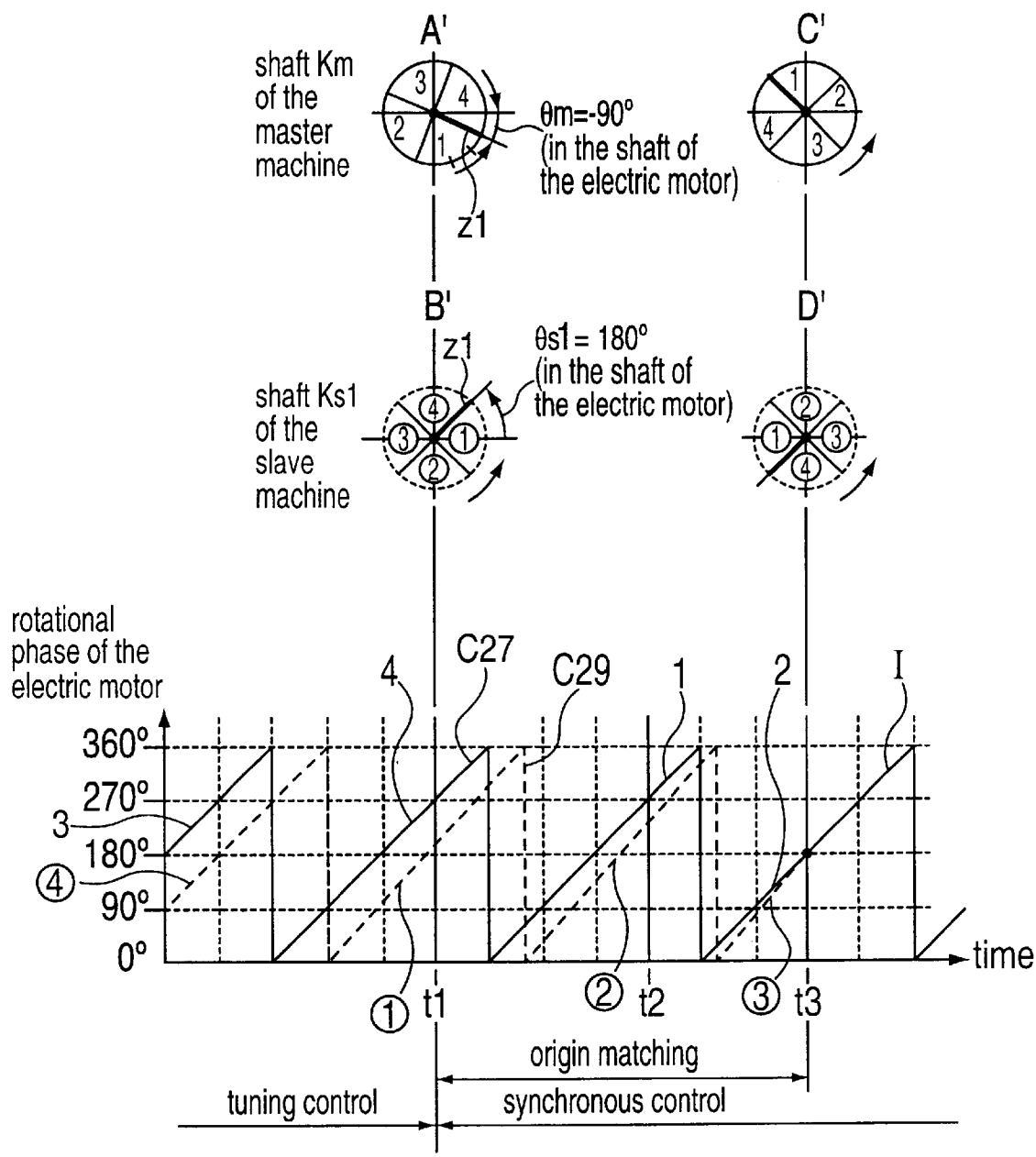
FIG. 29 illustrates an origin matching (in the case that the origin matching is failed).

In FIG. 2-A, same as the prior art of FIG. 29-A', the phase $\theta$m of the shaft Km of the master machine is $-90°$ in the shaft of the electric motor, in FIG. 2-B, same as the conventional mode of FIG. 29-B', the phase $\theta$s1 of the shaft Ks1 of the slave machine is $+180°$ in the shaft of the electric motor. As $(\theta m - \theta s1) = -270°$, it is the case of the aforementioned equation (3).

Also, FIG. 2-A illustrates an example that the true origin of the shaft Km of the master machine is Z phase position (the position shown by z1 in FIG. 2-A) of the master rotary encoder Rm between "4" and "1" which shows a rotation of the master electric motor Im. The origin Om of the shaft of the master machine is fixed at 30° forward compared to the true origin in the shaft of the electric motor (30°/4=7.5° in the shaft of the machine).

In the same manner, FIG. 2-B illustrates an example that the true origin of the shaft Ks1 of the slave machine is Z phase position (the position shown by z1 in FIG. 2-B) of the slave rotary encoder Rs1 between "④" and "①" which shows a rotation of the slave electric motor Is1. The origin Os1 of the shaft of the slave machine is fixed at 30° behind compared to the true origin in the shaft of the electric motor (7.5° in the shaft of the machine). As the origin Om of the shaft of the master machine and the origin Os1 of the shaft of the slave machine are fixed separately from respective rotary encoders, installation errors of this kind can be normally occurred. When the installation error of the origin of the shaft of the master machine is $\Delta\theta$m, and the installation error of the origin of the shaft of the slave machine is $\Delta\theta$s, the above-mentioned example is shown as following equation (8).

$$\Delta\theta m = +30° \text{ (in the shaft of the electric motor)}$$

$$\Delta\theta s = -30° \text{ (in the shaft of the electric motor)} \quad (8)$$

Referring to FIG. 2 and FIG. 3, an origin matching according to the present invention is explained. When the master section 0 and the slave section 1 are driven, they are driven under tuning control at first. At time t1, the shaft Km of the master machine starts the origin matching, for example, at phase shown in FIG. 2-A. The shaft Ks1 of the slave machine starts origin matching, for example, at phase shown in FIG. 2-B.

That is, at time t1, when the relation between the output of the phase deviation detector 36 for the shafts of the machines and the accuracy ∈1 for the origin matching of the detector 39 are shown by said equation (6), switch 41 is opened and switch 42 is closed by the detector 39 as mentioned above, and the origin matching is started.

As illustrated time t1~t2 in FIG. 2, the output C35 of the phase detector 35 of the shaft of the slave machine is controlled so as to get near the output C33 of the phase detector 33 of the shaft of the master machine. At this time, the output C29 of the phase detector 29 of the slave electric motor gets near the output C27 of the phase detector 27 of the master electric motor. At time t2, the output of the phase deviation detector 36 of the shafts of the machines and the accuracy ∈1 for origin matching satisfy said equation (7), then the control between the master section and the slave section is switched over a synchronous control by the route through the phase deviation detector 30 for the electric motors.

At the time t2, as a deviation of the rotational position between "1" of the master electric motor Im in FIG. 2-C and "①" of the slave electric motor Is1 in FIG. 2-D is within ±180° in the shaft of the electric motor, as shown in FIG. 2, said equation (2) is satisfied. Therefore, even when the master section and the slave section are switched over the synchronous control by the route through the phase deviation detector 30 for the electric motors an origin can be matched precisely without causing phase difference shown in the prior art with said equation (4).

The accuracy for the origin matching ∈1 is shown by the following equation (9) when number of pulses per one rotation of the slave rotary encoder Rs1 is Rsmax and an allowable coefficient is S (S is less than 1).

$$\epsilon1 = R s \max \times (180°/360°) \times S \qquad (9)$$

However, as mentioned in the explanation of said equation (8), the installation error $\Delta\theta m$ of the origin of the shaft of the master machine and installation error $\Delta\theta s1$ of the origin of the shaft of the slave machine can be practically occurred. Consequently, even if the origin is matched accurately by the operation of the phase deviation detector 36 for the shafts of the machines, the phase difference of ($\Delta\theta m - \Delta\theta s1$) between the true origin of the shaft of the master machine and it of the shaft of the slave machine remains. By correcting the equation (9) with $\Delta\theta m$ and $\Delta\theta s1$, the following equation (10) is given. This ∈1 is a target accuracy for origin matching.

$$\epsilon1 = [R s \max \times \{180° - (\Delta\theta m - \Delta\theta s1)\}/360°] \times S \qquad (10)$$

Here, Rsmax is number of pulses per one rotation of the slave rotary encoder Rs1, $\Delta\theta m$ is the installation error of the origin of the shaft of the master machine, $\Delta\theta s1$ is the installation error of the origin of the shaft of the slave machine and S is an allowable coefficient, less than 1.

As mentioned above, the accuracy ∈1 of the detector 39 for the origin matching by the route through the phase deviation detector 36 is defined by said equation (10), the phase deviation in the shaft of the electric motor is less than 180° certainly at the end of the after-mentioned origin matching mode 1, consequently, the origin can be matched without causing the phase difference shown in the equation (4) of the prior art.

The first embodiment of the present invention is characterized that the phase deviation detector 36 for the shafts of the machines and the phase deviation detector 30 for the electric motors are employed. And even when the deceleration devices are employed the origin can be matched accurately by the route through the phase deviation detector 36 and so on.

That is, the accuracy ∈1 for the origin matching is defined by said equation (9) or said equation (10). When the deceleration devices with deceleration rate of 1/N are employed the origin can be matched accurately without causing any phase difference of 360°/N, (360°×2)/N ... {360°×(N−1)}/N.

A rotary encoder is made precisely with optical and electronic technique, moreover it is airtighted. Therefore outputted Z phase signal from the rotary encoder is very accurate and reliable. On the other hand, an origin of the shaft of the machine and a detector for origin of the shaft of the machine are separately attached to a shaft of the machine and they are not airtighted. Taking this matter into consideration, the origin matching, so to speak rough alignment, is firstly performed by the route through the phase deviation detector for the shafts of the machines, continuously, the control is switched over a very accurate and reliable synchronous control by the route through the phase deviation detector 30 for the electric motors.

According to the above-mentioned feature, even if plural electric motors are driven at any rotational frequency of low or high, or they are accelerated or decelerated, after the origin matching is completed precisely, a very accurate and reliable synchronous control is realized continuously without stopping the electric motors, therefore the synchronous control device according to the present invention is of practical use.

In the above-mentioned explanation, the phase shifter 38 shown in FIG. 1 is not stated. By virtue of the phase shifter 38 the origin matching after time t2 in FIG. 2 can be performed smoothly without hunting.

The embodiment providing said phase shifter 38 corresponds to the claim 2 of the present invention.

In FIG. 2 and FIG. 3, the master section and the slave section are driven under tuned control, then the origin matching is started at time t1 by the route through the phase deviation detector 36 for the shafts of the machines. That is, by the operation of the detector 39 for origin matching, the switch 42 is closed at the same time the switch 41 is opened, the origin matching according to the phase deviation detector 36 for the shafts of the machines is performed. (it is referred to an origin matching mode 1)

At time t2, as the phase deviation for the shafts of the machines is within ±∈1 and said equation (7) is satisfied, the switch 41 is closed at the same time the switch 42 is opened by the operation of the detector 39 for origin matching, and the synchronous control according to the phase deviation detector 30 for the electric motors is performed, then the origin matching is performed continuously. (it is referred to an origin matching mode 2)

And according to the synchronous control by the route through the phase deviation detector 30 for the electric motors, the phase deviation for the shaft of the electric motors is within the target off ±∈2, the origin matching is completed, then the control is switched over a very accurate synchronous control mode continuously (synchronous control mode).

Here, the origin matching mode 1 is a synchronous control between the shaft of the master machine and the shaft of the slave machine, the origin matching mode 2 is a synchronous control between the master electric motor and slave electric motor. When using $\Delta\theta m$ and $\Delta\theta s1$ referred in said equation (8), Δθm is a discrepancy between the shaft of the master machine and the shaft of the master electric motor, Δθs1 is a discrepancy between the shaft of the slave machine and the shaft of the slave electric motor. Therefore when a discrepancy between the shafts of the machines (the phase deviation detector 36) and the shafts of the electric motors (the phase deviation detector 30) is θa, θa is given in following equation (11).

$$\theta a = \Delta\theta m - \Delta\theta s1 \quad (11)$$

When the origin matching mode 1 is shifted to the origin matching mode 2 by operation of the phase shifter 38 shown in FIG. 1 for correcting said θa, the control can be shifted to the synchronous control mode without hunting.

Figure 4A:
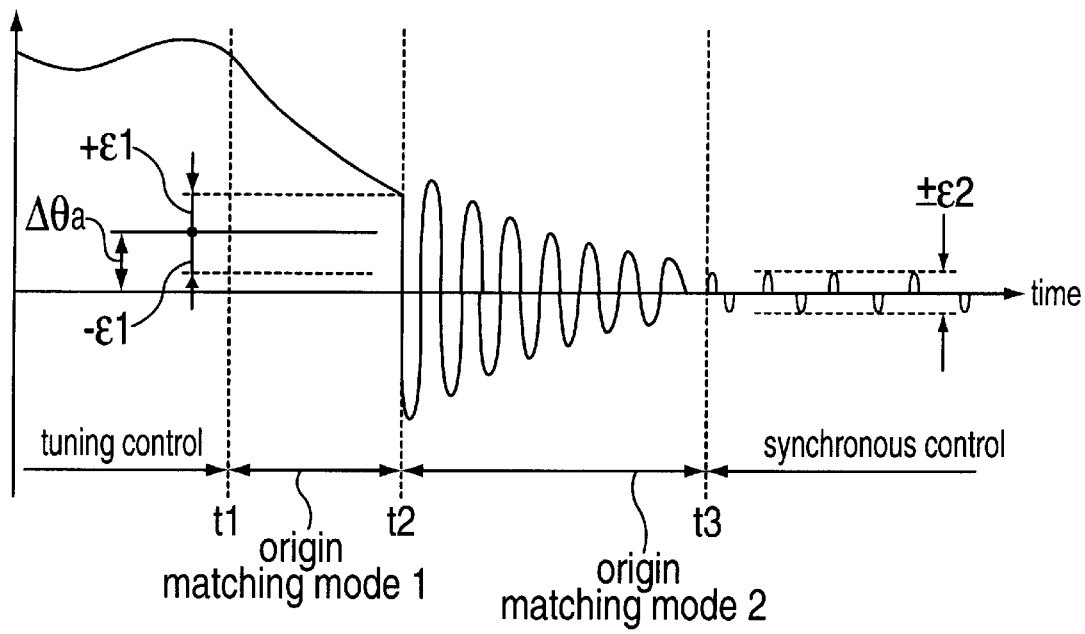
FIG. 4 illustrates the operation of a phase shifter of FIG. 1.
Figure 4B:
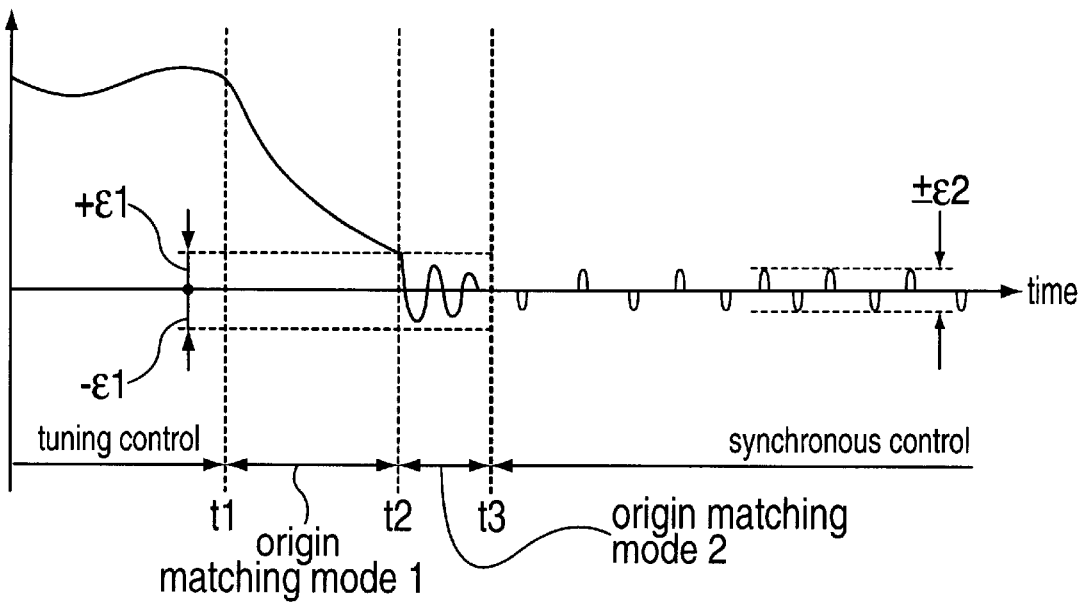

FIG. 4(a) and FIG. 4(b) illustrate time transition of the phase deviation between the shaft of the master electric motor and the shaft of the slave electric motor when the control is shifted to the synchronous control mode from the origin matching mode 1 and 2 in the embodiment of FIG. 1. FIG. 4(a) illustrates the transition of the phase deviation without the phase shifter 38 and FIG. 4(b) illustrates the transition of the phase deviation with the phase shifter 38. Time t1 and t2 in FIG. 4(a) and FIG. 4(b) correspond to time t1 and t2 in FIG. 2. At time t3, the phase deviation for the shaft of the electric motors is within ±2 of target value, so that the synchronous control mode is started.

In FIG. 4(a), the output of the phase deviation detector 36 for the shafts of the machines is within ±ε1 at time t2, the control is switched over by the route through the phase deviation detector 30 for the electric motors. At this time, discrepancy Δθa between the shafts of the machines and the shafts of the electric motors remains as an offset.

Also, in FIG. 1, the gain amplifier 37 inputting the output of the phase deviation detector 36 for the shafts of the machines is set at low gain because the gain amplifier 37 is for the origin matching, so to speak, the coarse synchronous control. On the other hand, the gain amplifier 31 inputting the output of the phase deviation detector 30 for the electric motor is set at high gain so as to maintain the fine synchronous control (for example, accuracy for the synchronous control, ±ε2=±5 pulses).

Therefore control unit is shifted to the gain amplifier 31 with high gain after time t2 from the gain amplifier 37 before time t2 and offset Δθa remains. Consequently, hunting between time t2 and t3 shown in FIG. 4(a) is caused, or the phase deviation is uncontrolled.

As shown in FIG. 1, a phase shifter 38 having a setting discrepancy of Δθa between the shafts of the machines and the shafts of the electric motors is provided, and the output of the phase shifter 38 is subtracted from the output of the phase deviation detector 36 for the shafts of the machines. Accordingly, the discrepancy Δθa can be dissolved.

That is, as shown in FIG. 4(b), the discrepancy Δθa between the shafts of the machines and the shafts of the electric motors is canceled, so that the discrepancy between the shaft of the master electric motor and the shaft of the slave electric motor is ±ε1 at the time when the origin matching mode 1 is switched over the origin matching mode 2. Consequently, the hunting after time t2 is dissolved and the origin matching mode 1 can be shifted to the origin matching mode 2 stably.

As mentioned above, Δθa between the shafts of the machines and the shafts of the electric motors can be canceled by providing the phase shifter 38, the phase discrepancy between the shafts of the machines and the shafts of the electric motors can be dissolved even if the origin Om of the shaft of the master machine and the origin Os1 of the shaft of the slave machine are in any position when the deceleration device is employed between the electric motor and the shaft of the machine.

In FIG. 1 the case employing rotary encoder Rm and the incremental encoder Rs1 is explained, however an absolute-type encoder may be employed.

FIG. 5 illustrates the modified embodiment of FIG. 1 by employing the absolute-type encoder in stead of the incremental encoder.

In FIG. 5, Abm is an absolute-type rotary encoder (in the following, referred to absolute-type encoder) attached to the master electric motor Im, Abs1 is an absolute-type rotary encoder attached to the slave electric motor Is1. The absolute-type rotary encoders Abm and Abs1 output each digital signal corresponding to their rotational angle and the outputs are reset to 0 every one rotation.

The output of the absolute-type encoder Abm, which is attached to the master electric motor Im, is sent to a differential register 112 in the control device Cm of the master section. The differential register 112 outputs the difference between the last output and the present output of the absolute-type encoder Abm. That is, the differential register 112 generates the outputs corresponding to the rotational frequency signal of the master electric motor Im.

After the output of the differential register 112 and the output of the rotational frequency detector 11 are calculated, it is sent to the master driving device Am. According to this, the rotational frequency of the master electric motor Im is controlled so as to be accord with the setting value outputted by the rotational frequency setting device 01.

Also, the output of the absolute-type encoder Abm is sent to a register 127, a differential register 122 and a differential accumulator 133 through the interface 121 of the control device Cs1 of the slave section.

The register 127 keeps the value of signal corresponding to the rotational angle of the master electric motor Im every time when the signal is sent. The differential register 122 outputs the difference between the last output and the present output of the absolute-type encoder Abm. That is, the differential register 122 generates the output corresponding to the rotational frequency signal of the master electric motor Im.

The differential accumulator 133 is comprised of a differential register same as the above-mentioned differential register and an accumulator accumulating the output of the differential register. The differential accumulator 133 calculates the difference between the last output and the present output every time when the signal corresponding to the rotational angle of the master electric motor Im is sent from the absolute-type encoder Abm and integrates the difference. The integrated value is cleared when the origin detector Lm of the shaft of the master machine outputs an origin signal.

The output of the absolute-type encoder Abs1, which is attached to the slave electric motor Is1, is sent to a register 129, a differential register 124 and a differential accumulator 135 through the interface 123 of the control device Cs1 of the slave section.

The register 129 maintains the value of signal corresponding to the rotational angle of the slave electric motor Is1 every time when the signal is sent. The differential register 124 outputs the difference between the last output and the present output of the absolute-type encoder Abs1. That is, the differential register 124 generates the output corresponding to the rotational frequency signal of the slave electric motor Is1.

The differential accumulator 135 is comprised of a differential register same as the differential accumulator 133 and an accumulator accumulating the output of the differential register. The differential accumulator 135 calculates the difference between the last output and the present output every time when the signal corresponding to the rotational angle of the slave electric motor Is1 is sent from the absolute-type encoder Abs1 and integrates the difference. The integrated value is cleared when the origin detector Ls1 of the shaft of the slave machine outputs an origin signal.

Therefore, the outputs of the differential register 122 and the differential register 124 are signals corresponding to the rotational frequency signal of the master electric motor Im and the slave electric motor Is1, respectively. As mentioned above, the rotational frequency of the slave electric motor Is1 is controlled by the rotational frequency of the master electric motor Im.

The time transition at converting the outputs of the register 127, 129 and the differential accumulator 133, 135 to angle is same wave-shape as C27, C29, C33 and C35 shown in FIG. 2 and as explained in FIG. 2 and FIG. 3, the origin is samely matched as the embodiment of FIG. 1.

Figure 23A:
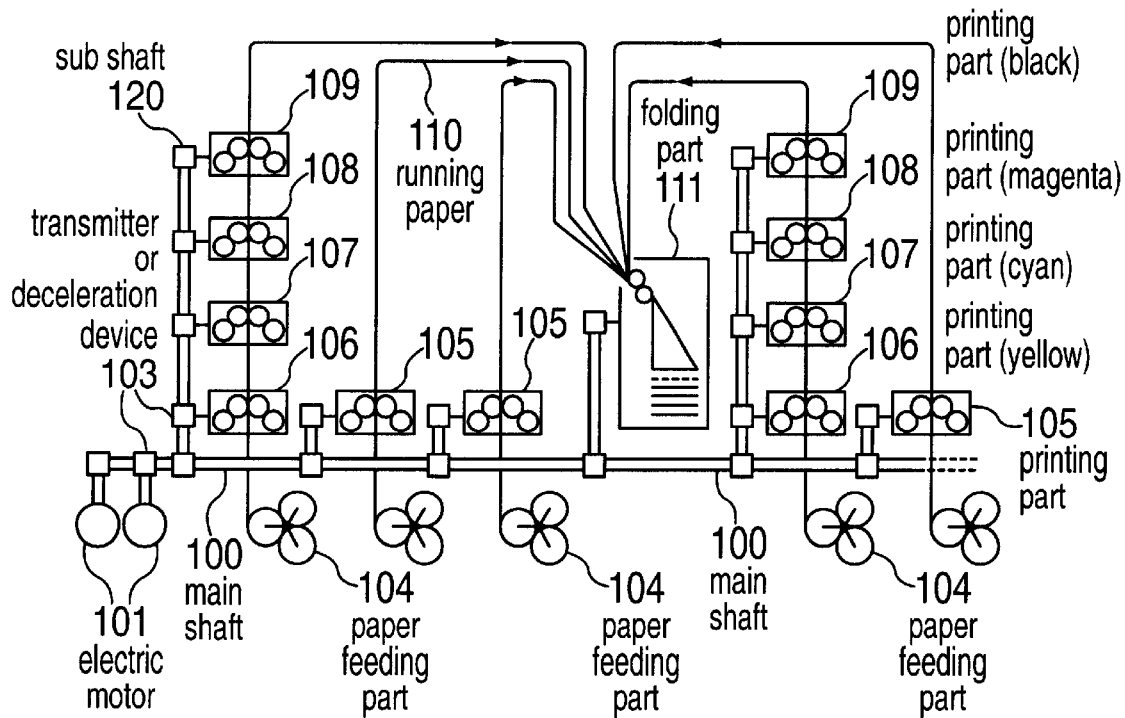
FIG. 23 illustrates a conventional rotary press.
Figure 23B:
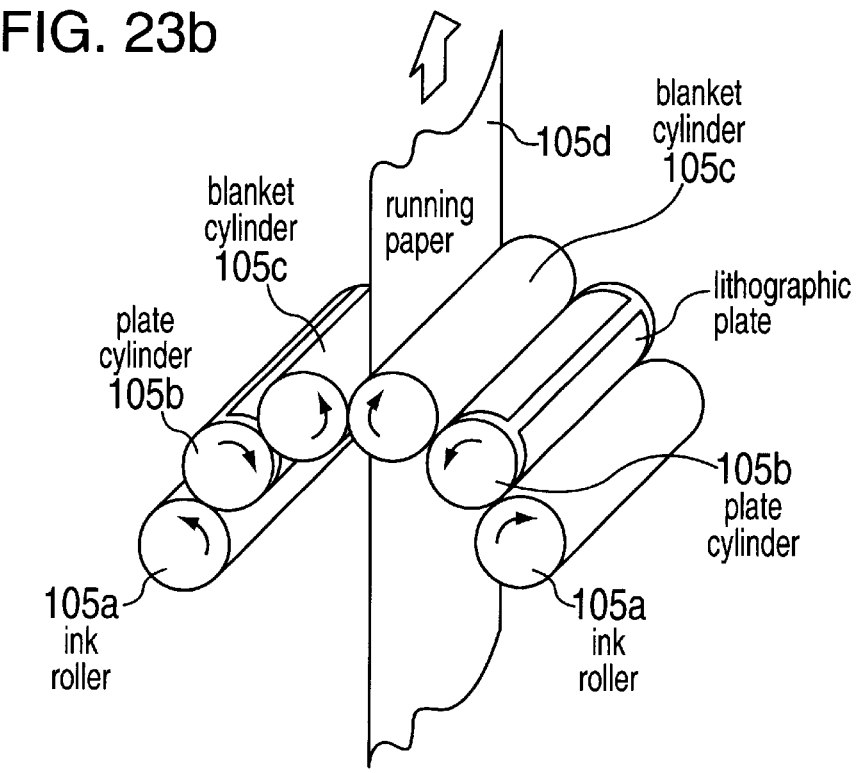
Figure 24:
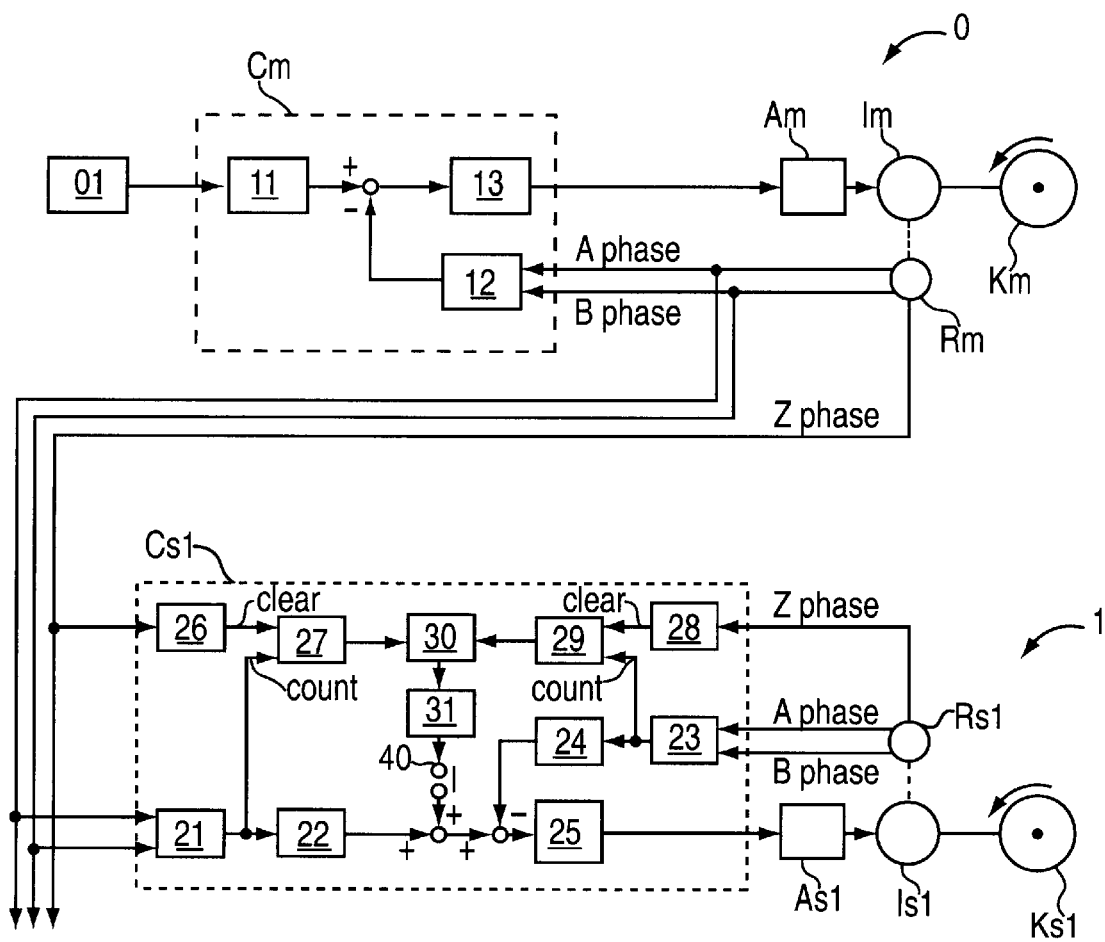
FIG. 24 illustrates a block diagram of a conventional synchronous control device.
Figure 25:
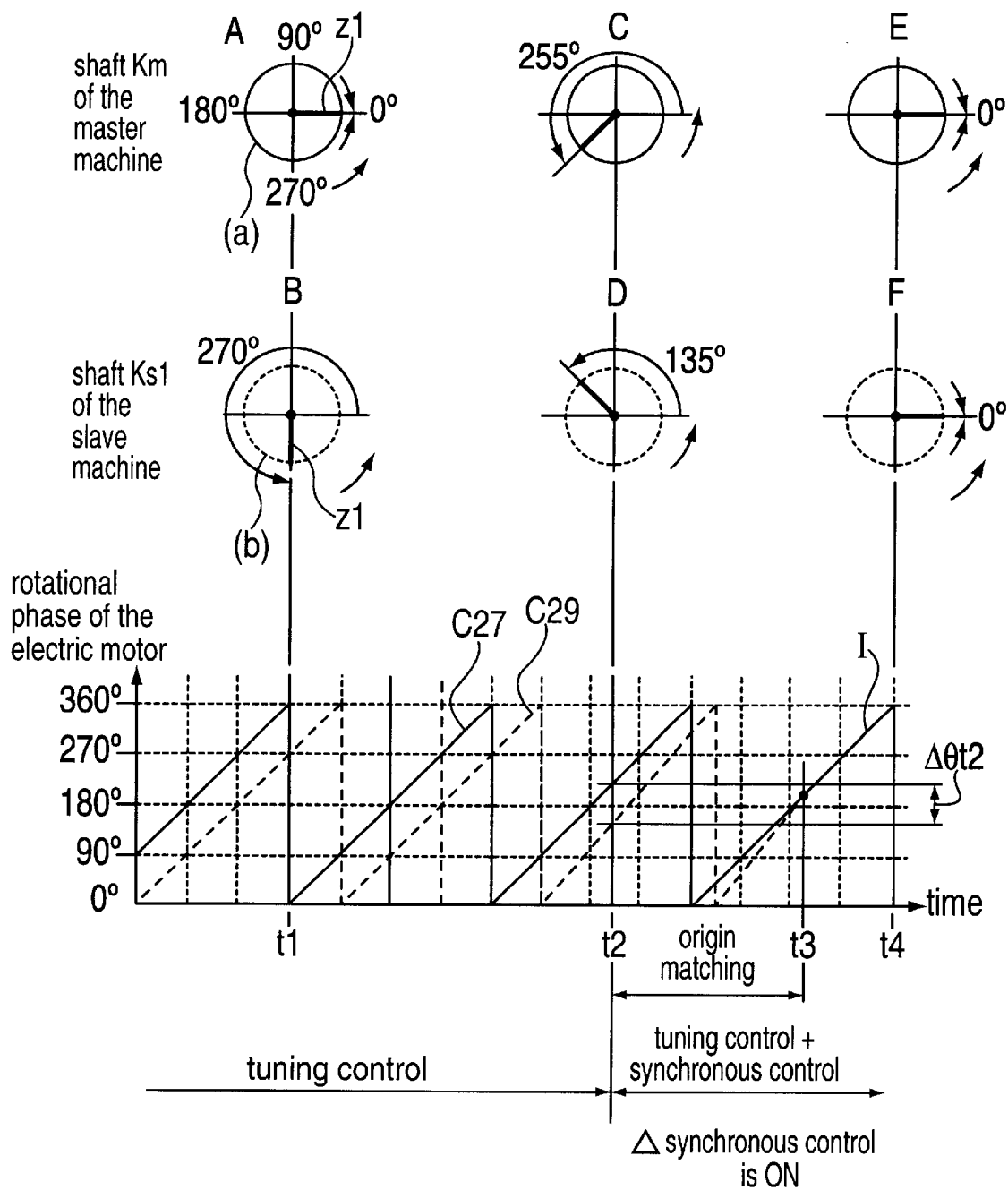
FIG. 25 illustrates the operation the synchronous control device of FIG. 24.

FIG. 6 illustrates a shaft-less rotary press which the above-mentioned embodiment is applied. As shown in FIG. 6, a holding part 111 is as the master section 0, the printing parts are as the slave sections 1a~14a. The slave sections 1a~14a are controlled synchronously with the master section 10 without the shafts shown in FIG. 23.

According to the present invention, an origin matching between the plural electric motors can be completed precisely and stably even if they are driven at low or high rotational frequency, or they are accelerated or decelerated, so that the plural electric motors can be shifted an accurate synchronous control continuously. Therefore the synchronous control of a shaftless rotary press, which is impossible in the prior art can be realized.

(2) Embodiment 2

Figure 7:
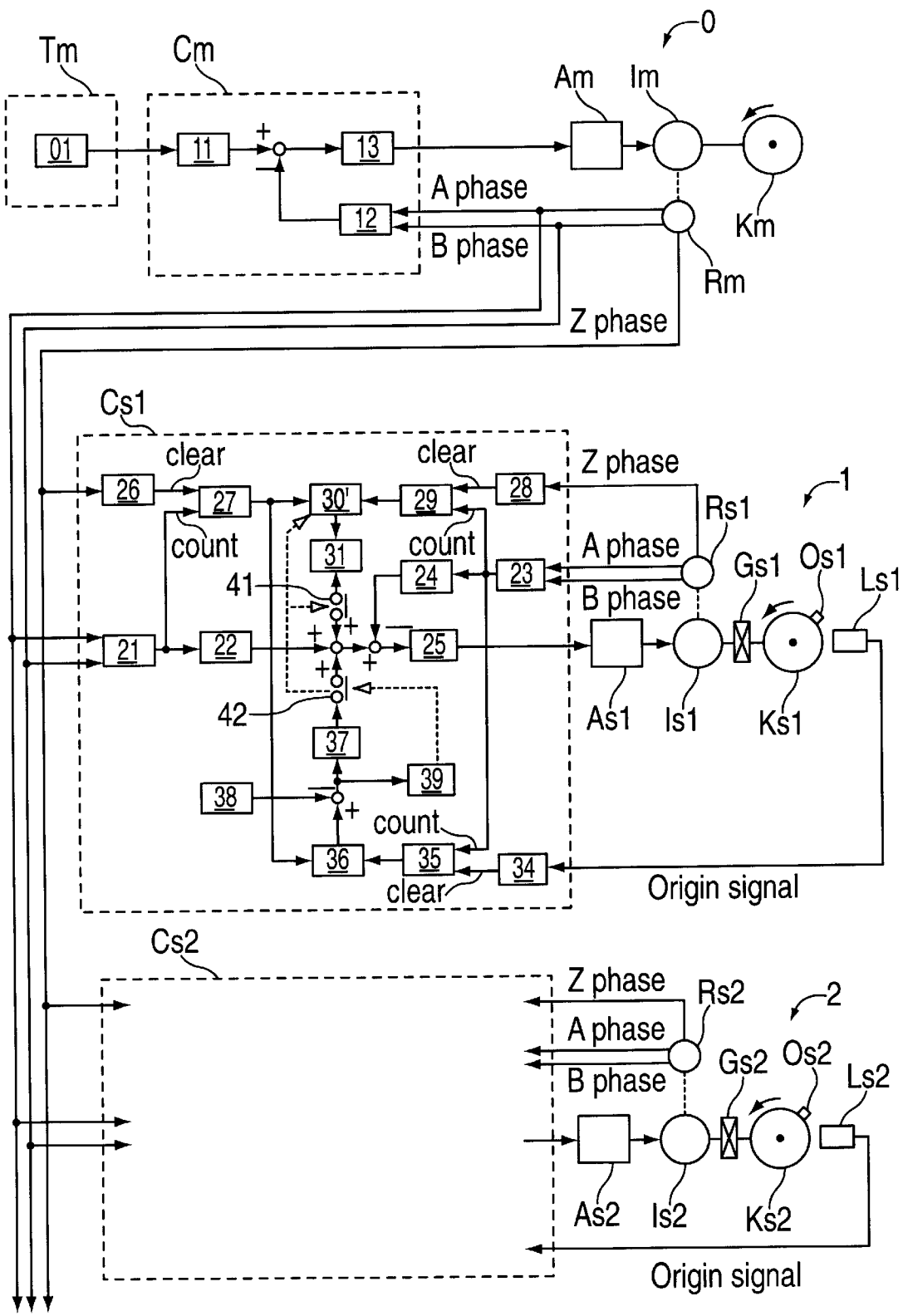
FIG. 7 illustrates a block diagram of the second embodiment according to the present invention.
Figure 8:
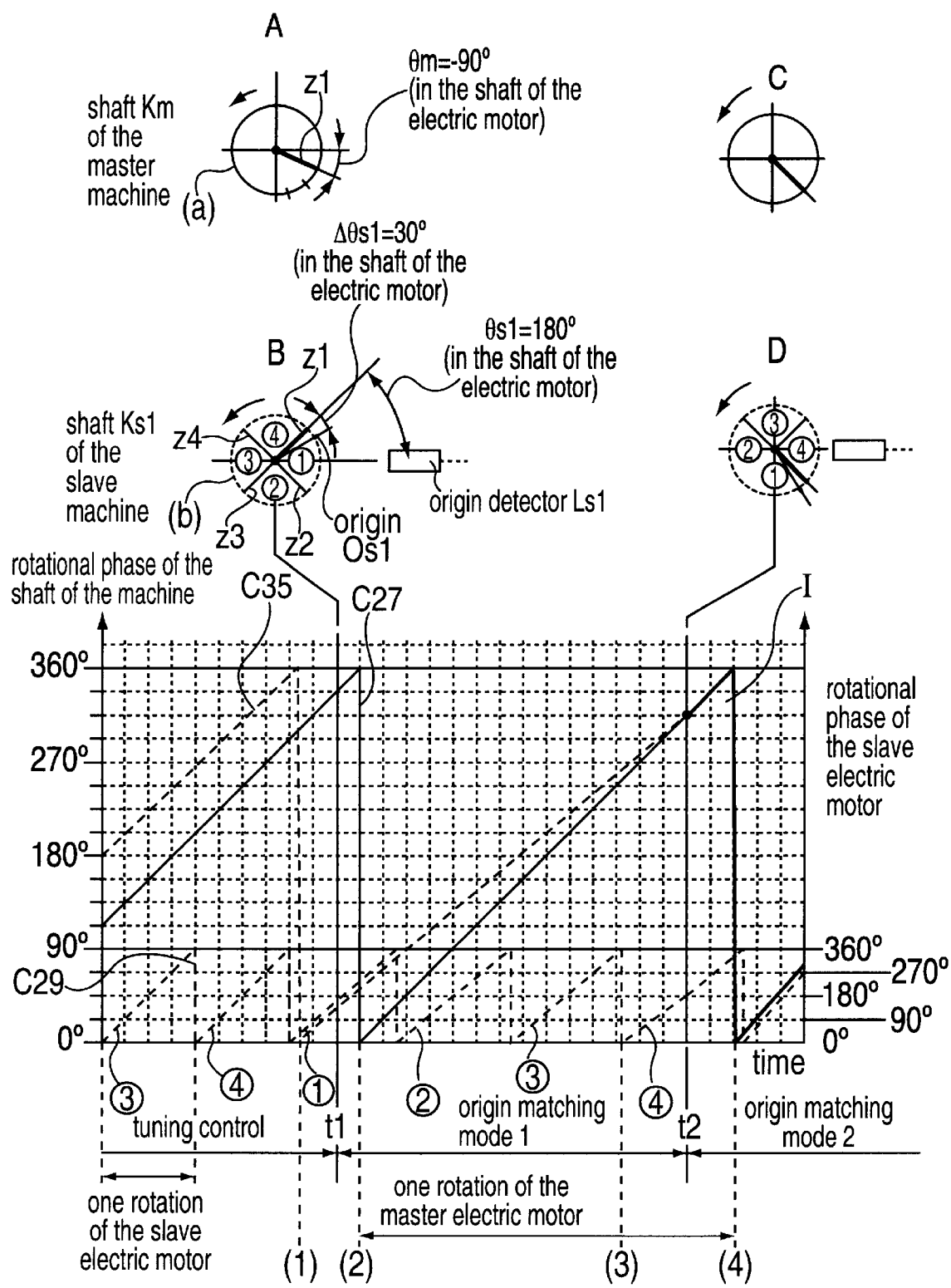
FIG. 8 illustrates the operation of FIG. 7. (1)
Figure 9:
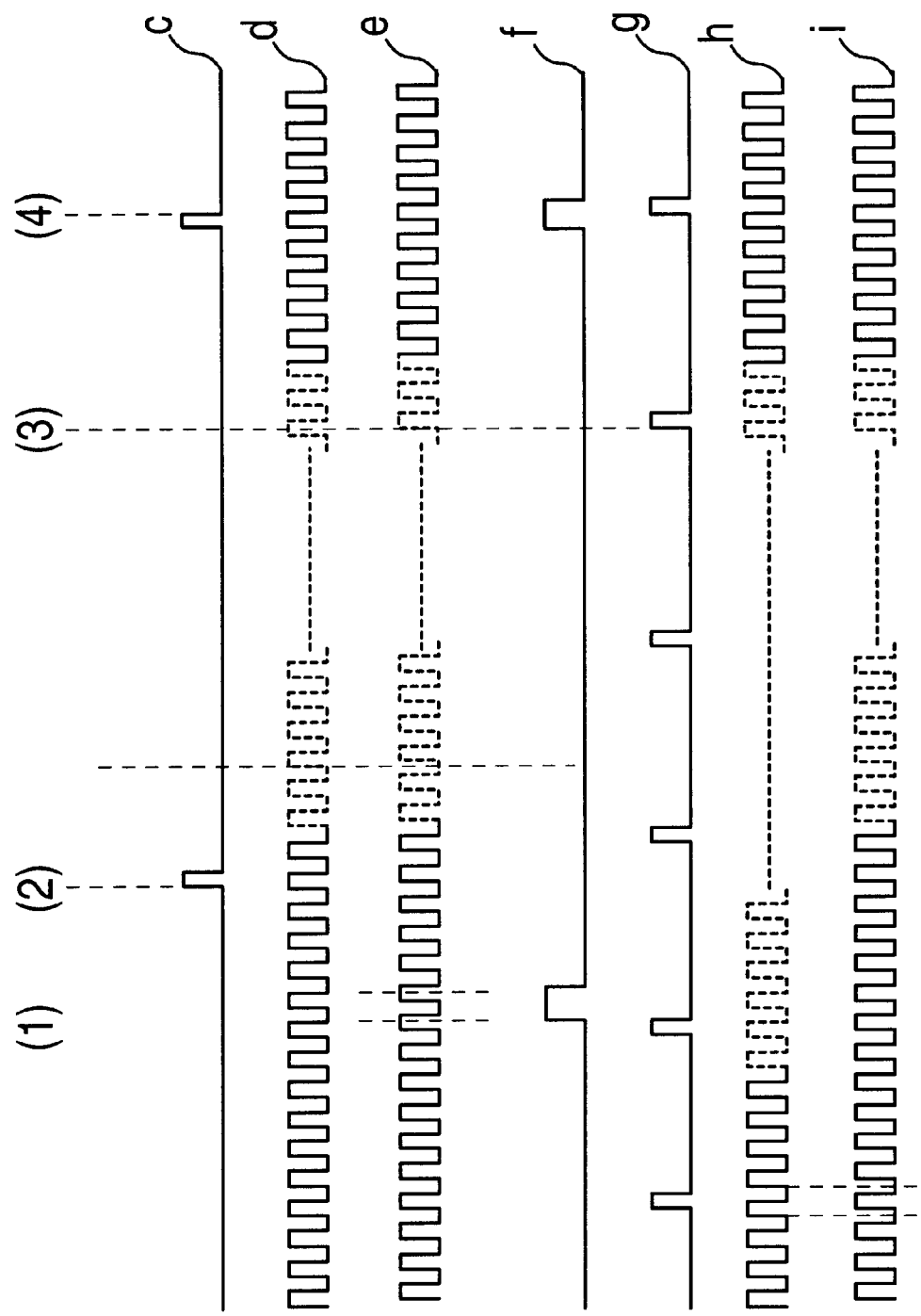
FIG. 9 illustrates the operation of FIG. 7. (2)

FIG. 7 illustrates a block diagram of the second embodiment according to the present invention. In this embodiment, a deceleration device is employed not in the master machine but in the slave machine. FIG. 8 and FIG. 9 illustrate explanation for an origin matching of FIG. 7.

Figure 10:
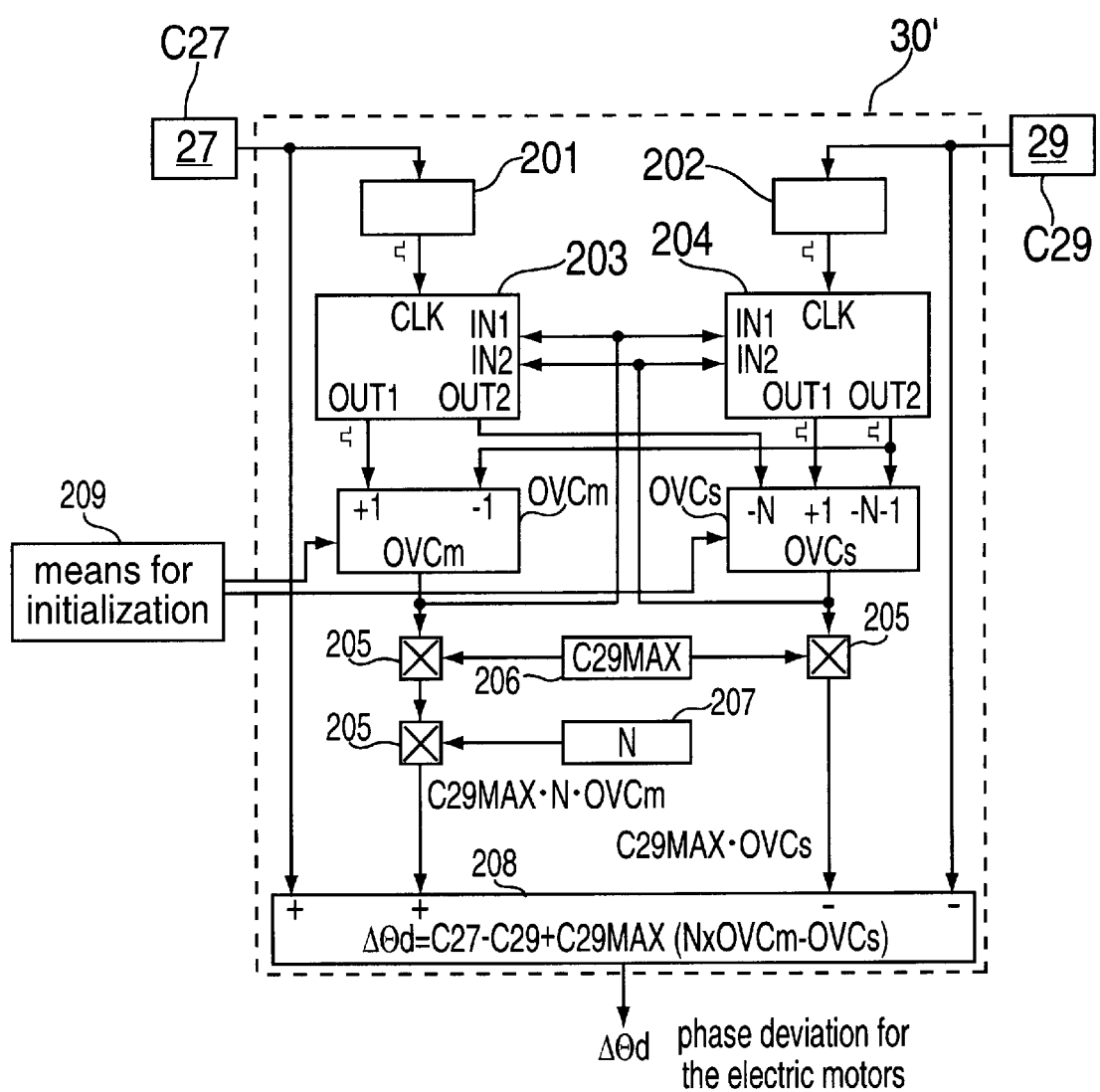
FIG. 10 illustrates a block diagram of a phase deviation detector 30' for the electric motors.
Figure 11:
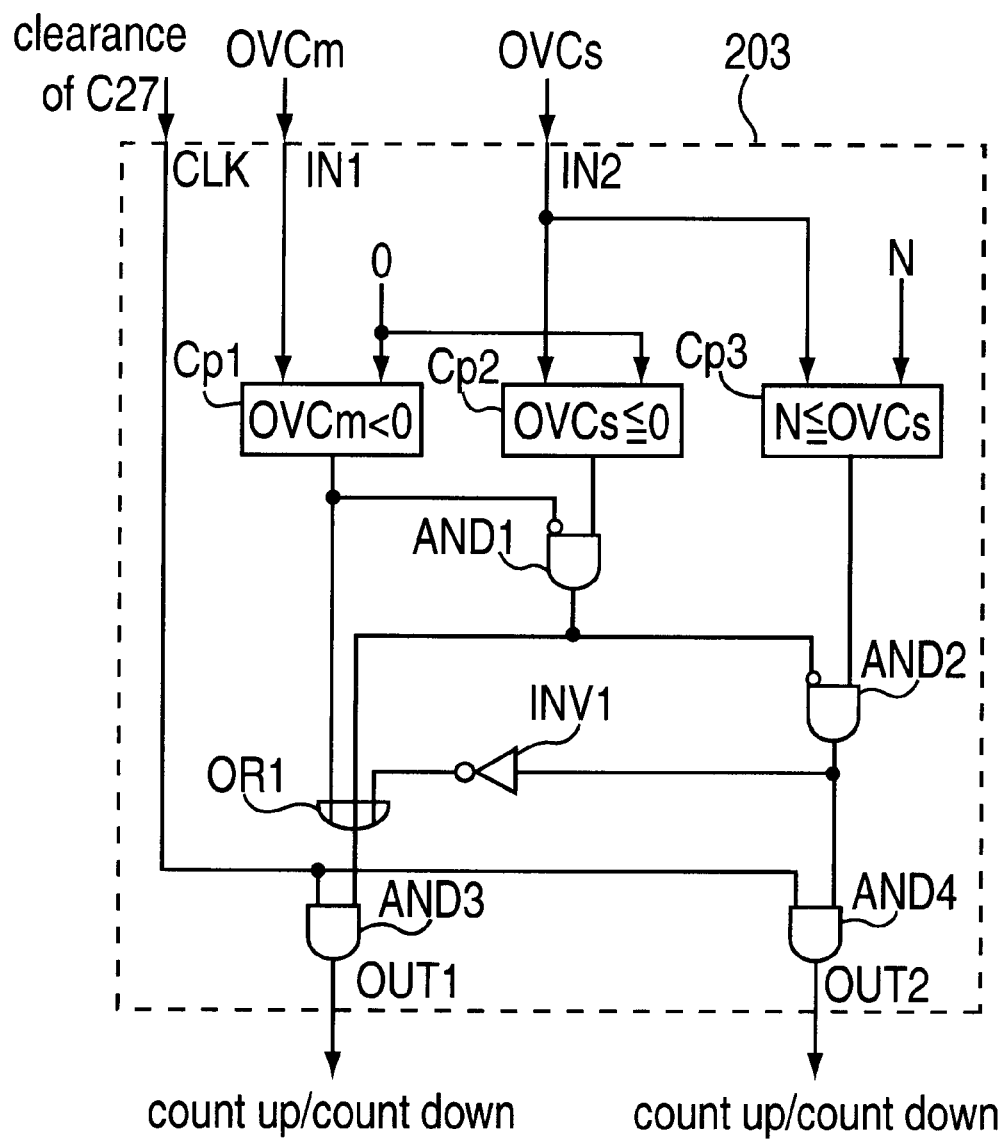
FIG. 11 illustrates a block diagram of a master logic-arithmetic unit in FIG. 10.
Figure 12:
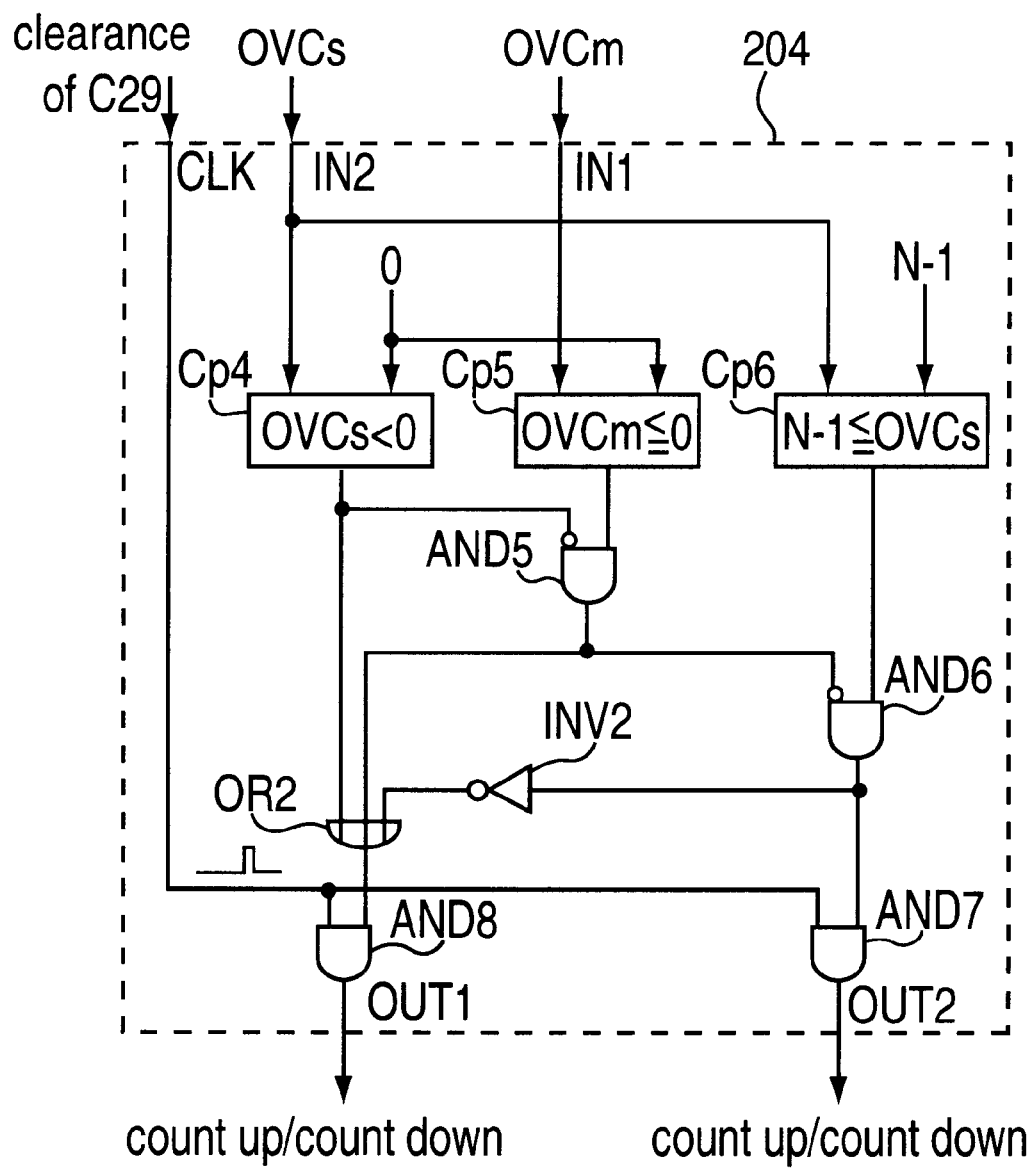
FIG. 12 illustrates a block diagram of a slave logic-arithmetic unit in FIG. 10.
Figure 13:
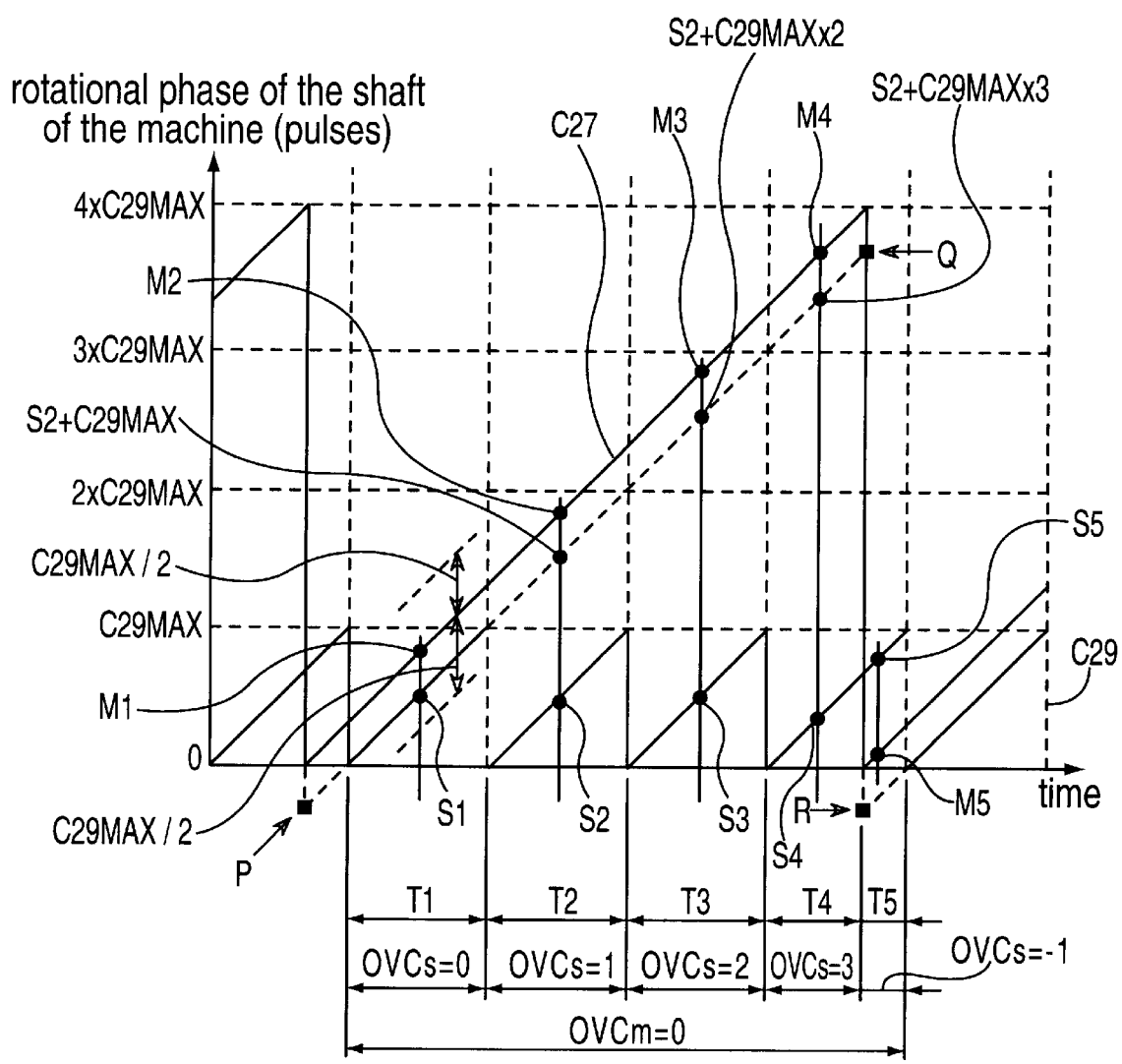
FIG. 13 illustrates an initialization of the over counter when the origin matching mode 2 is started (in the case that the master machine is forward).
Figure 14:
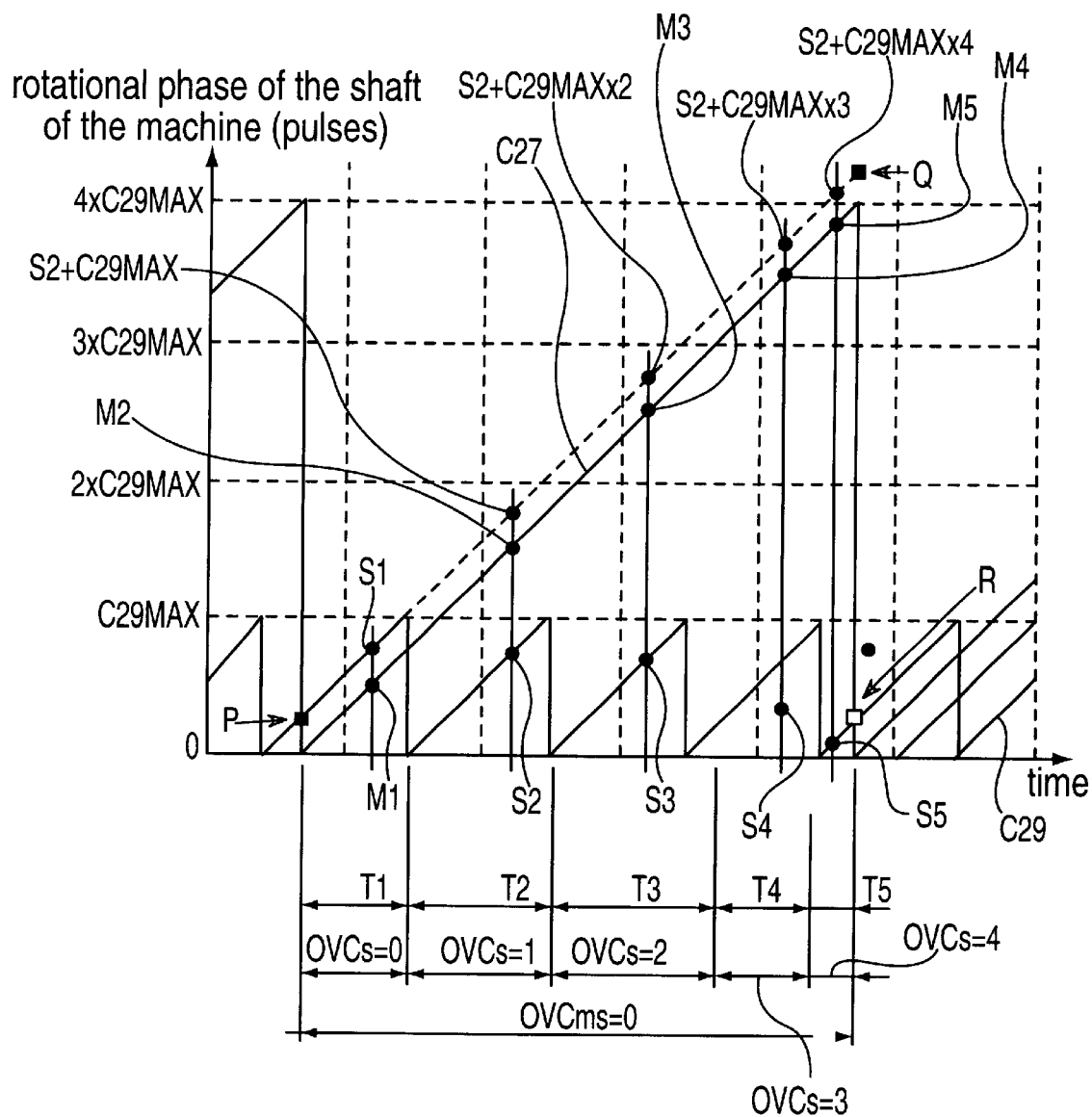
FIG. 14 illustrates an initialization of the over counter when the origin matching mode 2 is started (in the case that the master machine is behind).
Figure 15:
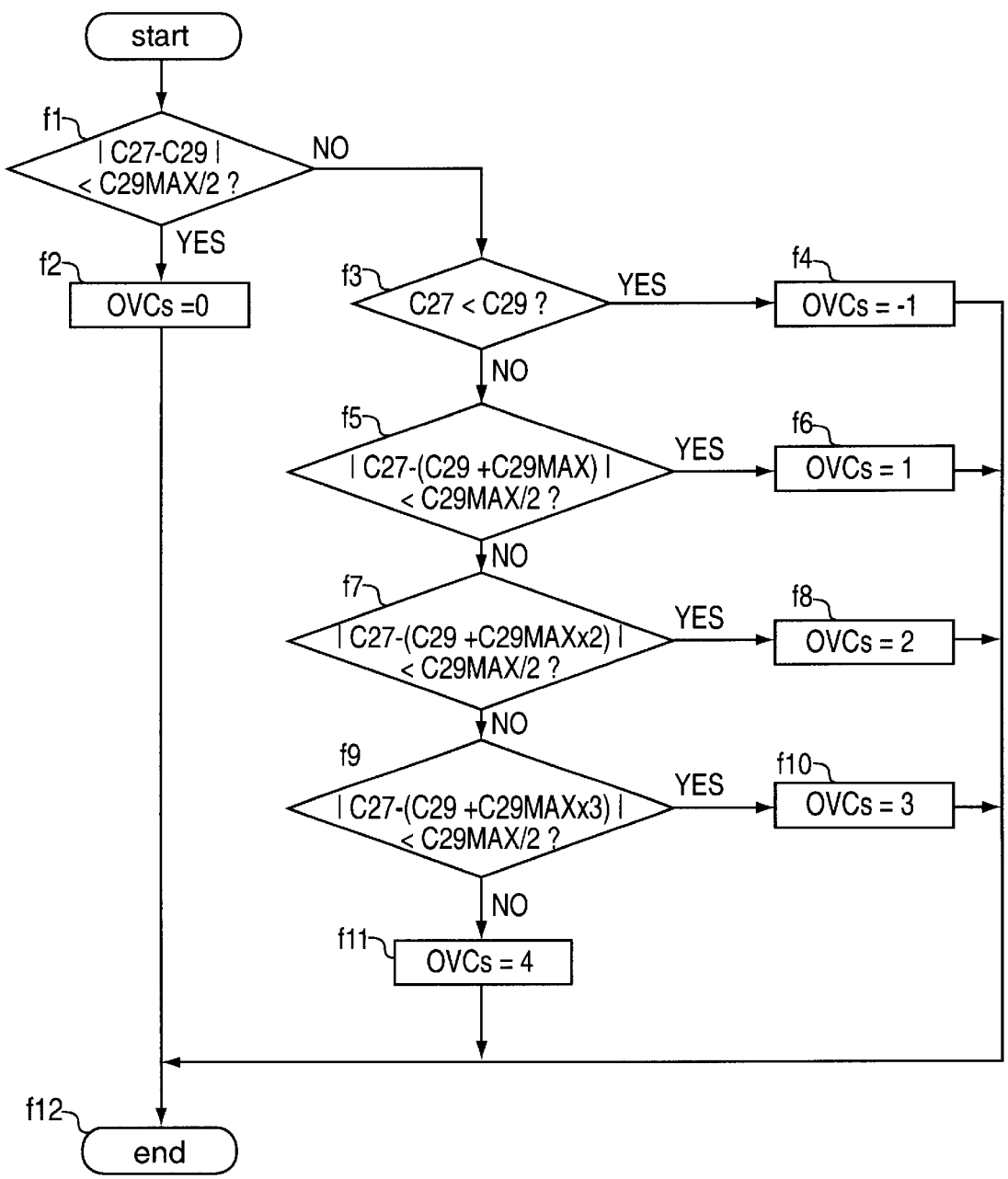
FIG. 15 illustrates a flow chart of the initialization of the over counter.
Figure 16:
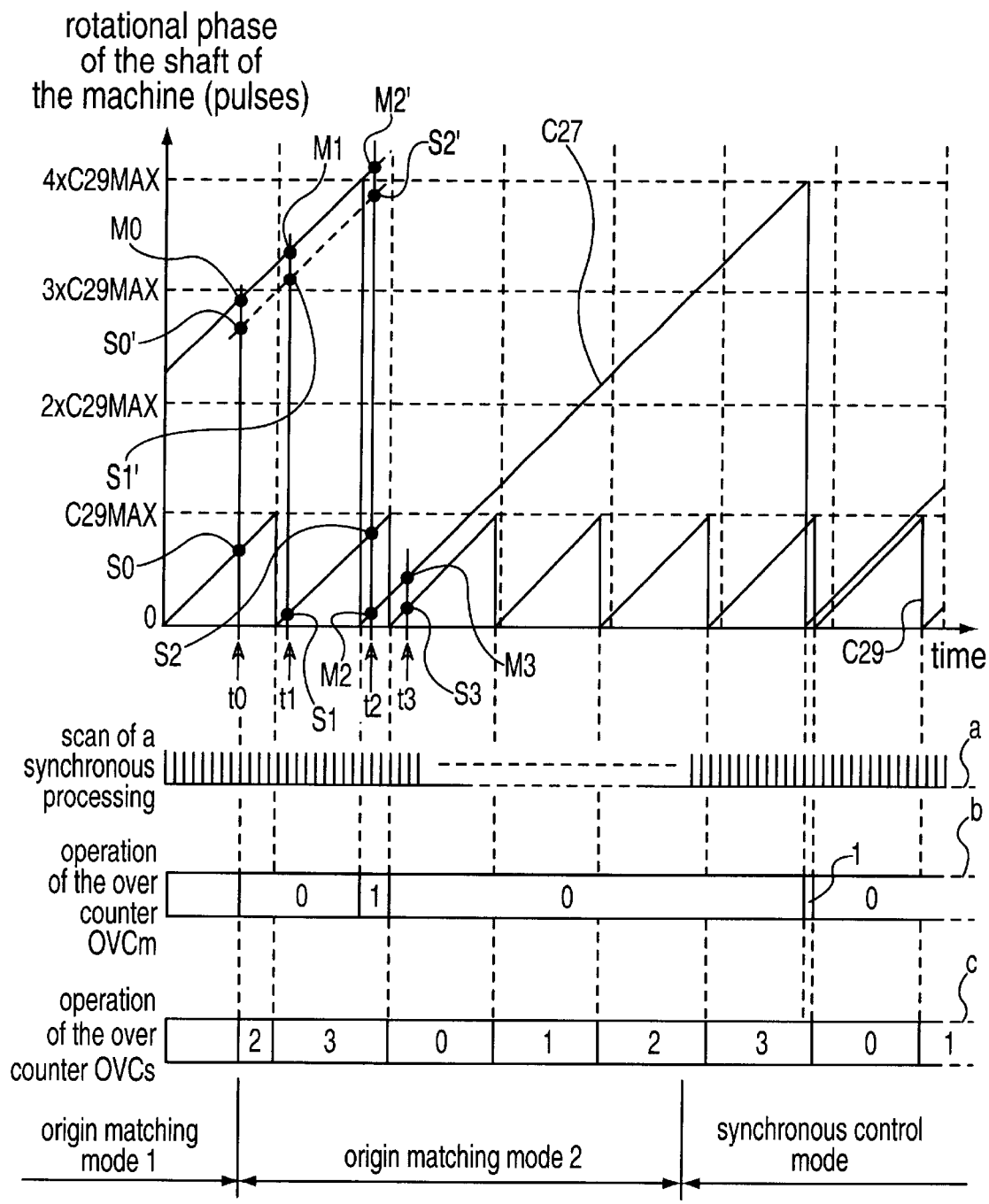
FIG. 16 illustrates a renewal operation of the over counter.
Figure 17:
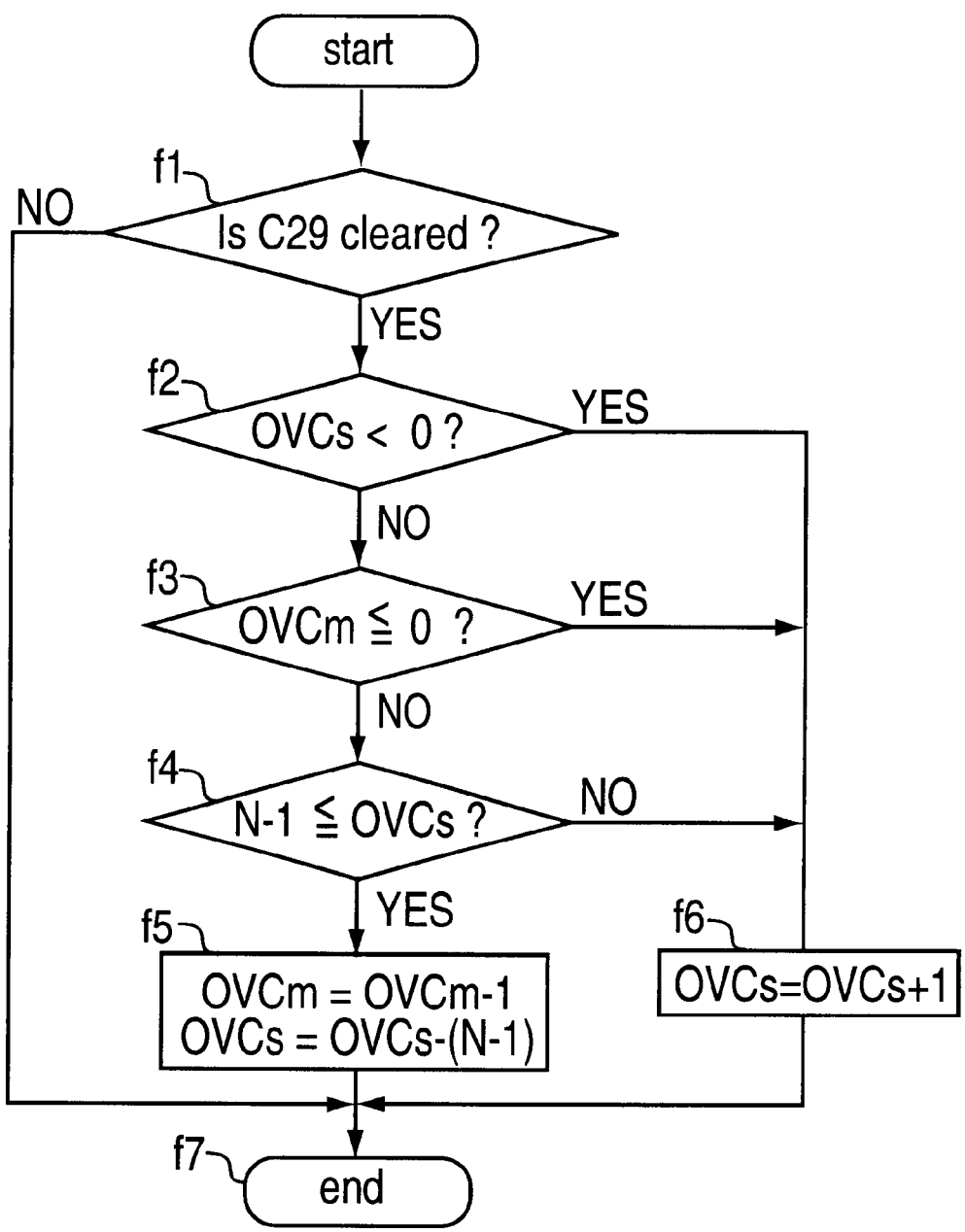
FIG. 17 illustrates a flow chart of the renewal operation of the over counter. (1)
Figure 18:
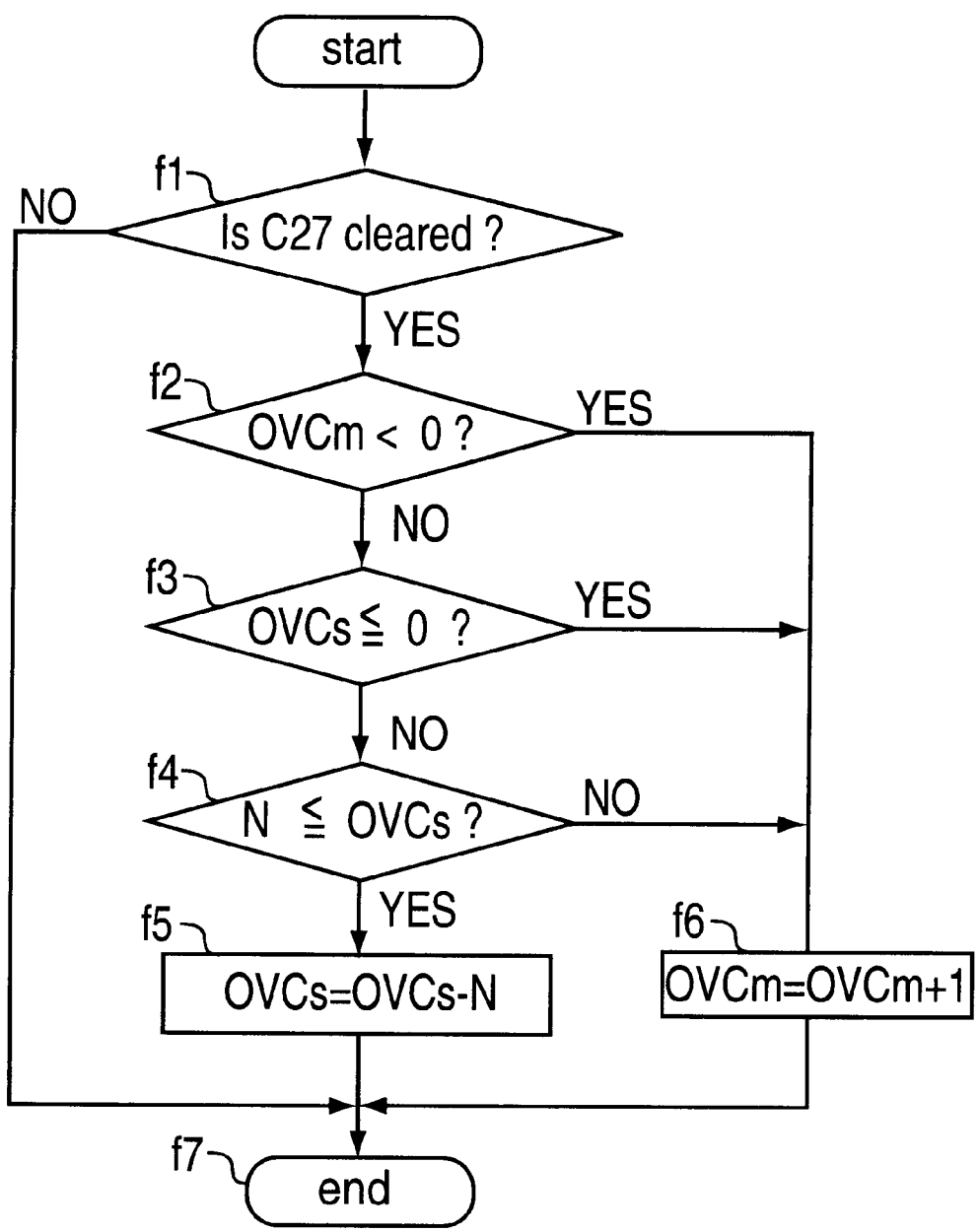
FIG. 18 illustrates a flow chart of the renewal operation of the over counter. (2)
Figure 19A:
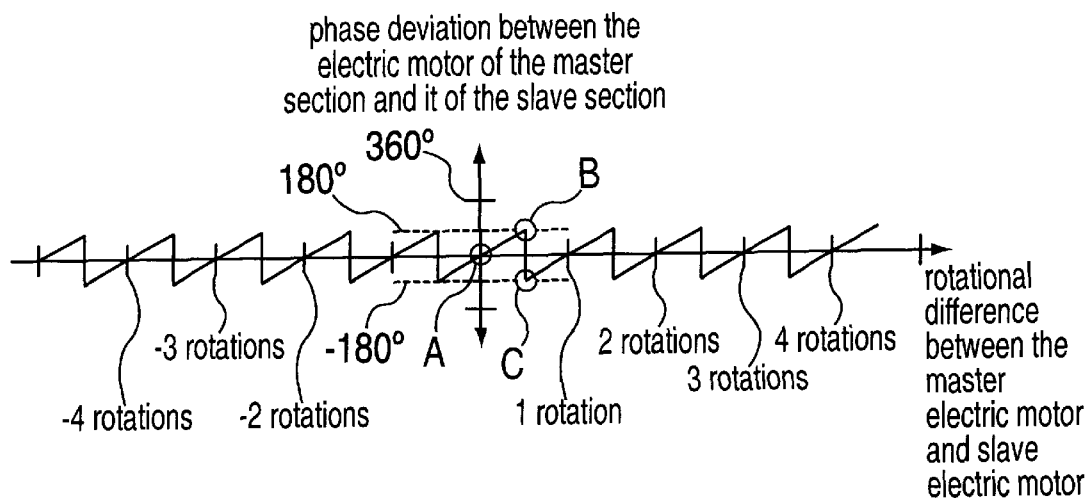
FIG. 19 illustrates the detection of the phase deviation in the prior art and in the present invention.
Figure 19B:
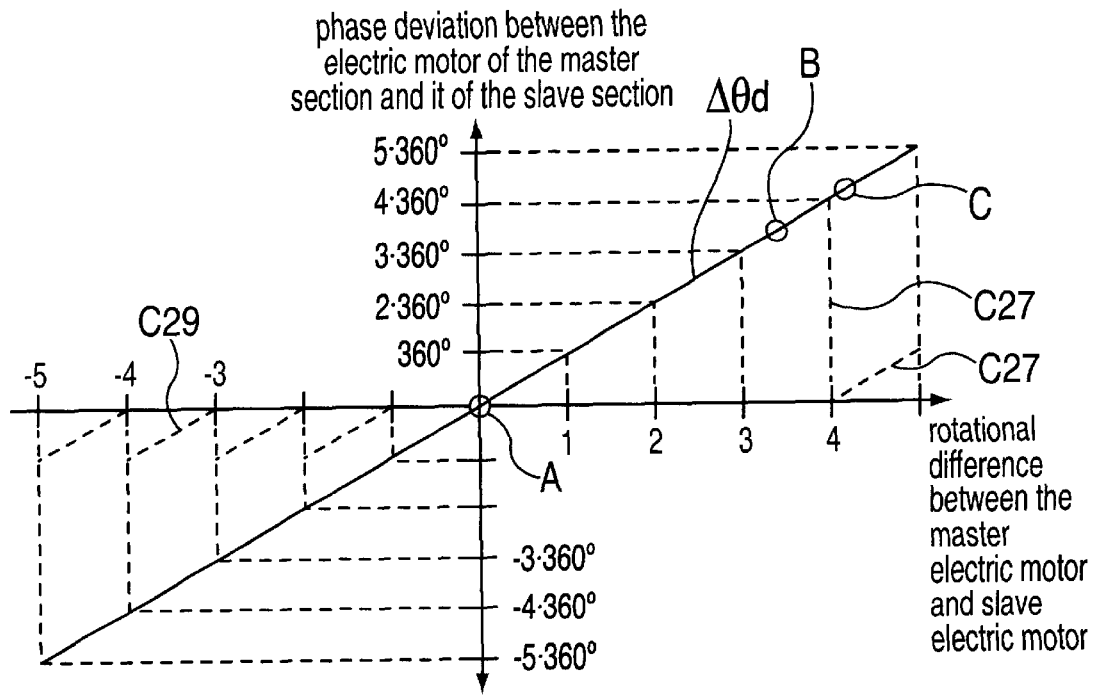

FIG. 10~FIG. 12 illustrate block diagram showing an over counter. FIG. 13 and FIG. 14 illustrates an initialization of the over counter. FIG. 15 illustrates a flow chart explaining the initialization of FIG. 13 and FIG. 14. FIG. 16 illustrates a renewal operation of the over counter. FIG. 17 and FIG. 18 illustrates a flow chart explaining the renewal operation of FIG. 16. FIG. 19 illustrates an-explanation for detecting a phase deviation.

Next, the second embodiment according to the present invention is explained. In FIG. 7, FIG. 8 and FIG. 9, the parts having the same function with those in FIG. 1, FIG. 2 and FIG. 3 have the same symbols and the explanation is neglected.

In FIG. 7, the master electric motor Im and the shaft Km of the master machine are connected without a deceleration device. On the other hand, the slave electric motor Is1 and the shaft Ks1 of the slave machine are connected through a deceleration device Gs1 with deceleration rate of 1/N (N is a positive integer). When the number of pulses per one rotation of the master rotary encoder Rm attached to the master electric motor Im is Rmmax, and the number of pulses per one rotation of the slave rotary encoder Rs1 attached to the slave electric motor Is1 is Rsmax, said Rmmax is N times as many as said Rsmax.

Also in FIG. 7, 30', which is a phase deviation detector for the electric motors of the present invention, has a different function from the phase deviation detector 30 of FIG. 1.

Moreover, in this embodiment an origin matching and a synchronous control between plural electric motors are realized continuously without employing the origin Om of the shaft of the master machine, the origin detector Lm of the shaft of the master machine and the phase detector 33 of the shaft of the master machine.

In the control device Cs1 of the slave section 1 of FIG. 7, the phase detector 27 of the master electric motor constantly detects the rotational phase of the master electric motor Im, as explained in FIG. 1, and the rotational phase of the shaft of the master machine.

The output of the phase detector 27 of the master electric motor and the output of the phase detector 35 of the shafts of the slave machine are inputted to the phase deviation detector 36 for the shafts of machines so as to calculate the phase deviation between the shaft Km of the master machine and the shaft Ks1 of the slave machine. The phase deviation is inputted to the gain amplifier 37 and the detector 39 for origin matching.

The detector 39 for origin matching opens switch 41 and closes switch 42 when said equation (6) for the target accuracy ∊1 of origin matching is realized. Then, said phase deviation between the shafts of the machines is added to the output of the rotational frequency detector 22 through the gain amplifier 37, the added value is calculated with the output of the rotational frequency feedback detector 24 in order to match origin.(an origin matching mode 1)

According to this correction of the origin matching, when the following equation (7) is realized, the detector 39 for origin matching sends an initialization demand to the phase deviation detector 30' for the electric motors and closes the switch 41 and opens the switch 42 at the same time. The control is switched over an origin matching mode 2 which is comprised of the route through the phase deviation detector 30' for the electric motors and so on.

Here, the phase deviation detector 30' for the electric motors has a master over counter OVCm and a slave over counter OVCs built-in (a master over counter OVCm and a slave over counter OVCs in the phase deviation detector 30' for the electric motors are mentioned later).

When the phase deviation detector 30' for the electric motors receives the initialization demand from the detector 39 for origin matching the master over counter OVCm is cleared to 0, and the slave over counter OVCs is initialized to the after-mentioned predetermined value according to the phase relation between the phase detector 27 of the master electric motor and the phase detector 29 of the slave electric motor.

Next, the phase deviation detector 30' for the electric motors calculates and outputs the phase deviation between the master electric motor Im and the slave electric motor Is1 according to the phase detector 27 of the master electric motor, the phase detector 29 of the slave electric motor, and the master over counter OVCm and a slave over counter OVCs by after-mentioned way. The phase deviation for the shafts of the electric motors through the gain amplifier 31 is calculated with the outputs of the rotational frequency detector 22 and the rotational frequency feedback detector 24, the control of the origin matching mode 2 as mentioned later, is performed.

FIG. 8 and FIG. 9 illustrate the operations of origin matching. In order to simplify the explanation, same as the aforementioned embodiment, the deceleration rate 1/N of the deceleration device Gs1 is 1/4 (N=4). In the same way as FIG. 2 and FIG. 3, FIG, 9 shows wave patterns corresponding to each part of FIG. 8. ((1)~(4) shown by the broken lines in FIG. 9 correspond to those in FIG. 8.)

In FIG. 8 and FIG. 9, same way as FIG. 28-A, a circle (a) in FIG. 8-A shows the modeled shaft Km of the master machine and a line z1 shows a projection of the z-phase position of the master rotary encoder Rm on the circle (a). A circle (b) in FIG. 8-B shows the modeled shaft Ks1 of the slave machine. The numbers ①, ②, ③ and ④ in the circle b show that 4 rotations of the slave electric motor Is1 make one rotation of the shaft Ks1 of the slave machine. The lines z1, z2, z3 and z4 show projections of the z-phase positions of the slave rotary encoder Rs1 on the circle (b). The line z1 is shown by thick line as a base of one rotation of the shaft Ks1 of the slave machine. The origin Os1 of the shaft of the slave machine and the origin detector Ls1 of the shaft of the slave machine are shown in FIG. 8-B.

Also in FIG. 28, C27, C29 and C35 show time transition by converting the outputs of the phase detector 27 of the master electric motor, the phase detector 29 of the slave electric motor and the phase detector 35 of the shaft of the slave machine to angle, respectively. (Note that the outputs of these detectors are number of pulses originally, however they are converted to angle in order to simplify the explanation.)

FIG. 9-c illustrates the Z phase output of the master rotary encoder Rm so as to correspond to the clear operation of C27. FIG. 9-d and FIG. 9-e illustrate A phase signal and B phase signal of the master rotary encoder Rm, respectively.

In the same manner, FIG. 9-f illustrates the origin signal of the shaft outputted by the origin detector Ls1 of the shaft of the slave machine so as to correspond to the clear operation of said C35. FIG. 9-g illustrates the Z phase output of the slave rotary encoder Rs1 so as to correspond to the clear operation of said C29. FIG. 9-h and FIG. 9-i illustrate A phase signal and B phase signal of the slave rotary encoder Rs1, respectively.

In FIG. 8-A, same as the prior art of FIG. 29-A', the phase $\theta m$ of the shaft Km of the master machine is $-90°$ in the shaft of the electric motor. And in FIG. 8-B, same as FIG. 29-B', the phase $\theta s1m$ of the shaft Ks1 of the slave machine is $+180°$ in the shaft of the electric motor. Therefore $\theta m - \Theta s1m = -270°$, this is a case of the equation (3).

Also, in FIG. 8-A, as the shaft Km of the master machine and the master electric motor Im are connected without a deceleration device, the installation error of the origin of the shaft of the master machine explained in FIG. 2A is 0. FIG. 8-B shows an example that the true origin of the shaft Ks1 of the slave machine is Z phase position of the slave rotary encoder Rs1 which is between "④" and "①" showing a rotation of the slave electric motor Is1 (the position shown by z1 in FIG. 8-B), the origin Os1 of the shaft of the slave machine is set 30° behind in the shaft of the electric motor compared to the true origin of the shaft ($30°/4 = 7.5°$ in the shaft of the machine). As the origin Os1 of the shaft of the slave machine is fixed separately from the slave rotary encoder Rs1, installation errors of this kind can be normally occurred. When the installation error of the origin of the shaft of the master machine is $\Delta\theta m$, and the installation error of the origin of the shaft of the slave machine is $\Delta\theta s$, the above-mentioned example is shown as following equation (12).

$$\Delta\theta m = +0° \text{ (in FIG. 7, this is inevitably zero)}$$

$$\Delta\theta s = -30° \text{ (in the shaft of the electric motor)} \quad (12)$$

In FIG. 8, when the master section 0 and the slave section 1 are driven, they are driven under tuning control at first. At time t1, the origin matching is started when the shaft Km of the master machine is, for example, in the phase shown in FIG. 8-A. The shaft Ks1 of the slave machine is, for example, in the phase shown in FIG. 8-B.

That is, at time t1, when the relation between the output of the phase deviation detector 36 for the shafts of the machines and the accuracy $\epsilon 1$ for origin matching of the detector 39 are shown by said equation (6), the switch 41 is opened and the switch 42 is closed by the operation of the detector 39 and the origin matching mode 1 is started.

As illustrated time t1~t2 in FIG. 8, the output C35 of the phase detector 35 of the shaft of the slave machine is controlled so as to get near the output C27 of the phase detector 27 of the master electric motor.

At time t2, the relation between the output of the phase deviation detector 36 for the shafts of the machines and the accuracy $\epsilon 1$ for origin matching satisfy said equation (7), then the control is switched over an origin matching mode 2 by the route through the phase deviation detector 30' for the electric motors.

At the time t2, as a deviation of the rotational position between the master electric motor Im in FIG. 8-C and the slave electric motor Is1 in FIG. 8-D is within $\pm 180°$ in the shaft of the slave electric motor, said equation (2) is satisfied. Therefore, even when the control between the master section and the slave section are shifted to a synchronous control by the route through the phase deviation detector 30' for the electric motors an origin can be matched precisely without causing phase difference shown in the prior art with said equation (4).

The accuracy for the origin matching $\epsilon 1$ is shown by said equation (9) when number of pulses per one rotation of the slave rotary encoder Rs1 is Rsmax and an allowable coefficient is S (S is less than 1).

However, as mentioned in the explanation of said equation (12), the installation error $\Delta\theta s1$ of the origin of the shaft of the slave machine can be practically occurred. Consequently, even if the origin is matched accurately by operation of the phase deviation detector 36 for the shafts of the machines, the phase difference of $(-\Delta\theta s1)$ between the true origin of the shaft of the slave machine and the origin Os1 of the shaft of the slave machine remains. By correcting the equation (9) with $\Delta\theta s1$, the following equation (13) is given. This $\epsilon 1$ is a target accuracy for origin matching.

$$\epsilon 1 = [R s\max \times \{180° - (-\Delta\theta s1)\}/360°] \times S \quad (13)$$

Here, Rsmax is number of pulses per one rotation of the slave rotary encoder Rs1, $\Delta\theta s1$ is the installation error of the origin of the shaft of the slave machine and S is an allowable coefficient, less than 1.

As mentioned above, the accuracy $\epsilon 1$ for the origin matching of the detector 39 for origin matching by the route through the phase deviation detector 30 is defined by said equation (13), the phase deviation in the shaft of the electric motor is less than 180° certainly at the end of the origin matching mode 1, consequently, the origin can be matched without causing the phase difference which is shown in the equation (4) of the prior art.

According to the present invention, in the case that the deceleration device is employed in the slave machine, the accuracy $\epsilon 1$ for the phase deviation detector for the shafts of machine is defined by said equation (13). When the origin matching mode 1 is completed the phase deviation in the shaft of the electric motor is made to be less than 180° certainly, in the case that the deceleration devices with deceleration rate of 1/N are employed the origin can be matched accurately without causing any phase difference of $360°/N, (360° \times 2)/N, \ldots \{360° \times (N-1)\}/N$.

Next, an origin matching mode 2 according to the present invention is explained.

In FIG. 7 the phase deviation detector 30' for the electric motors has the master over counter OVCm and the slave over counter OVCs built-in. The phase deviation detector 30' calculates the outputs of the master over counter OVCm, slave over counter OVCs, the phase detector 27 of the master electric motor and the phase detector 29 of the slave electric motor then detects the phase deviation for the shafts of the electric motors.

FIG. 10, FIG. 11 and FIG. 12 illustrate examples of component.

FIG. 10 illustrates a block diagram of the phase deviation detector 30' for the electric motors. FIG. 11 illustrates a master logic-arithmetic unit 203 in FIG. 10. FIG. 12 illustrates a slave logic-arithmetic unit 204 in FIG. 10.

In FIG. 10, 201 is a phase over detector of the master electric motor, 202 is a phase over detector of the slave electric motor. When C27 goes down, the phase over detector 201 of the master electric motor detects a clearance outputted by the phase detector 27 of the master electric motor and outputs pulses. When C29 goes down, the phase over detector 202 of the slave electric motor detects a clearance outputted by the phase detector 29 of the slave electric motor and outputs pulses.

203 is a master logic-arithmetic unit and 204 is a slave logic-arithmetic unit. As shown in after-mentioned FIG. 11 and FIG. 12, when the phase clearance of the master electric motor and the phase clearance of the slave electric motor are detected, the master logic-arithmetic unit 203 and the slave logic-arithmetic unit 204 output count-up or countdown pulses corresponding to the counted value of the master over counter OVCm and the slave over counter OVCs, respectively. The master over counter OVCm counts up by one when the pulse is inputted to +1 terminal and counts down by one when the pulse is inputted to −1 terminal.

The slave over counter OVCs counts down by N when pulse is inputted to −N terminal, counts up by one when pulse is inputted to +1 terminal, and counts down by (N−1) when pulse is inputted to N−1 terminal.

209 is an initialization unit. As mentioned later, 209 initializes the master over counter OVCm to 0, and initializes the slave over counter OVCs to any value of 0, 1, 2~(N−1), N or −1 when the origin matching mode 2 is started.

205 is a multiplier, 206 is a coefficient unit outputting a value of "C29MAX" (the maximum output of the phase detector 29 of the slave electric motor), 207 is a coefficient unit outputting said deceleration rate of "N" and 208 is an adder/subtractor.

The adder/subtractor 208 calculates the output of the multiplier 205 and outputs a phase deviation $\Delta\theta d$ in the shaft of the electric motor shown in after-mentioned equation (15).

FIG. 11 shows components of the master logic-arithmetic unit 203. In FIG. 11, Cp 1~Cp 3 are digital comparator (in the following referred to comparator), AND 1~AND 4 are AND gates, INVI is an inversion circuit, and OR 1 is an OR gate. The comparator Cp 1 outputs 1 when the counted value of the master over counter OVCm (in the following referred to OVCm), OVCm<0. In other cases the comparator Cp 1 outputs 0. The comparator Cp 2 outputs 1 when the counted value of the slave over counter OVCs (referred to OVCs in the following), OVCs≦0. In other cases the comparator Cp 2 outputs 0. The comparator Cp 3 outputs 1 when OVCs≧N. In other cases the comparator Cp 3 outputs 0.

Therefore, when OVCm≧0 in the case of 0<OVCs<N, the output of the comparator Cp 1 is 0, the output of the comparator Cp 2 is 0 and the output of the comparator Cp 3 is 0. The output of the AND gate AND 1 is 0, the output of the AND gate AND 2 is 0 and the output of the OR gate OR 1 is 1, then AND gate AND 3 is opened. Consequently, when the clearance of the phase detector 27 of the master electric motor is detected, the output counting up the master over counter OVCm is generated from OUT 1.

FIG. 12 shows components of the slave logic-arithmetic unit 204. In FIG. 12, Cp 4~Cp 6 are comparators, AND 5~AND 8 are AND gates, INVI is an inversion circuit, OR 2 is an OR gate. The comparator Cp 4 outputs 1 when OVCs<0. In other cases the comparator Cp 4 outputs 0. The comparator Cp 5 outputs 1 when OVCm≦0. In other cases the comparator Cp 5 outputs 0. The comparator Cp 6 outputs 1 when N−1≦OVCs. In other cases the comparator Cp 6 outputs 0.

Therefore, when OVCm≧0, in the case of 0<OVCs<N−1, the output of the comparator Cp 4 is 0, the output of the comparator Cp 5 is 1 and the output of the comparator Cp 6 is 0. The output of the AND gate AND 5 is 1, the output of the AND gate AND 6 is 0 and the output of the OR gate OR 2 is 1, then AND gate AND 8 is opened. Consequently, when the clearance of the phase detector 29 of the slave electric motor is detected, the output counting up the slave over counter OVCs is generated from OUT 1.

The detailed operations of the master logic-arithmetic unit 203 and the slave logic-arithmetic unit 204 are explained in after-mentioned FIG. 16, FIG. 17 and FIG. 18.

After the phase deviation detector 30' comprised of said master over counter OVCm and said slave over counter OVCs is initialized at time t2 in FIG. 8 when the origin matching mode 2 is started, the phase deviation detector 30' calculates phase deviation $\Delta\theta d$ in the shaft of the electric motor shown in an after-mentioned equation (15) and outputs it.

Next, an initialization of said master over counter OVCm and said slave over counter OVCs is explained.

In FIG. 8, at time t2 when the origin matching mode 2 is started the phase deviation between the shaft Km of the master machine and the shaft Ks1 of the slave machine is less than 180°, that is ±ε1 in the shaft of the electric motor, the shaft Km of the master machine is forward or behind compared to the shaft Ks1 of the slave machine within the permissible range of ε1.

An initialization of the master over counter OVCm and the slave over counter OVCs in the case that the shaft Km of the master machine is forward compared to the shaft Ks1 of the slave machine is shown in FIG. 13. An initialization of the master over counter OVCm and the slave over counter OVCs in the case that the shaft Km of the master machine is behind compared to the shaft Ks1 of the slave machine is shown in FIG. 14. The operation of the initialization is explained by referring to a flow chart of FIG. 15.

Also in FIG. 13 and FIG. 14, C27 shows the output of the phase detector 27 of the master electric motor and C29 shows the output of the phase detector 29 of the slave electric motor. In the figures the rotational phase of Y-axis is shown by the counted number of pulses. The deceleration rate 1/N of the slave deceleration device Gs1 is 1/4 (N=4) in order to simplify the explanation, the number of pulses per one rotation of the slave rotary encoder Rs1 is C29 MAX, the number of pulses per one rotation of the master rotary encoder Rm is 4×C29 MAX. The output C27 of the phase detector 27 of the master electric motor and the output C29 of the phase detector 29 of the slave electric motor are M1 and S1 during time T1, M2 and S2 during time T2, respectively. In the same manner, (M3, S3), (M4, S4) and (M5, S5) during time T3, T4 and T5, respectively.

Referring to FIG. 13, the initialization of the said master over counter OVCm and the said slave over counter OVCs when the origin matching mode 2 is started in the case that the master section 0 is forward compared to the slave section 1 is explained.

At time t2 when the origin matching mode 2 is started the master over counter OVCm is inevitably cleared to 0. In the case that time t2, when the origin matching mode 2 is started, is any time of T1~T5, the slave over counter OVCs is initialized the predetermined value corresponding to the phase relation between the phase detector 27 of the master electric motor and the phase detector 29 of the slave electric motor.

Referring to FIG. 15, the initialization of the said slave over counter OVCs when the master section 0 is forward compared to the slave section 1 is explained. Here, the following f1~f12 corresponds to f1~f12 in FIG. 15.

1. When the origin matching mode 2 is started during T1 in FIG. 13:
   (1) In the decision box f1, as M1−S1<C29MAX/2 the condition of f1 is satisfied, go to box f2;
   (2) In the box f2, OVCs=0 and the initialization is completed;
   (3) Terminate in box f12.
2. When the origin matching mode 2 is started during T2 in FIG. 13:
   (1) In the decision box f1, as C29MAX/2≦M2−S2 the condition of f1 is not satisfied, go to decision box f3;
   (2) In the decision box f3, as S2<M2 the condition of f3 is not satisfied, go to decision box f5;
   (3) In the decision box f5, as M2−(S2+C29MAX) <C29MAX/2 the condition of f5 is satisfied, go to box f6;
   (4) In the box f6, OVCs=1 and the initialization is completed;
   (5) Terminate in box f12.
3. When the origin matching mode 2 is started during T3 in FIG. 13:
   (1) In the decision box f1, as C29MAX/2≦M3−S3 the condition of f1 is not satisfied, go to decision box f3;
   (2) In the decision box f3, as S3<M3 the condition of f3 is not satisfied, go to decision box f5;
   (3) In the decision box f5, as C29MAX/2≦M3−(S3+ C29MAX) the condition of f5 is not satisfied, go to decision box f7;
   (4) In decision box f7, M3−(S3+C29MAX×2) <C29MAX/2 the condition of f7 is satisfied, go to box f8;
   (5) In the box f8, OVCs=2 and the initialization is completed;
   (6) Terminate in box f12.
4. When the origin matching mode 2 is started during T4 in FIG. 13:
   (1) In the decision box f1, as C29MAX/2≦M4−S4 the condition of f1 is not satisfied, go to decision box f3;
   (2) In the decision box f3, as S4<M4 the condition of f3 is not satisfied, go to decision box f5;
   (3) In the decision box f5, as C29MAX/2≦M4−(S4+ C29MAX) the condition of f5 is not satisfied, go to decision box f7;
   (4) In decision box f7, C29MAX/2≦M4−(S4+C29MAX× 2), the condition of f7 is not satisfied go to box f9;
   (5) In the box f9, M4−(S4+C29MAX×3)<C29MAX/2 the condition of f9 is satisfied, go to box f10;
   (6) OVCs=3 and the initialization is completed;
   (7) Terminate in box f12.
5. When the origin matching mode 2 is started during T5 in FIG. 13:
   (1) In the decision box f1, as C29MAX/2≦S5−M5 the condition of f1 is not satisfied, go to box f3;
   (2) In the decision box of f3, as M5<S5 the condition of f3 is satisfied, go to f4;
   (3) OVCs=−1 and the initialization is completed;
   (4) Terminate in box f12.

As mentioned above, after OVCs is initialized to 0, 1, 2, 3 or −1, the phase deviation detector 30' for the electric motors makes the phase of the shaft of the slave electric motor C29', which the output C29 of the phase detector 29 of the slave electric motor is corrected, the following equation (14) is given.

$$C29' = C29 + C29MAX \times OVCs \qquad (14)$$

As the C29' is shown a locus of P, Q, R in FIG. 13, it is possible to calculate with the output C27 of the phase detector 27 of the master electric motor. The phase deviation considering one rotation of the shaft of the slave machine can be calculated.

In the above-mentioned example the deceleration rate is 1/4 (N=4), generally in the case that deceleration rate is 1/N, OVCs is initialized to 0, 1, 2~(N−1), or −1.

Next, referring to FIG. 14, the initialization of the master over counter OVCm and the slave over counter OVCs when the origin matching mode 2 is started in the case that the master section 0 is behind compared to the slave section 1, is explained.

At time t2 when the origin matching mode 2 is started the master over counter OVCm is inevitably cleared to 0. In the case that time t2 is in any time of T1~T5 in FIG. 14, the initialization of the slave over counter OVCs is explained by referring to the flow chart of FIG. 15.

1. When the origin matching mode 2 is started during T1 in FIG. 14:
   (1) In the decision box f1, as S1−M1<C29MAX/2 the condition of f1 is satisfied, go to box f2;
   (2) In the box f2, OVCs=0 and the initialization is completed;
   (3) Terminate in box f12.
2. When the origin matching mode 2 is started during T2 in FIG. 14:
   (1) In the decision box f1, as C29MAX/2≦M2−S2 the condition of f1 is not satisfied, go to decision box f3;
   (2) In the decision box f3, as S2<M2 the condition of f3 is not satisfied go to decision box f5;
   (3) In the decision box f5, as (S2+C29MAX)− M2<C29MAX/2 the condition of f5 is satisfied, go to box f6;
   (4) In the box f6, OVCs=1 and the initialization is completed;
   (5) Terminate in box f12.
3. When the origin matching mode 2 is started during T3 in FIG. 14:
   (1) In the decision box f1, as C29MAX/2≦M3−S3 the condition of f1 is not satisfied, go to decision box f3;
   (2) In the decision box f3, as S3<M3 the condition of f3 is not satisfied, go to decision box f5;
   (3) In the decision box f5, as C29MAX/2≦M3−(S3+ C29MAX) the condition of f5 is not satisfied, go to decision box f7;

(4) In decision box f7, as (S3+C29MAX×2)−M3<C29MAX/2 the condition of f7 is satisfied, go to box f8;

(5) In the box f8, OVCs=2 and the initialization is completed;

(6) Terminate in box f12.

4. When the origin matching mode 2 is started during T4 in FIG. 14:

(1) In the decision box f1, as C29MAX/2≦M4−S4 the condition of f1 is not satisfied, go to decision box f3;

(2) In the decision box f3, as S4<M4 the condition of f3 is not satisfied, go to decision box f5;

(3) In the decision box f5, as C29MAX/2≦M4−(S4+C29MAX) the condition of f5 is not satisfied, go to decision box f7;

(4) In decision box f7, as C29MAX/2≦M4−(S4+C29MAX×2) the condition of f7 is not satisfied, go to box f9;

(5) In the box f9, as (S4+C29MAX×3)−M4<C29MAX/2 the condition of f9 is not satisfied, go to box f10;

(6) OVCs=3 and the initialization is completed;

(7) Terminate in box f12.

5. When the origin matching mode 2 is started during T5 in FIG. 14:

(1) In the decision box f1, as C29MAX/2≦M5−S5 the condition of f1 is not satisfied, go to box f3;

(2) In the decision box of f3, as the condition of S5<M5 the condition of f3 is not satisfied, go to f5;

(3) In the decision box f5, as C29MAX/2≦M5−(S5+C29MAX) the condition of f5 is not satisfied, go to f7;

(4) In the decision box f7, as C29MAX/2≦M5−(S5+C29MAX×2) the condition of f7 is not satisfied, go to f9;

(5) In the decision box f9, as C29MAX/2≦M5−(S5+C29MAX×3) the condition of f9 is not satisfied, go to f1;

(6) OVCs=4 and the initialization is completed;

(7) Terminate in box f12.

As mentioned above, after OVCs is initialized to 0, 1, 2, 3 or 4, the phase deviation detector 30' for electric motors calculates the phase C29' of the shaft of the slave electric motor by said equation (14).

As said C29' is shown a locus of P, Q, R in FIG. 14, it is possible to calculate with the output C27 of the phase detector 27 of the master electric motor. The phase deviation considering one rotation of the shaft of the slave machine can be calculated.

In the above-mentioned example the deceleration rate is 1/4 (N=4), generally in the case that deceleration rate is 1/N, OVCs is initialized to 0, 1, 2∼(N−1), or N.

In this manner, when the origin matching mode 2 is started, after initializing the master over counter OVCm and the slave over counter OVCs, the phase deviation detector 30' calculates the phase deviation Δθd in the shaft of the electric motor as shown in the FIG. 10 by following equation (15).

$$\Delta\theta d = C27 - C29 + C29MAX \times (N \times OVCm - OVCs) \quad (15)$$

In the FIG. 7, the phase deviation detector 30' for the electric motors outputs the phase deviation Δθd according to the above-mentioned equation (15). The phase deviation Δθd through the gain amplifier 31 and the switch 41 is calculated with the outputs of the rotational frequency detector 22 and the rotational frequency feedback detector 24, consequently the origin matching mode 2 and very accurate synchronous control are performed.

According to the present invention, in the case that a deceleration device is not employed between the master electric motor and the shaft of the master machine but employed between the slave electric motor and the shaft of the slave machine, when the phase deviation between the phase detector 27 of the master electric motor and the phase detector 29 of the slave electric motor, where their maximum counted value of the output is different, is calculated, very accurate synchronous control can be performed without failing to detect the phase by initializing the master over counter OVCm and the slave over counter OVCs.

Next, a renewal of the master over counter OVCm and the slave over counter OVCs at the origin matching 2, according to the present invention is explained.

As shown in FIG. 13 and FIG. 14, the master over counter OVCm and the slave over counter OVCs is initialized and the origin matching 2 is started. In the present embodiment a synchronous control is performed by renewing the master over counter OVCm and the slave over counter OVCs continuously at the origin matching mode 2 and synchronous control mode. The renewal is explained referring to FIG. 16, FIG. 17 and FIG. 18.

FIG. 16 explains the transition of the master over counter OVCm and the slave over counter OVCs corresponding to the change of the output C27 of the phase detector 27 of the master electric motor and the output C29 of the phase detector 29 of the slave electric motor when the origin matching 2 is started and the synchronous control mode is shifted from the origin matching 2. Note that the rotational phase of Y-axis in FIG. 16 is shown by the counted number of pulses.

Also, in FIG. 16, (a) shows a scan that the phase deviation detector 30' for the electric motors executes a synchronous processing and the other operations, (b) shows values of the master over counter OVCm, (c) shows values of the slave over counter OVCs. The deceleration rate 1/N of the deceleration device Gs1 is 1/4 (N=4) in order to simplify the explanation.

The case that the origin matching mode 2 is started after the phase deviation being within ±ε1 at time to in FIG. 16 is explained. In this embodiment as shown in FIG. 13 the master over counter OVCm is initialized to 0 and the slave over counter OVCs is initialized to 2. The phase deviations Δθd(t0) at time t0 is shown as follows, according to said equation (15). It corresponds to the phase deviation between MO and SO'.

$$\Delta\theta d(t0) = M0 - S0 + C29MAX \times (N \times 0 - 2) = M0 - (S0 + 2 \cdot C29MAX) = M0 - S0'$$

After time t1 the phase deviation detector 30' for the electric motors constantly calculates and outputs the phase deviation Δθd continuously by the equation (15).

Here, the phase deviation detector 30' for the electric motors is comprised of a micro processor or a digital signal processor usually, and their operating timing is quite short cycle compared to the integrating cycle of the phase detector 27 of the master electric motor and the phase detector 29 of the slave electric motor, as shown in FIG. 16-a modeledly.

In FIG. 16, after time t1 the phase deviation detector 30' for the electric motors detects that C27 and C29 are increased gradually, then calculates Δθd by said equation (15) and outputs it continuously. At time t1 as the output S1 of the phase detector 29 of the slave electric motor is decreased compared to the previous value, the phase deviation detector 30' for the electric motors detects "clear" of C29. Referring to FIG. 17, the method for renewal of the over counter is explained when "clear" is detected.
(The renewal is started when OVCm=0 and OVCs=2)

(1) In the decision box f1, as C29 is cleared, go to decision box f2;
(2) In the decision box f2, as OVCs=2 the condition of f2 is not satisfied, go to decision box f3;
(3) In the decision box f3, as OVCm=0 the condition of f3 is satisfied, go to box f6;
(4) In the box f6, OVCs=2+1=3, go to box f7;
(5) Terminate in box f7 (OVCm=0, OVCs=3)

The phase deviation detector 30' for the shafts of the electric motors calculates $\Delta\theta d(t1)$ by OVCs, OVCm and said equation (15). The result of $\Delta\theta d(t1)$ is as follows and it corresponds to the phase deviation between M1 and S1'.

$$\Delta\theta d(t1)=M1-S1+C29\text{MAX}\times(N\times 0-3)=M1-(S1+3\cdot C29\text{MAX})=M1-S1'$$

After time t1 the phase deviation detector 30' for the electric motors detects that C27 and C29 are increased gradually, then calculates $\Delta\theta d$ by said equation and outputs it continuously.

At time t2 in FIG. 16 as the value M2 of C27 is decreased compared to the previous value, the phase deviation detector 30' for the electric motors detects "clear" of C27. Referring to FIG. 18, the method for renewal of the over counter is explained when "clear" is detected. Referring to FIG. 18, the method for renewal of the over counter is explained when "clear" is detected.
(The renewal is started when OVCm=0 and OVCs=3)

(1) In the decision box f1, as C27 is cleared, go to decision box f2;
(2) In the decision box f2, as OVCm=0 the condition of f2 is not satisfied, go to decision box f3;
(3) In the decision box f3, as OVCs=3 the condition of f3 is not satisfied, go to box f4;
(4) In the decision box f4, as OVCs=3 the condition of f4 is not satisfied, go to box f6;
(5) In the box f6, OVCm=0+1=1, go to box f7;
(6) Terminate in box f7 (OVCm=1, OVCs=3)

The phase deviation detector 30' for the electric motors calculates $\Delta\theta d(t2)$ by OVCs, OVCm and said equation (15). The result of $\Delta\theta d(t2)$ is as follows and it corresponds to the phase deviation between M2' and S1'.

$$\Delta\theta d(t2)=M2-S2+C29\text{MAX}\times(4\times 1-3)=(M2+4\cdot C29\text{MAX})-(S2+3\cdot C29\text{MAX})=M2'-S2'$$

After time t2 the phase deviation detector 30' for the electric motors detects that C27 and C29 are increased gradually then calculates $\Delta\theta d$ by the equation and outputs it continuously.

At time t3 in FIG. 16 as the value S3 of C29 is decreased compared to the previous value, the phase deviation detector 30' for the electric motors detects "clear" of C29. Referring to FIG. 17, the method for renewal of the over counter OVCs is explained when "clear" is detected.
(The renewal is started when OVCm=1 and OVCs=3)

(1) In the decision box f1, as C29 is cleared, go to decision box f2;
(2) In the decision box f2, as OVCs=3 the condition of f2 is not satisfied, go to decision box f3;
(3) In the decision box f3, as OVCm=1 the condition of f3 is not satisfied, go to box f4;
(4) In the decision box f4, as OVCs=3 the condition of f4 is satisfied, go to box f5;
(5) In the box f5, OVCm=1-1=0, OVCs=3-3=0, go to box f7;
(6) Terminate in box f7 (OVCm=0, OVCs=0)

The phase deviation detector 30' for the shafts of the electric motors calculates $\Delta\theta d(t3)$ by OVCs, OVCm and said equation (15).

$$\Delta\theta d(t2)=M3-S3+C29\text{MAX}\times(N\times 0-0)=M3-S3$$

According to the above-mentioned control the phase deviation $\Delta\theta d$ is finally within $\pm\epsilon 1$ and the origin matching mode 2 is completed then the control is switched over a synchronous control mode continuously.

Figure 26:
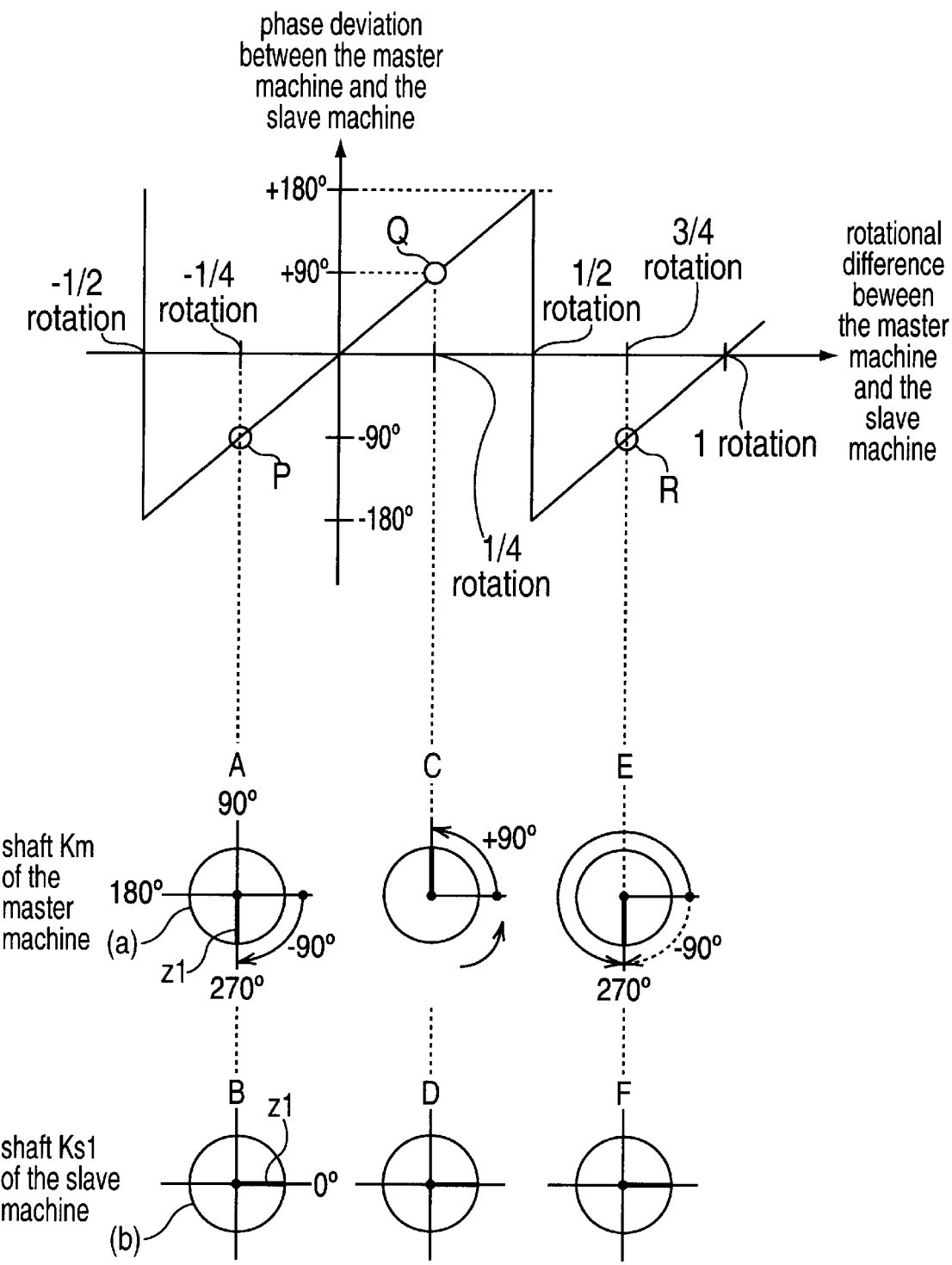
FIG. 26 illustrates the detection of the phase deviation according to the prior art.
Figure 27:
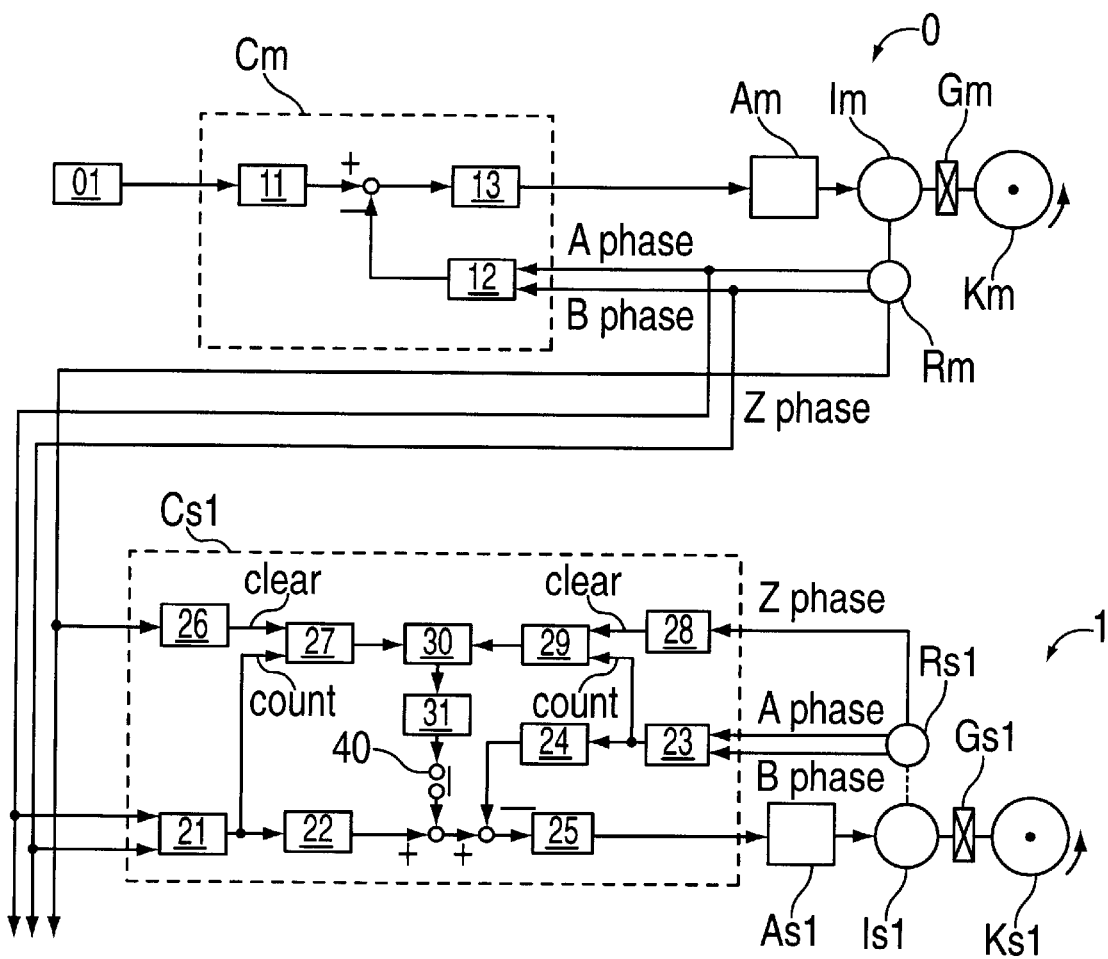
FIG. 27 illustrates a block diagram of a conventional synchronous control device employing deceleration devices.

Further, referring to FIG. 19(*a*) and FIG. 19(*b*) the difference between the detection of the phase deviation shown in the prior art of FIG. 26 and the detection of the phase deviation $\Delta\theta d$ by the equation (15) according to the present invention is explained.

FIG. 19(*a*) shows the detecting character of the phase deviation of the prior art shown in FIG. 26 in order to compare to it of FIG. 19(*b*) according to the present invention.

When the master section 0 is forward compared, to the slave section 1 from the state that the phase deviation between the master section 0 and the slave section 1 is zero (shown by point A), the phase deviation goes toward point B. When the master section 0 is 1/2 rotation forward compared to the slave section 1 the phase deviation is to be negative quantity (shown by point C).

According to the prior art shown in FIG. 19(*a*), as the phase deviation is changed discontinuously by cycle of ±1/2 rotation, it is impossible to control continuously over ±1/2 rotation.

FIG. 19(*b*) shows the character of the phase deviation $\Delta\theta d$ by the equation (15) according to the present invention. Both the output C27 of the phase detector 27 of the master electric motor and the output C29 of the phase detector 29 of the slave electric motor are shown in FIG. 19(*b*).

In FIG. 19(*b*) when the phase deviation between the master section 0 and the slave section 1 is zero (shown as A point) the value of the master over counter OVCm and the slave over counter OVCs are zero. When the master section 0 is forward compared to the slave section 1 the phase deviation goes toward B point. At the point C when the master electric motor Im is forward of one rotation (it corresponds to four rotations of the slave electric motor Is1), OVCm of the master over counter is 1 according to said FIG. 18. Therefore, $\Delta\theta d$ is given by the equation (15) as follows.

$$\Delta\theta d=C27-0+C29\text{MAX}\times(4\times 1-0)=C27+4\cdot C29\text{MAX}$$

That is, as shown in FIG. 19(*b*) the phase deviation is constantly and continuously changed, therefore any phase deviation between the master section 0 and the slave section 1 can be set.

As mentioned above, in the present embodiment the value of the master over counter OVCm and the slave over counter OVCs are renewed as shown in FIG. 17 and FIG. 18.

Therefore, even when a deceleration device is employed or the maximum value of the output C27 of the phase detector 27 of the master electric motor and the output C29 of the phase detector 29 of the slave electric motor are different, the synchronous control can be performed with the equation (15) by means of the master over counter OVCm and the slave over counter OVCs. Moreover, as the equation (15) doesn't include division, very accurate synchronous control can be performed without lowering detectable accuracy of C27 and C29.

According to the present invention, when the master section and the slave section are driven even at low or high rotational frequency, or they are accelerated or decelerated, very accurate synchronous control can be performed continuously after the origin matching is completed, so that the synchronous control device of the present invention is of practical use.

(3) Embodiment 3

Figure 20:
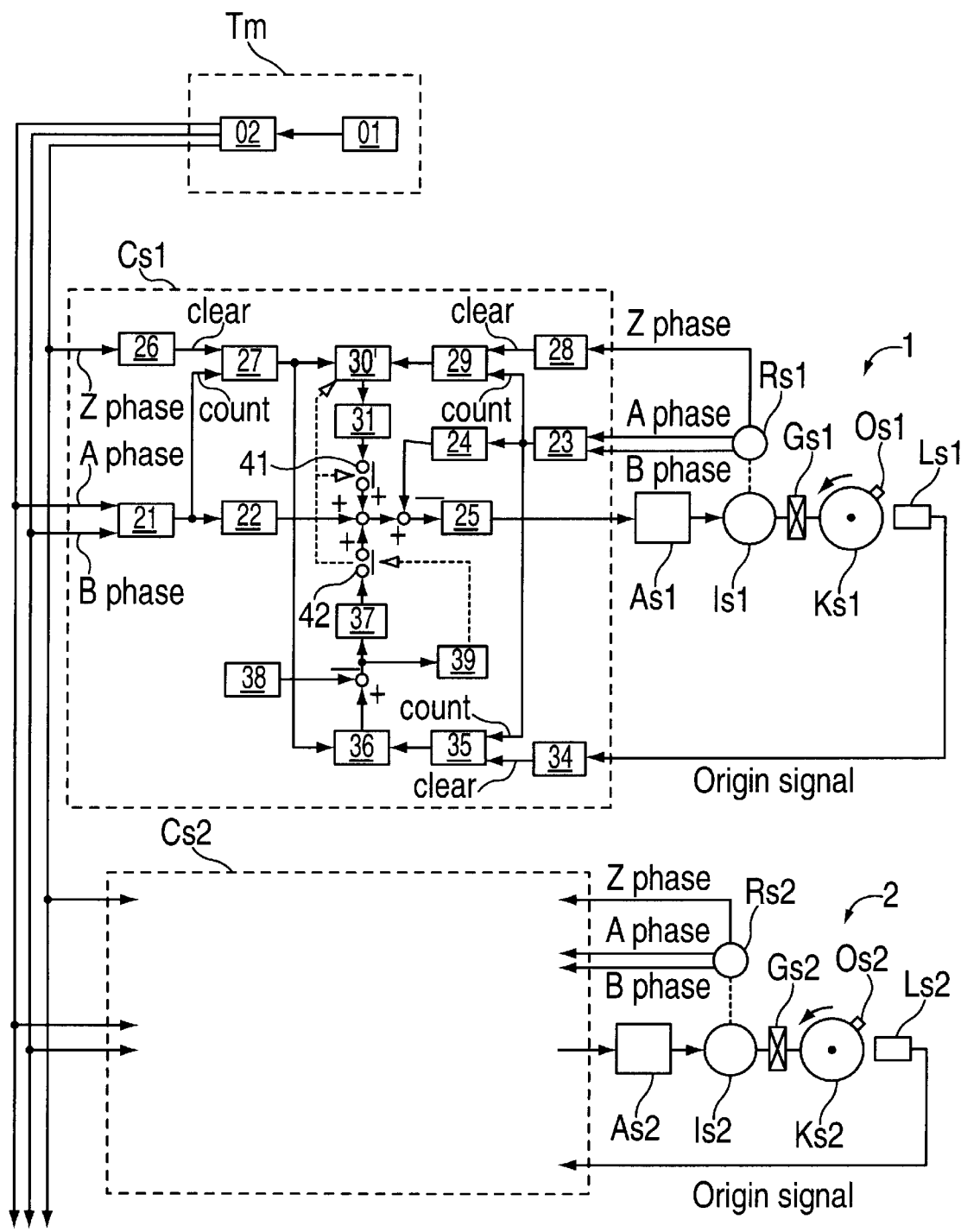
FIG. 20 illustrates a block diagram of the third embodiment.

FIG. 20 shows a block diagram of the third embodiment according to the present invention. In this embodiment, an electronically comprised concentrated control unit is employed in stead of the master section 0.

In FIG. 20, a component and an operation of the slave section 1 and the control device Cs1 of the slave section are same as those in said FIG. 7. In this embodiment, a concentrated control unit Tm is employed in stead of the master section 0 and from this concentrated control unit Tm the same signal as the rotary encoder Rm shown in FIG. 7 is outputted.

The concentrated control unit Tm provides the rotational frequency setting device 01 and a frequency generator 02 inputting the output of the rotational frequency setting device 01, outputting pulse signal corresponding to A phase, B phase of the rotary encoder, and generating Z phase signal which is outputted N times as many as the number of pulses per one rotation of the slave rotary encoder Rs1.

Also, in the same manner of FIG. 7, the control device Cs1 of the slave section provides the receiving interface 21, 26 inputting the output of the frequency generator 02. The other parts having same function with those in FIG. 7 have same symbols.

In this embodiment, as shown in FIG. 20, as the master section 0 of FIG. 7 is comprised electronically it is possible to generate stable setting signal easily, therefore this embodiment is of practical use.

Figure 21:
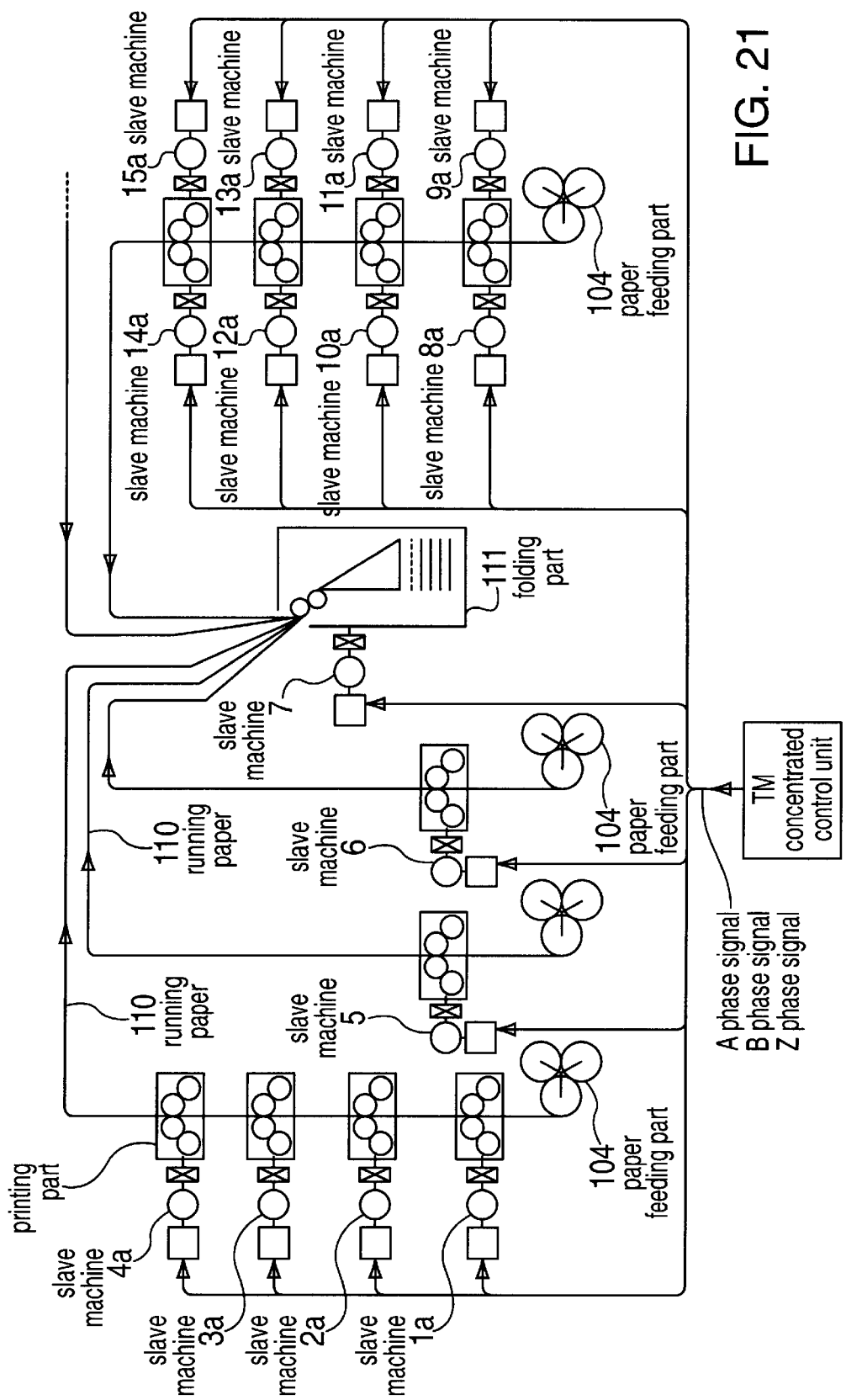
FIG. 21 illustrates an example that the embodiment of FIG. 20 is applied to a shaftless rotary press.

FIG. 21 shows an example that the embodiment of FIG. 20 is applied to a shaftless rotary press.

In FIG. 21, the holding parts 111 and all printing parts are driven as the slave section by the instruction from the concentrated control unit Tm.

According to those component, shaftless driving is realized and in the colored printing very accurate synchronous control without a shear can be performed.

(4) Embodiment 4

Figure 22:
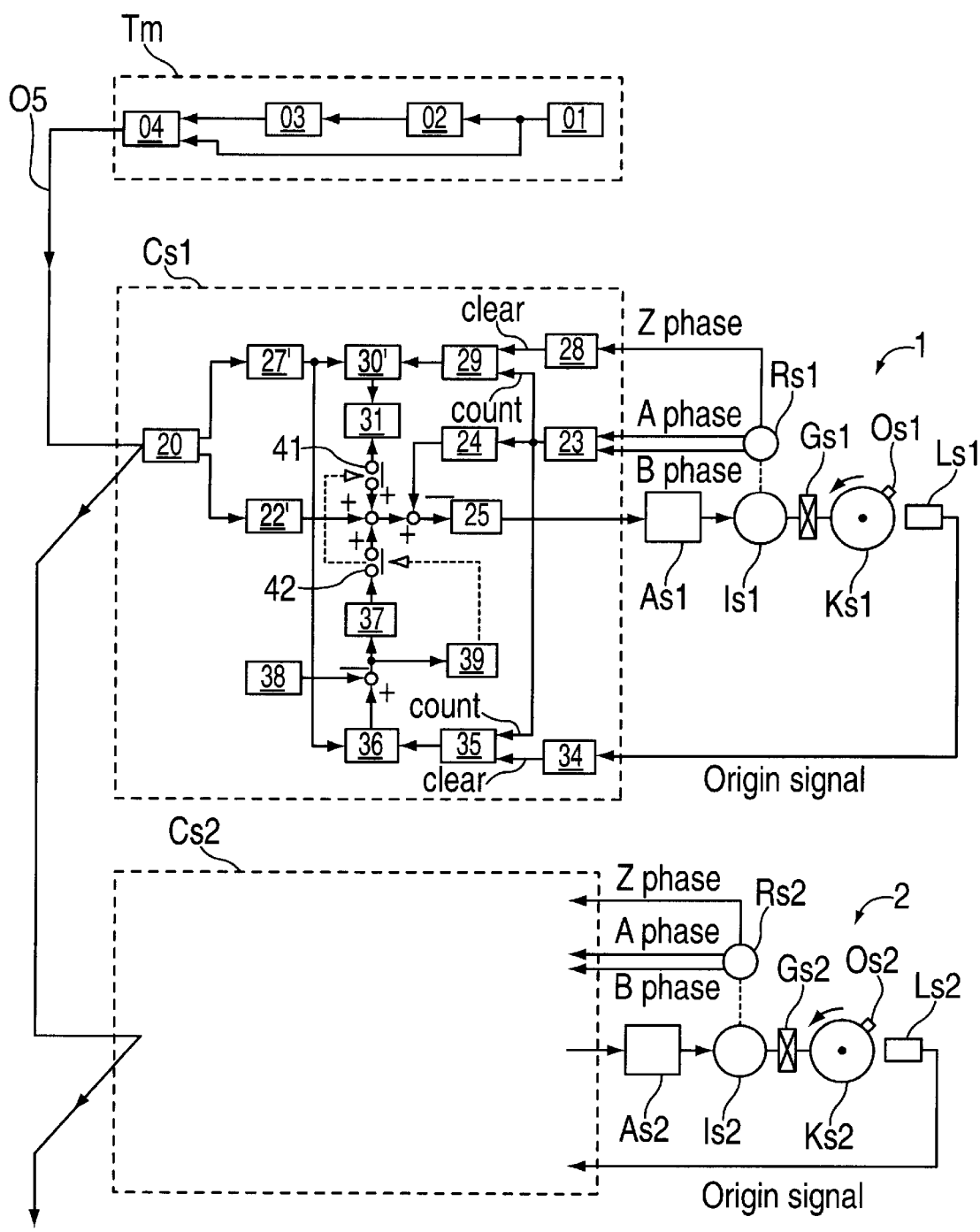
FIG. 22 illustrates a block diagram of the fourth embodiment.

Next, referring to FIG. 22 the fourth embodiment according to the present invention is explained.

In this embodiment same as the third embodiment, an electronically comprised concentrated control unit is employed in stead of the master section 0.

FIG. 22 shows a block diagram of the fourth embodiment according to the present invention. The concentrated control unit Tm provides the rotational frequency setting device 01, the frequency generator 02, a phase generator 03, a transmitter 04 and a communication circuit 05.

In the concentrated control unit Tm, the output of the frequency setting device 01 is inputted to the frequency generator 02 and the frequency generator 02 outputs frequency signal in proportion to the input from the frequency setting device 01. Then this output is inputted to the phase generator 03. The phase generator 03 integrates said frequency signal and outputs phase setting signal which clears the counted value when the phase generator 03 counts N times as many as the number of pulses corresponding one rotation of the rotary encoder Rs1.

That is, the phase generator 03 outputs the phase setting signal which is equivalent to the output signal of the phase detector 27 of the master electric motor in FIG. 7.

The transmitter 04 inputs said phase setting signal and the rotational frequency setting signal of the frequency setting device 01, and sends them to the communication circuit 05 at high speed and cyclically. As shown in FIG. 16-a modeledly the sending cycle of said rotational frequency setting signal and the phase setting signal is short enough compared to the integrating cycle of said phase generator 03.

The control device Cs1 of the slave section provides a receiver 20, a frequency setting memory 22', a phase setting memory 27'. The other components are same as those in FIG. 7 and FIG. 20. The parts having same function with those in FIG. 7, FIG. 20 have same symbols.

In the control device Cs1 of the slave section, said rotational frequency setting signal and the phase setting signal sent from the concentrated control unit Tm are received by the receiver 20 then housed in the frequency setting memory 22' and the phase setting memory 27', respectively.

The rotational frequency setting memory 22' and the phase setting memory 27' output signals equivalent to those of the rotational frequency detector 22 and the phase detector 27 of the master electric motor of FIG. 7, respectively.

After the origin matching mode 1 by the route through the phase deviation detector 36 for the shafts of the machines and the origin matching mode 2 by the route through the phase deviation detector 30' for the electric motors, the synchronous control mode is performed.

As mentioned above, as the rotational frequency setting signal and the phase setting signal are generated in the concentrated control unit Tm, these signals can be stable. And as these signals are sent to the control device for the slave section by communication circuit 05 at high speed and cyclically, the origin ' matching and accurate synchronous control between plural electric motors are realized.

Furthermore, in the embodiments 2~4 an incremental encoder as a rotary encoder is employed, as shown in FIG. 4 of the embodiment 1 an absolute encoder may be employed. In this case the maximum output value of one rotation of the rotary encoder attached to the master electric motor Im is N times as many as the maximum output value of one rotation of the rotary encoder attached to the slave electric motor Is1.

In the fourth embodiment, when an absolute-type encoder is employed, the rotational frequency feedback detector 24, the phase detector 29 of the slave electric motor, the phase detector 35 for the shaft of the slave machine may be replaced by differential register 124, register 129, differential accumulator 134, respectively.

As mentioned above, the synchronous control between the master section and the slave section can be performed after the origin matching is completed even when they are driven at any rotational frequency, of low or high, or they are accelerated or decelerated not by a method for correcting a relative phase deviation but by a method for correcting an absolute phase deviation. Also as the control device of the slave section of the present invention comprises the synchronous control device independently, the present invention has many kinds of feature such that the control time is constant and accuracy of the synchronous control is not lost irrespective of number of slave sections, therefore it is of practical use.

It will be understood that the claims are intended to cover all changes and modifications of the preferred embodiment of the invention herein chosen for the purpose of illustration which do not constitute a departure from the spirit and scope of the invention.

What is claimed is:

1. A synchronous control device including a master section and a slave section for controlling a rotational frequency and the rotational phase between a master electric motor and a slave electric motor, or between a shaft of a master machine and a shaft of a slave machine driven by the respective electric motors, comprising:

a deceleration device with a deceleration rate of 1/N (N is a positive integer) for connecting said master electric motor and said shaft of the master machine;

a deceleration device with a deceleration rate of 1/N (N is a positive integer) for connecting said slave electric motor and said shaft of the slave machine;

a master rotary encoder for outputting pulses in response to said master electric motor;

an origin detector of the shaft of the master machine for detecting one rotation of said shaft of the master machine;

a slave rotary encoder for outputting pulses in response to said slave electric motor;

an origin detector of the shaft of the slave machine for detecting one rotation of said shaft of the slave machine;

in the slave section, further comprising:

a rotational frequency detector for constantly detecting a rotational frequency of said master electric motor by a signal outputted from said master rotary encoder;

a rotational frequency feedback detector for constantly detecting a feed back rotational frequency of said slave electric motor according to the signal outputted from said slave rotary encoder;

a phase detector of the master electric motor for constantly detecting rotational phase of said master electric motor according to the output of said master rotary encoder and being cleared every one rotation of said master rotary encoder;

a phase detector of the slave electric motor for constantly detecting rotational phase of said slave electric motor according to the output of said slave rotary encoder and being cleared every one rotation of said slave rotary encoder;

a phase detector of the shaft of the master machine for constantly detecting a rotational phase of said shaft of the master machine according to the output of said master rotary encoder and being cleared by the output of said origin detector of the shaft of the master machine;

a phase detector of the shaft of the slave machine for constantly detecting a rotational phase of said shaft of the slave machine according to the output of said slave rotary encoder and being cleared by the output of said origin detector of the shaft of the slave machine;

a first phase deviation detector for calculating the output of said phase detector of the shaft of the master machine and the output of said phase detector of the shaft of the slave machine so as to output a phase deviation between said shaft of the master machine and said shaft of the slave machine; and a second phase deviation detector for calculating the output of said phase detector of the master electric motor and the output of said phase detector of the slave electric motor so as to output a phase deviation between the said master electric motor and said slave electric motor;

wherein a first origin matching between said shaft of the master machine and said shaft of the slave machine based on the output of said first phase deviation detector, said rotational frequency detector and said rotational frequency feedback detector is completed, then, when a phase deviation between said shaft of the master machine and said shaft of the slave machine is within the predetermined phase deviation, a second origin matching between said master electric motor and said slave electric motor based on the output of said second phase deviation detector, said rotational frequency detector and said rotational frequency feedback detector continuously is completed so as to perform a synchronous control between said master section and said slave section.

2. Said synchronous control device of claim 1, further comprising:

a phase shifter for correcting the output of said first phase deviation detector by a phase shift amount corresponding to discrepancy between an angle of a shaft of a machine and an angle of a shaft of an electric motor;

wherein said first origin matching between said shaft of the master machine and said shaft of the slave machine is shifted to said second origin matching between said master electric motor and said slave electric motor bumplessly by canceling said discrepancy between the angle of the shaft of the machine and the angle of the shaft of the electric motor.

3. A synchronous control device including a master section and a slave section for controlling a rotational frequency and the rotational phase between a master electric motor and a slave electric motor, or between a shaft of a master machine and a shaft of a slave machine driven by the respective electric motors, comprising:

a deceleration device with a deceleration rate of 1/N (N is a positive integer) for connecting said slave electric motor and said shaft of the slave machine;

wherein said master electric motor and said shaft of the master machine are connected without a deceleration device;

a master rotary encoder for outputting pulses in response to said master electric motor;

a slave rotary encoder for outputting pulses in response to said slave electric motor;

wherein the output number of pulses or the maximum output value per one rotation of said master rotary encoder is N times (N is a positive integer) as many as the output number of pulses or the maximum output value per one rotation of said slave rotary encoder;

an origin detector of the shaft of the slave machine for detecting one rotation of said shaft of the slave machine;

in the slave section, further comprising:

a rotational frequency detector for constantly detecting a rotational frequency of said master electric motor by a signal outputted from said master rotary encoder;

a rotational frequency feedback detector for constantly detecting a feed back rotational frequency of said slave electric motor according to the signal outputted from said slave rotary encoder;

a phase detector of the master electric motor for constantly detecting rotational phase of said master electric motor and said shaft of the master machine according to the output of said master rotary encoder and being cleared every one rotation of said master rotary encoder;

a phase detector of the slave electric motor for constantly detecting rotational phase of said slave electric motor according to the output of said slave rotary encoder and being cleared every one rotation of said slave rotary encoder;

a phase detector of the shaft of the slave machine for constantly detecting a rotational phase of said shaft of the slave machine according to the output of said slave rotary encoder and being cleared by the output of said origin detector of the shaft of the slave machine;

a first phase deviation detector for calculating output of said phase detector of the shaft of the master machine and output of said phase detector of the shaft of the slave machine so as to output a phase deviation between said shaft of the master machine and said shaft of the slave machine; and a master over counter and a slave over counter for incrementing or decrementing the counted value, or setting the predetermined value defined by said deceleration rate every when said phase detector of the master electric motor and said phase detector of the slave electric motor are cleared, and outputting a coefficient value in order that the value of the rotational phase of said slave electric motor is converted to the value corresponding to the rotational phase of said master electric motor; and a second phase deviation detector for calculating the output of said phase detector of the master electric motor and the output of said phase detector of the slave electric motor, the output of said master over counter and the output of said slave over counter, then outputting a phase deviation between said master electric motor and said slave electric motor;

wherein a first origin matching between said shaft of the master machine and said shaft of the slave machine based on the output of said first phase deviation detector, said rotational frequency detector and said rotational frequency feedback detector is completed, then, when a phase deviation between said shaft of the master machine and said shaft of the slave machine is within the predetermined phase deviation, after the counted value of said master over counter and the counted value of said slave over counter are initialized to the predetermined value corresponding to the phase relation between said phase detector of the master electric motor and said phase detector of the slave electric motor, a second origin matching between said master electric motor and said slave electric motor based on the output of said second phase deviation detector, said rotational frequency detector and said rotational frequency feedback detector continuously so as to perform a synchronous control between said master section and said slave section.

4. The synchronous control device of claim 3, wherein when the phase deviation between said master electric motor and said slave electric motor is within the predetermined phase deviation, in the case that said master section is forward compared to said slave section, the counted value of said slave over counter is initialized to 0, 1 . . . (N–1) or –1 corresponding to the output of said phase detector of the master electric motor and said phase detector of the slave electric motor, the counted value of said master over counter is initialized to 0, in the case that said master section is behind compared to the slave section, the counted value of said slave over counter is initialized to 0, 1 . . . (N–1) or N corresponding to the output of said phase detector of the master electric motor and said phase detector of the slave electric motor, the counted value of said master over counter is initialized to 0.

5. The synchronous control device of claim 3, wherein said master section and said slave section are under said synchronous control, when the output of said phase detector of the master electric motor is cleared, if the counted value of said slave over counter is N or more, N is subtracted from the counted value of said slave over counter, if the counted value of said slave over counter is less than N, 1 is added to the counted value of said master over counter, when the output of said phase detector of the slave electric motor is cleared, if the counted value of said slave over counter is (N–1) or more, (N–1) is subtracted from the counted value of said slave over counter and 1 is subtracted from the counted value of said master over counter, if the counted value of said slave over counter is less than (N–1), 1 is added to the counted value of said slave over counter.

6. The synchronous control device of claim 4, comprising:
a concentrated control unit employing a phase generator for outputting phase setting signal based on N times the number of pulses corresponding to one rotation of said slave rotary encoder, and a transmitter for sending the output of said phase generator to said slave section, in stead of said master electric motor and said master rotary encoder;

in the slave section, comprising:

a receiver for inputting the output of said transmitter;

wherein a rotational frequency setting signal and a phase signal of the master electric motor are detected on the data of said receiver.

7. The synchronous control device of claim 3, comprising:
a concentrated control unit employing a phase generator for outputting a phase setting signal based on N times the number of pulses corresponding to one rotation of said slave rotary encoder, and a transmitter for sending the output of said phase generator to said slave section, instead of said master electric motor and said master rotary encoder;

in the slave section, comprising:

a receiver for inputting the output of said transmitter;

wherein a rotational frequency setting signal and a phase signal of the master electric motor are detected on the data of said receiver.

8. The synchronous control device of claim 4, comprising:
a concentrated control unit employing a phase generator for outputting a phase setting signal based on N times the number of pulses corresponding to one rotation of said slave rotary encoder, and a transmitter for sending the output of said phase generator to said slave section, instead of said master electric motor and said master rotary encoder;

in the slave section, comprising:

a receiver for inputting the output of said transmitter;

wherein a rotational frequency setting signal and a phase signal of the master electric motor are detected on the data of said receiver.

9. The synchronous control device of claim 5, comprising:
a concentrated control unit employing a phase generator for outputting a phase setting signal based on N times the number of pulses corresponding to one rotation of said slave rotary encoder, and a transmitter for sending the output of said phase generator to said slave section, instead of said master electric motor and said master rotary encoder;

in the slave section, comprising:

a receiver for inputting the output of said transmitter;

wherein a rotational frequency setting signal and a phase signal of the master electric motor are detected on the data of said receiver.

10. The synchronous control device of claim 6, comprising:

a concentrated control unit employing a phase generator for outputting a phase setting signal based on N times the number of pulses corresponding to one rotation of said slave rotary encoder, and a transmitter for sending the output of said phase generator to said slave section, instead of said master electric motor and said master rotary encoder;

in the slave section, comprising:

a receiver for inputting the output of said transmitter;

wherein a rotational frequency setting signal and a phase signal of the master electric motor are detected on the data of said receiver.

* * * * *

UNITED STATES PATENT AND TRADEMARK OFFICE
CERTIFICATE OF CORRECTION

PATENT NO.   : 6,417,643 B1
DATED        : July 9, 2002
INVENTOR(S)  : Shiba et al.

It is certified that error appears in the above-identified patent and that said Letters Patent is hereby corrected as shown below:

Column 1,
Line 23, cancel "magenta 105" insert -- magenta 108 --

Column 6,
Line 1, cancel "("
Line 30, in the formula, cancel "2"

Column 13,
Line 48, cancel "Gsl" insert -- Csl --

Column 23,
Line 40, cancel "Θ" insert -- $\theta$ --

Column 29,
Line 38, cancel "fl" insert -- fll --

Column 30,
Line 51, cancel "tl" insert -- t0 --
Line 61, cancel "tl" insert -- t0 --

Signed and Sealed this

Fifteenth Day of October, 2002

*Attest:*

JAMES E. ROGAN
*Attesting Officer*   *Director of the United States Patent and Trademark Office*